2 LEG AND UNIT

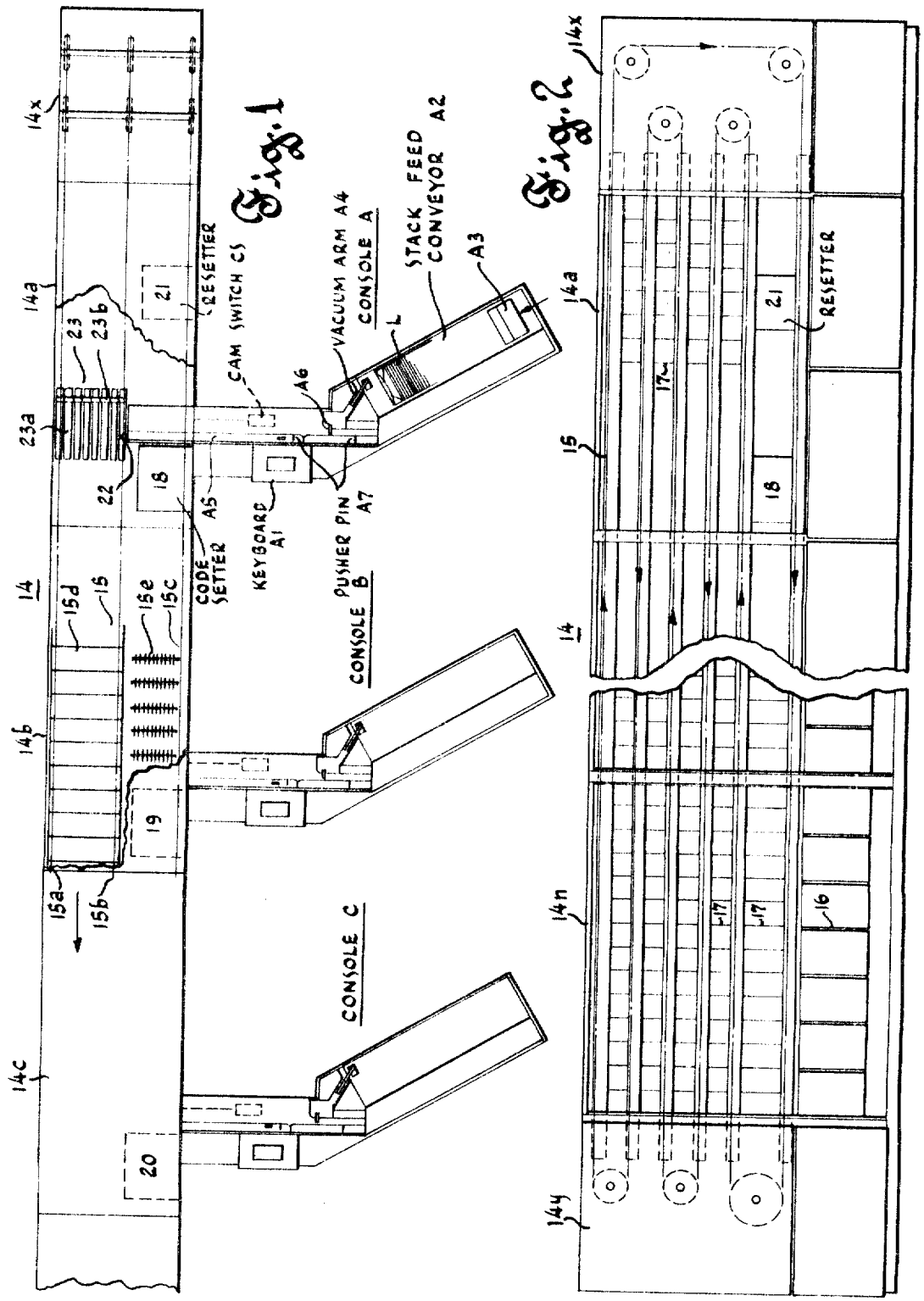

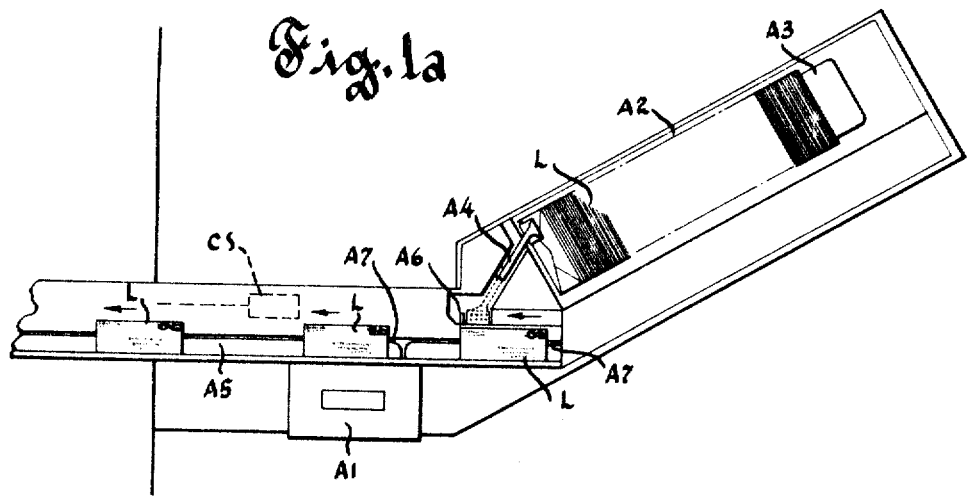
Fig. 1a
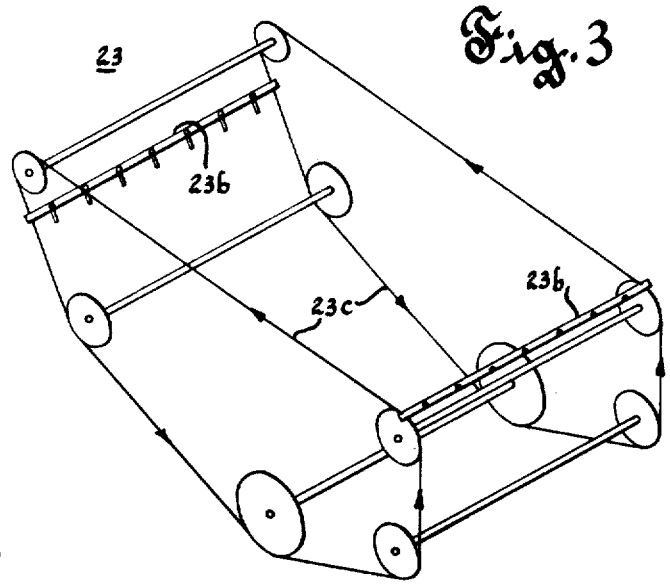
Fig. 3
Fig. 16
| FIG. | | | | | |
|---|---|---|---|---|---|
| 4a | 4c | 4e | 4g | 4i | 4k |
| 4b | 4d | 4f | 4h | 4j | 4m |
Inventors
Robert R. Hedrick
Harold S. Montgomery
Curtis H. Richmond
By Wm. A. Auter
Attorney

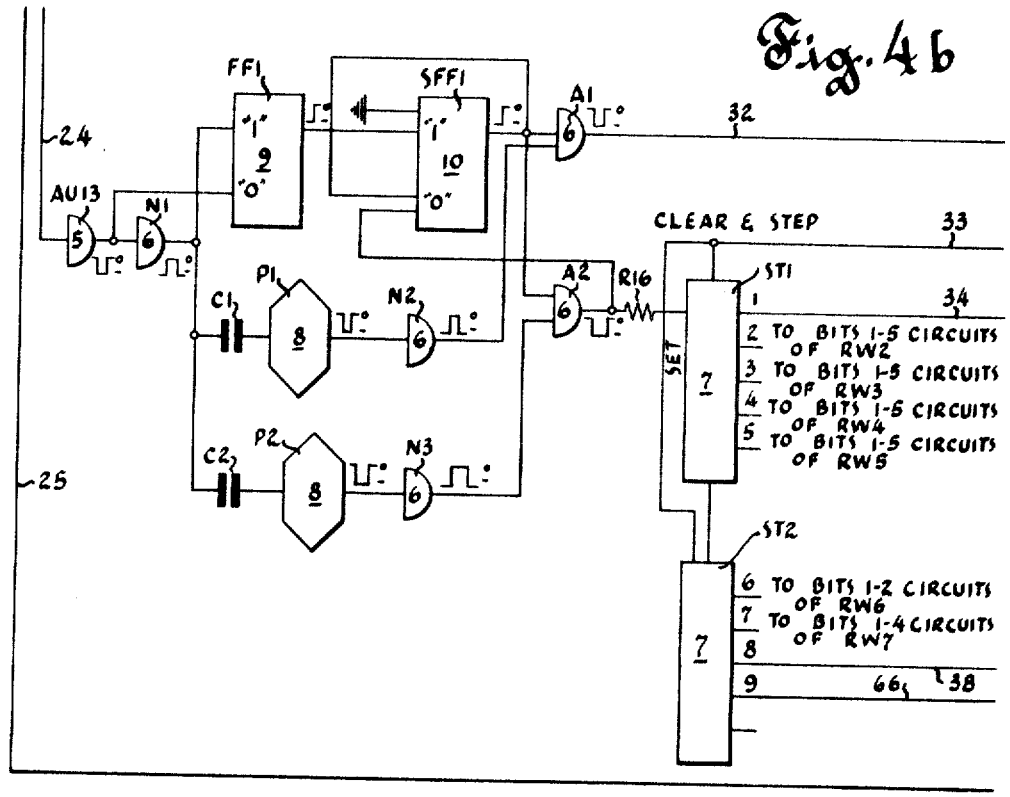
Fig. 4b
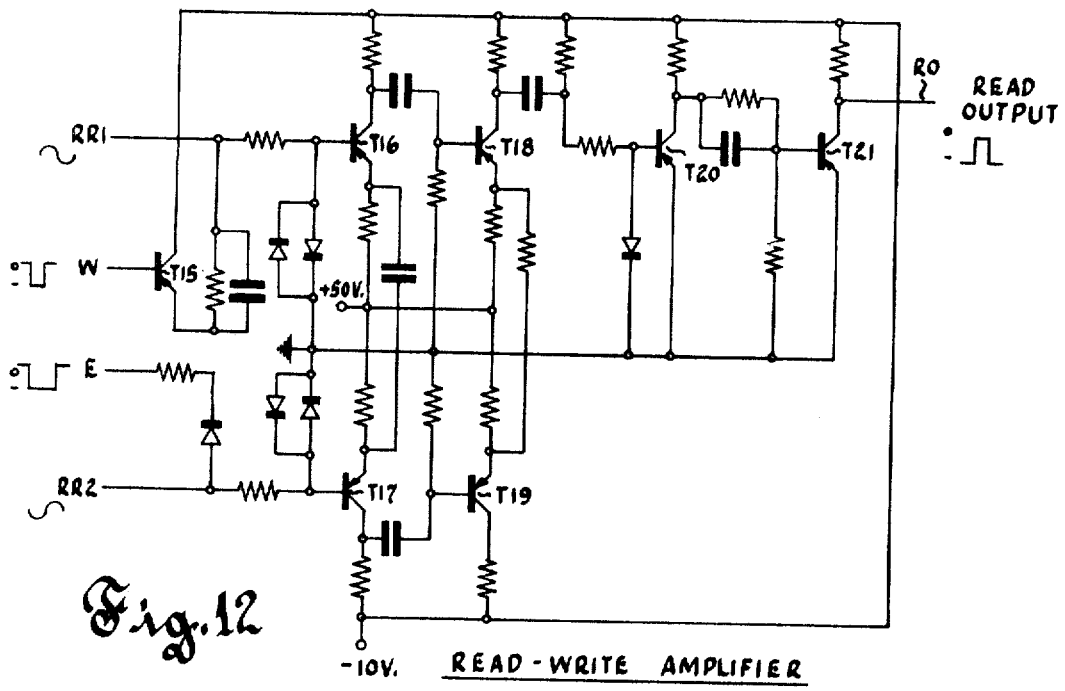
Fig. 12  READ-WRITE AMPLIFIER

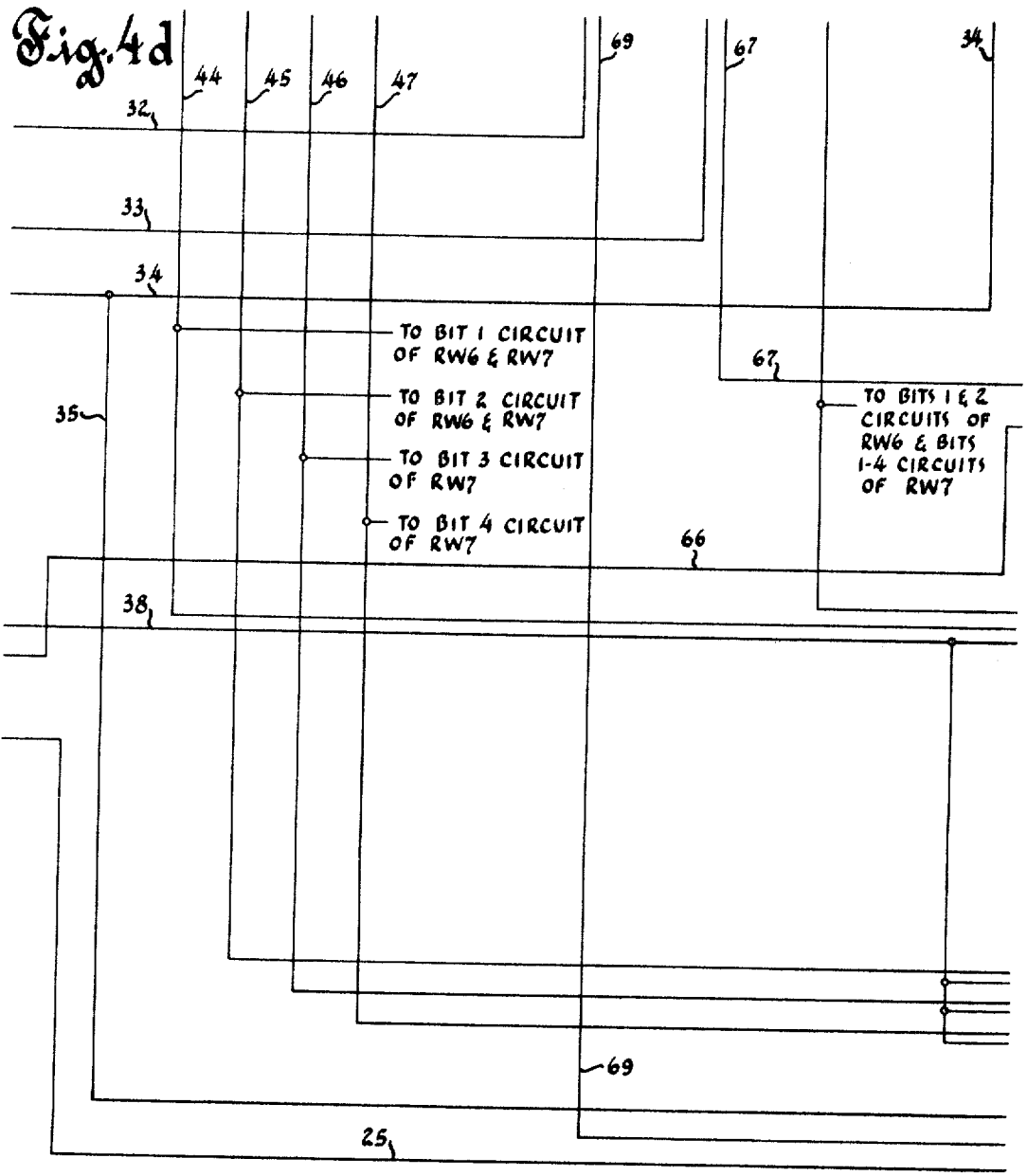
Fig.4d
TO BIT 1 CIRCUIT OF RW6 & RW7
TO BIT 2 CIRCUIT OF RW6 & RW7
TO BIT 3 CIRCUIT OF RW7
TO BIT 4 CIRCUIT OF RW7
TO BITS 1 & 2 CIRCUITS OF RW6 & BITS 1-4 CIRCUITS OF RW7
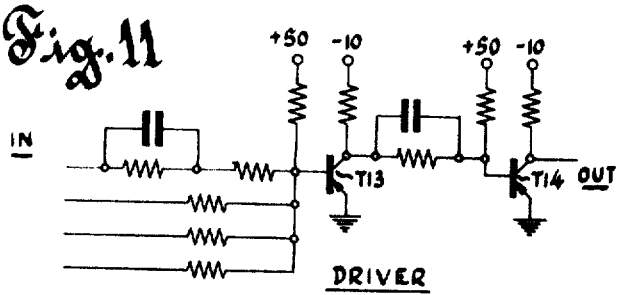
Fig.11 DRIVER
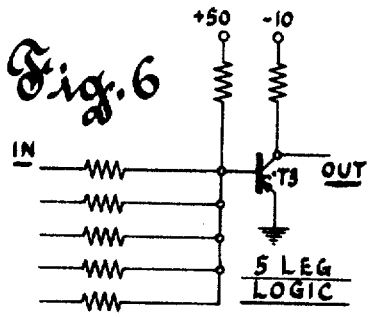
Fig.6 5 LEG LOGIC

PULSER

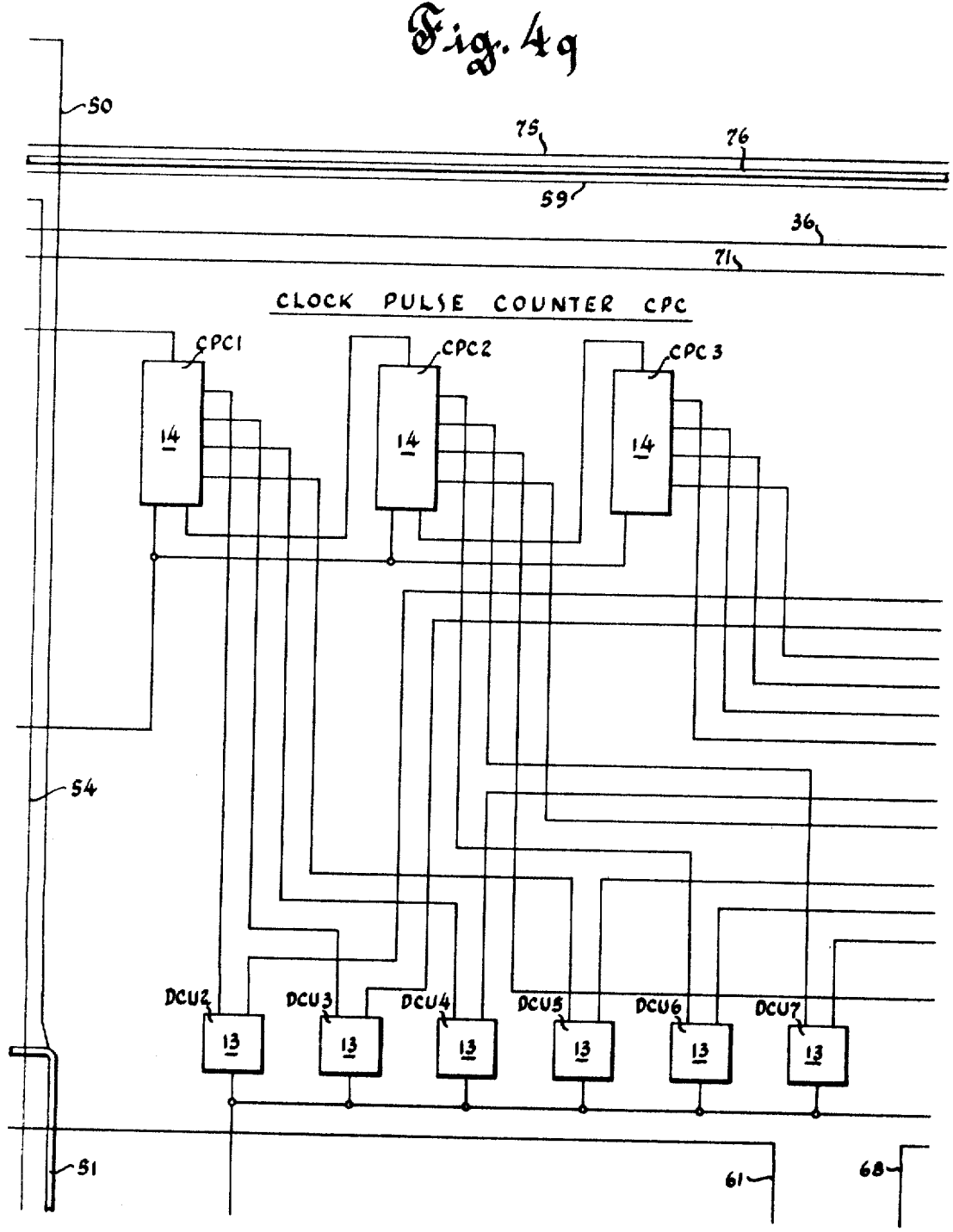

Inventors
Robert R. Hedrick
Harold S. Montgomery
Curtis H. Richmond
Attorney

Inventors
Robert R. Hedrick
Harold S. Montgomery
Curtis H. Richmond
By Wm. A. Austin
Attorney

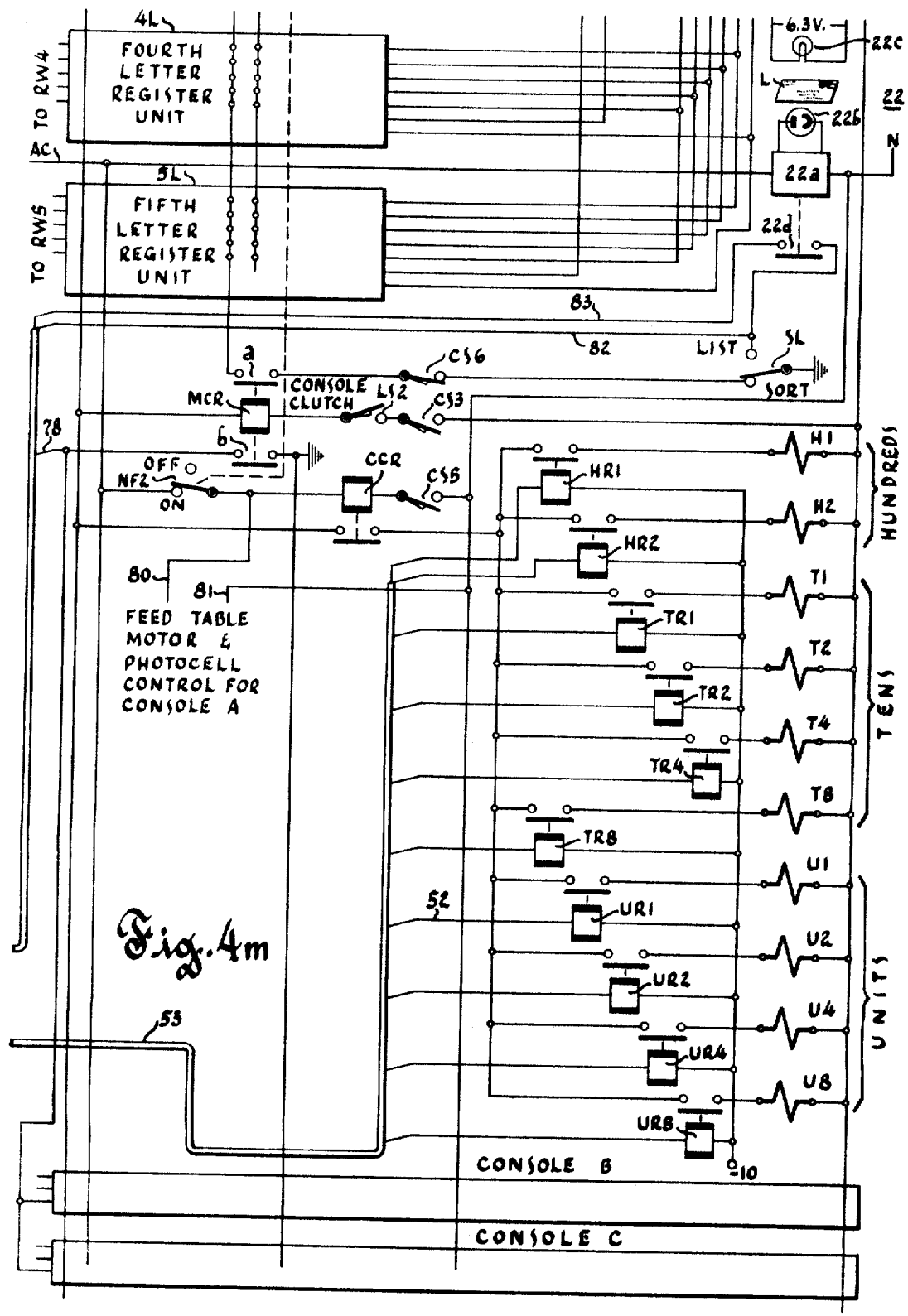

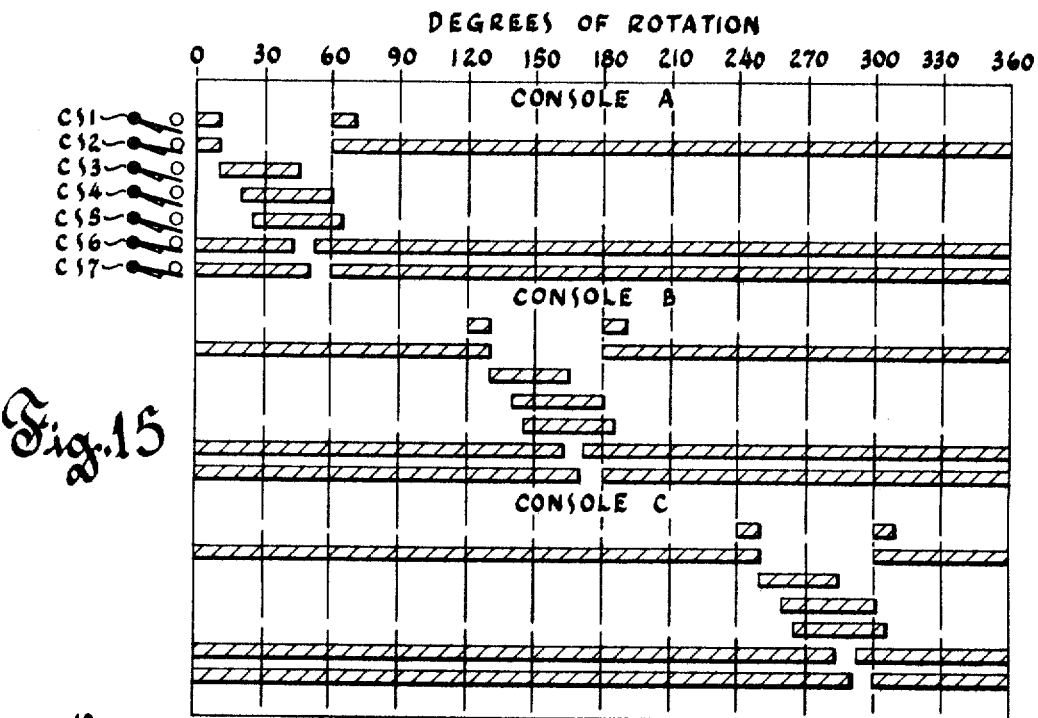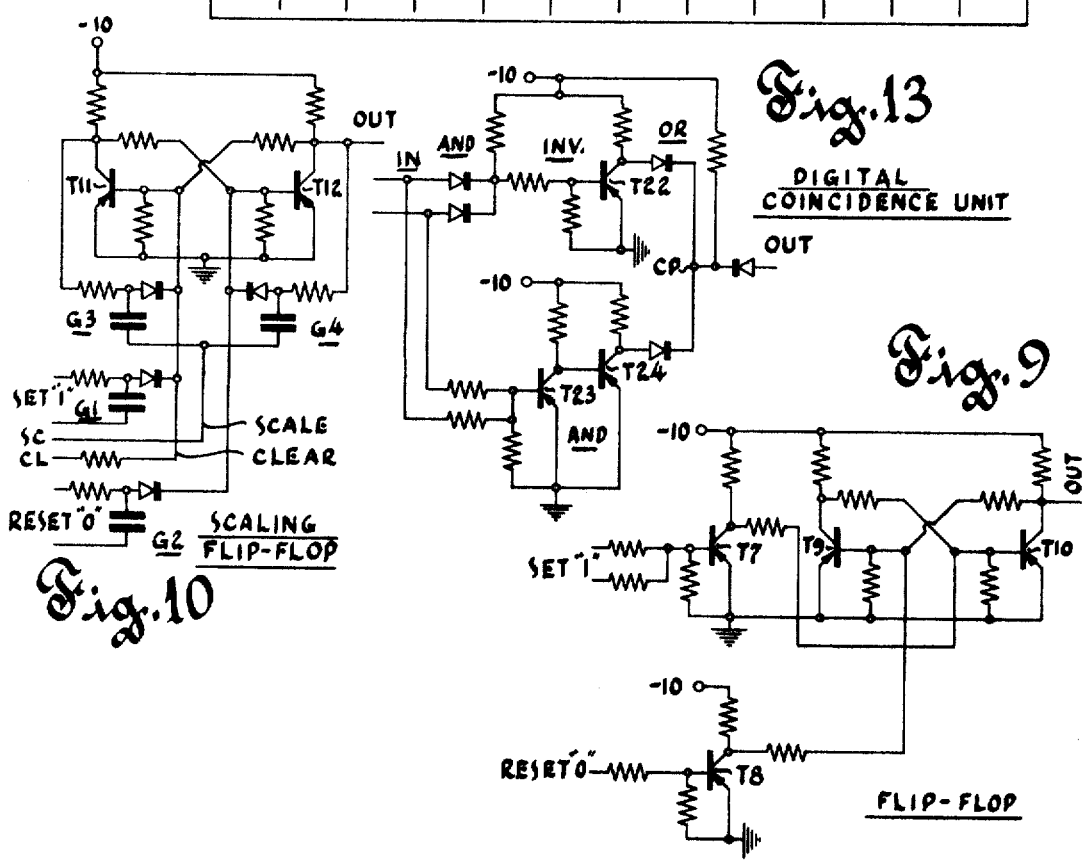

United States Patent Office 3,320,593
Patented May 16, 1967

3,320,593
MEMORY TYPE CONTROL SYSTEM FOR MAIL SORTING MACHINE
Robert R. Hedrick, Milwaukee, and Harold S. Montgomery, Wauwatosa, Wis., and Curtis H. Richmond, Plainview, N.Y., assignors to Cutler-Hammer, Inc., Milwaukee, Wis., a corporation of Delaware
Filed Mar. 6, 1964, Ser. No. 349,946
26 Claims. (Cl. 340—172.5)

This invention relates to memory type control systems and more particularly to high speed systems of digital, logic circuit type for translating, storing and retrieving control information or data.

While not limited thereto, the invention is especially applicable to sorting machines such as mail sorting machines for controlling automatic or semi-automatic sorting of mail or for controlling automatic programmed sorting or distribution of mail to predetermined destinations.

An object of the invention is to provide an improved memory type control system.

A more specific object of the invention is to provide an improved sorting system for high speed retrieval of stored data in response to operator controlled input codes wherein the input codes are read by the operator from articles being sorted and need not be memorized by the operator.

Another specific object of the invention is to provide an improved sorting system for high speed retrieval of stored codes in response to machine controlled input codes wherein the input codes are read automatically by a machine from articles being sorted.

Another specific object of the invention is to provide such sorting system with improved means for storing the data to be retrieved whereby such data can readily be removed and different data stored.

Another specific object of the invention is to provide such sorting system with means for controlling automatic programmed operation thereof in accordance with predetermined data automatically fed thereinto from record media or the like.

A further specific object of the invention is to provide an improved control system for a mail sorter which is common to a plurality of manual sorting operator stations and produces article destination codes in sequence in response to input codes read from the articles being sorted and fed thereinto by the respective operators.

Another object of the invention is to provide an improved control system as aforesaid which is of a high speed, digital logic circuit type.

Other objects and advantages of the invention will hereinafter appear.

According to the invention, there is provided a digital, logic circuit system for controlling a mail sorting machine. The system is provided with a card reader for reading plural-letter name codes and plural-digit pocket codes from punched cards. Each name code comprises the first few letters of the addressee's name and each pocket code comprises the digits of the number of the destination pocket in the sorting machine. A logic circuit system is provided for translating the space codes read from the card into binary name codes and binary coded decimal pocket codes and for recording these codes on a high speed magnetic drum. A plurality of consoles are provided for feeding mail one at a time into the sorting machine. Each console is provided with a keyboard whereby an operator keys in the name code read from the piece of mail passing thereby into the sorting machine and momentarily stopping in front of the operator and is provided with a register for storing the keyed-in name code. Common logic circuit means is provided for serving the operator's consoles in repetitive sequence. Each console controls the common means in turn to search the drum for the name code corresonding to its registered name code and for extracting the corresponding pocket code from the drum to control the setting of escort code wheels in the sorting machine which travel with the piece of mail. When the set code wheels reach a like coded pocket, the mail is delivered into the latter. The system is also provided with means for programmed sorting of mail under the control of the card reader without use of the magnetic drum. In this mode of operation the card reader is triggered to read the pocket code from a card as each piece of mail enters the sorting machine. Logic circuit means is provided for setting the escort code wheels directly and for avoiding interference from the codes which remain recorded on the drum.

While manual keyboards are shown for inserting name codes in the system, the invention contemplates automatic means in place thereof such as machine or optical reading of the name or address data from the mail and automatic insertion of the read name codes into the system.

These and other objects and advantages of the invention will best be understood by reference to the following description of an embodiment of the invention taken in conjunction with the accompanying drawings, wherein:

FIGURE 1 is a top view partly in section schematically illustrating a sorting machine and three operator consoles to which the invention is applied;

FIG. 1a is an enlarged top view of one console;

FIG. 2 is a schematic front elevation view of the sorting machine of FIG. 1 with its mid-portion and the operator consoles removed;

FIG. 3 is an isometric view schematically illustrating the mail inserter of the sorting machine of FIGS. 1 and 2;

FIGS. 4a to 4k and 4m show a system for controlling the sorting machine of FIGS. 1 and 2 constructed in accordance with the invention;

FIGS 5 to 14 are circuit diagrams showing details of the component circuits shown symbolically or in block form in the system of FIGS. 4a to 4k and 4m;

FIG. 15 is a cam layout development illustrating operating characteristics of the cam switches of the system of FIGS. 4a to 4k and 4m; and FIG. 16 is a diagram showing how FIGS. 4a to 4k and 4m are to be assembled to show the system.

Figure 4A:
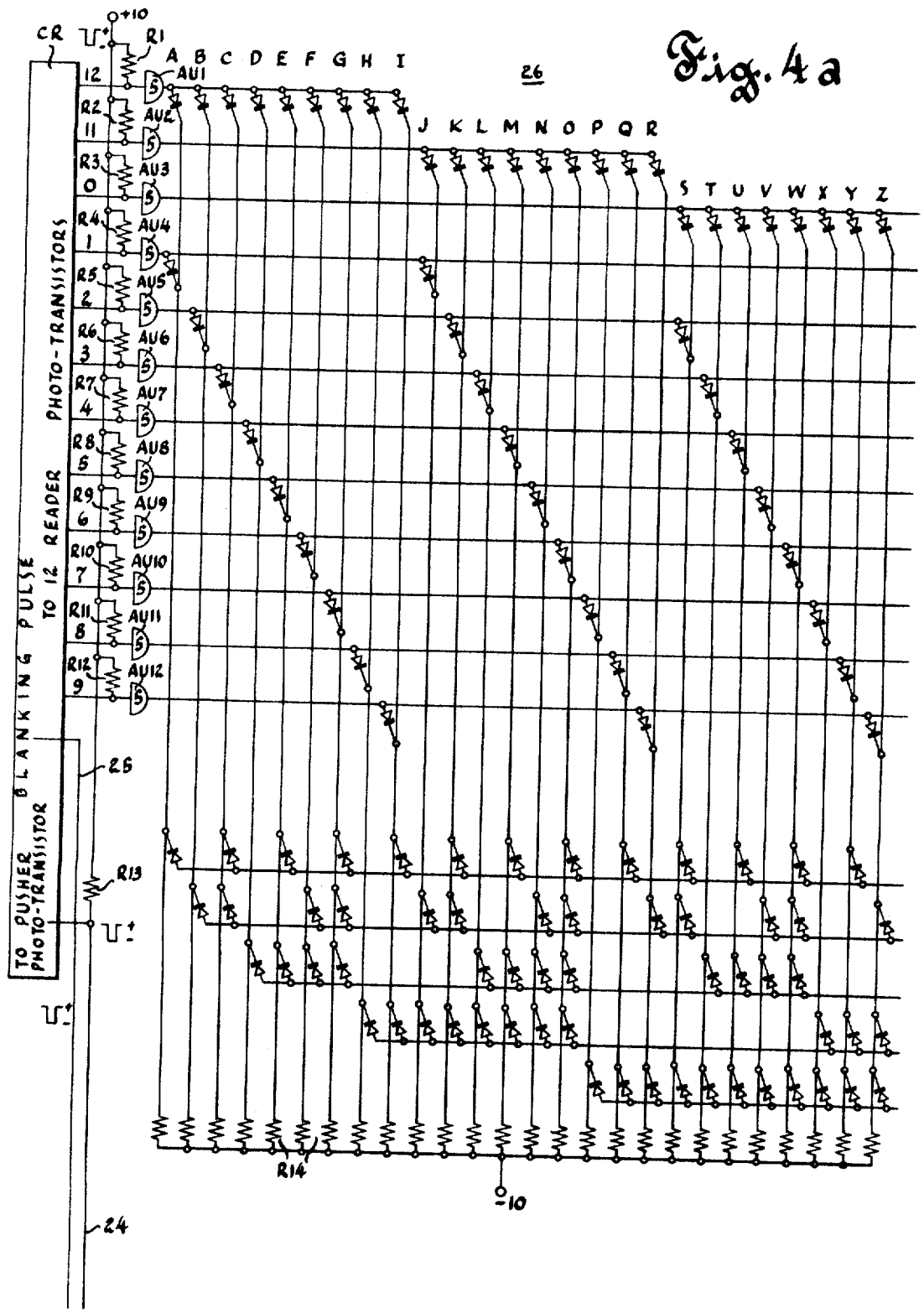

Referring to FIGS. 1 and 2, there is shown schematically a sorting machine 14 provided with a plurality of consoles A, B and C. Each console is controlled by an operator to supply articles into the sorting machine and the latter sorts these articles into a multiplicity of destination receptacles or pockets. While three consoles have been shown for purposes of description, it will be understood that the sorting machine may be provided with more or less consoles or in a sorting machine having a plurality of consoles, any one or more of the consoles may be placed into use while the remainder thereof are inactive.

As shown in FIGS. 1 and 2, the sorting machine is preferably of the unitized form having a plurality of units or sections 14a, 14b, 14c to 14n and a pair of end sections 14x and 14y. Sections 14a to 14n are connected end-to-end in series to form an elongated conveyor. Sections 14x and 14y at opposite ends of such series support the driving mechanisms for the plurality of stacked, horizontally moving portions of the convoluted conveyor 15 shown in FIG. 2. Conveyor 15 is an endless chain provided with a plurality of convolutions arranged horizontally in stacked relation so that portions of the conveyor travel over six horizontal rows of bins or pockets into which articles are dropped from the moving conveyor. The lower row at its left-hand end beyond the consoles is preferably provided with large bins 16 for miscellaneous articles or for articles such as mail which is received in large quantities. The second row at its left-hand end beyond the coding apparatus and the remaining rows are provided with equal width pockets 17 for receiving mail as it is sorted.

Reference may be had to J. Rabinow et al. Patents No. 3,080,072, dated Mar. 5, 1963, and No. 2,901,089, dated Aug. 25, 1959, for mechanical details of a sorting machine, such as gates for the bins and pockets, a conveyor and coding apparatus whereby the gates are operated. The sorting machine will be hereinafter described in general terms sufficient for an understanding of the invention. A gate is provided on top of each bin and pocket which may be pivoted upwardly under the control of coding apparatus so that an article being pushed along by the conveyor falls therethrough into the pocket. These gates when closed form a surface along which the articles are slid by pushers forming part of the conveyor.

A short piece of conveyor 15 is shown at the mid-portion of FIG. 1. This conveyor comprises three chains 15a, 15b and 15c driven in unison. A plurality of combs or sinusoidal-shaped wires or rods 15d are secured in spaced apart relation across chains 15a and 15b to form article receiving spaces therebetween and into which articles are inserted. These wavy wires push the articles along as the conveyor runs. A row of code wheels 15e is connected between chains 15b and 15c for each such article receiving space. These code wheels are axially slidable or adjustable along their supporting shafts between zero positions and binary coded decimal positions under control of code setters and a resetter hereinafter described. Directly below these rows of code wheels, each pocket is provided with a plurality of code bars defining coded surfaces for the respective pockets. Thus, when a row of code wheels that has been set to a code reaches a matching set of code bars, actuation takes place to open the corresponding gate whereby the pusher comb of the conveyor propels the article or letter into the corresponding pocket.

Each horizontal portion of the conveyor is provided with spaced strips extending therealong above conveyor rods 15d to confine the letters to their path of travel, these strips partially extending into the troughs in the convoluted rods 15d. Also, the conveyor turns or reversals at the end sections 14x and 14y are provided with upper and lower sets of strips to guide passage of the letters from one row to the next as shown in the aforementioned Patent No. 3,080,072.

As shown in FIG. 1, the sorting machine is provided with a plurality of code setters 18, 19 and 20, one for each console, for setting the row of code wheels at the same time as a letter is inserted into the corresponding space in the conveyor. These code setters are electrically-controlled mechanically-operated devices and are described in J. Rabinow et al. Patent No. 3,080,985 dated Mar. 12, 1963, except that only one row, rather than three, of setting arms is used. Each code setter is provided with a set of solenoids equal in number to the number of code wheels in a row 15e thereof whereby a code is inserted into the code setter, these solenoids being shown in FIG. 4m and described more fully hereinafter in connection with description of the control system. Such energization of selected solenoids presets the code setter for operation. The code setter is driven in synchronism with the conveyor and by cam action or the like shifts selected code wheels on the supporting rod to register the code.

A resetter 21 is mounted ahead of the consoles as shown in FIG. 1 to clear the codes, that is, to reset the code wheels in each row back to their normal or zero positions. This resetter may be similar to the code setters except that it is mechanical and solenoids are not required therein.

Also, it is provided with a row of resetting arms arranged so that they enter on the opposite sides of the code wheels from the side on which the setting arms enter. In addition, the cams are arranged to move the resetting arms in the opposite direction from the setting direction to restore the code wheels to their zero position. The resetter is mechanically coupled to rotate in synchronism with the conveyor travel by being driven from the conveyor chain or the like. Whereas, each code setter is provided with only one row of setting arms so that it can set the code wheels of only each third row thereof for one revolution of the code setter, the resetter is provided with three rows of resetting arms 120 degrees apart to afford resetting of each row of code wheels passing thereunder. Since the specific details of the resetter above described are not essential to the invention herein and any suitable resetter capable of restoring the code wheels may be used, the details thereof have not been illustrated.

As shown in FIG. 1, three consoles A, B and C are provided for feeding letters into the sorting machine. Console A will be described since the other two consoles are similar thereto. Console A shown in FIG. 1a is provided with a keyboard A1 for manipulation by the operator to introduce name codes into the sorting system. Since keyboards of this type are well known, a general description will be given to facilitate understanding of the invention. The keyboard is provided with a plurality of keys including 26 keys for the letters of the alphabet and a 27th reject key. The reject key may be used to cancel the name code registration in the event an error has been made. Since a five-bit binary code used for name codes in this system has a capacity of 32 codes, five additional numerical keys 1–5 may be provided on the keyboard to afford additional or special codes.

Console A is provided with a stack feed conveyor A2 for maintaining an inclined stack of letters L at a position where they can be picked up. For this purpose, the letter conveyor is provided with a loose block A3 having an inclined forward face on which the trailing end of the stack rests to maintain the letters at the proper angle as shown in FIG. 1a. The letter conveyor may be intermittently run under the control of a photo-electric beam or the like to maintain the forward end of the stack within reach of a vacuum arm A4. The vacuum arm is driven from the conveyor so that it oscillates between a pick-up position as shown in FIG. 1 wherein it sucks one letter to its flared end and a drop position over a letter trough A5 to which it carries the letter. The letters are placed upside down in the stack so that when the vacuum arm turns them over, they will appear in correct position on the letter trough for reading the name and address. A bracket A6 is mounted on top of the console for prying one end of the letter from the vacuum arm as it reaches one end of oscillation to facilitate release of the letter when the vacuum is released to let it drop on the inclined surface of the letter trough.

Letter trough A5 comprises a surface inclined away from the operator and having a narrow slot therealong. A letter drive mechanism comprising a pair of pins A7 extending through this slot is provided for pushing the letter along the letter trough. Each pin is driven by its own driving chain from the conveyor through sprockets and bevel gears or the like and the two are cycled so that the letter stops for a brief time in front of the operator's keyboard for reading. The first pusher pin A7 drives the letter in front of the operator. At this point, the letter trough may be provided with a small vacuum hole in the inclined surface positively to stop the letter in front of the operator. The second pusher pin then comes up behind the letter and drives it into the sorting machine.

When the letter stops at the keyboard, the operator reads the name thereon. Then as the letter is moved into the sorting machine, the operator presses the proper keys to register a five letter name code, as hereinafter more fully described. While a five letter name code has been disclosed herein, it will be apparent that other codes are possible such as less or more than five letters or special number-letter codes or the like for different departments of a company.

The letter drive mechanism moves the letter past a detector 22 of the photo-electric type or the like into a letter inserter 23 mounted within the sorting machine. This detector may be of the scanner-counter type or the like and may serve not only to scan the letter to detect its passage into the sorting machine but may also count the number of letters that are sorted by this operator. This photo-electric detector is shown in FIG. 4m.

The letter drive mechanism is driven by the sorting machine in synchronism therewith so that a letter is fed into each third space in the conveyor. Preferably, the letter drive mechanism is driven from the same shaft that drives a cam switch CS hereinafter described. A clutch which is manually controllable from a lever under the console is provided for engaging the letter drive mechanism and cam switch to the conveyor.

As shown in FIG. 1, inserter 23 receives the letter from the letter trough. Inserter 23 comprises a plurality of forwardly inclined strips 23a onto which the letter comes to rest after passing photo-electric device 22. A rake 23b which is driven by the conveyor in synchronism therewith then sweeps the letter from strips 23a into a space in the sorting machine conveyor at the same time as the associated code wheels are set as hereinafter described. The inserter preferably comprises two endless chains 23c shown in FIG. 3 across which two rakes 23b are secured 180 degrees apart. These chains are driven by a sprocket or the like from the conveyor chain. The drive is synchronized with the conveyor so that one rake will sweep a letter off strips 23a into every third space in the conveyor. The other two spaces are used by consoles B and C, respectively.

Referring to FIGS. 4a to 4k and 4m, there is shown a memory and control system of the logic circuit type operable from one or more console keyboards or from a card reader for controlling the sorter of FIG. 1 to cause sorting of letters into desired pockets. This memory system is of the computer type in that it provides pocket codes for setting the code mechanisms of the sorter in response to insertion of name codes thereinto from keyboards.

This system is provided with apparatus affording three modes of operation which may be called the load mode, the sort mode and the list mode. The load mode of operation comprises the operation of a card reader to read name codes and pocket codes from punched cards and to register these codes on a memory device such as a magnetic drum or the like. The sort mode of operation comprises the operation of one or more console keyboards to insert name codes into the system, to compare these inserted name codes with the registered name codes in the memory device and when a coincidence is found, to extract the associated pocket code for control of the sorting machine. The list mode of operation comprises the operation of the same card reader used in the load mode of operation for reading the name codes and the pocket codes from punched cards, to suppress the name codes since the memory device is not required in this mode of operation, and to utilize the pocket codes directly to control the sorter.

In other words, in the load mode the memory device of the system is loaded with information in the nature of name codes and pocket codes such as is required in the sort mode of operation. In the sort mode, letters are sorted by manipulation of keyboards, utilizing the information put into the system under the load mode. And in the list mode, letters are sorted directly by reading punched cards and controlling the sorter in accordance therewith without utilizing the information registered in the system under load mode. As will be apparent, incoming mail may be sorted to a multiplicity of recipients under sort mode after the system has been prepared under load mode. On the other hand, copies of a like document may be distributed to all or some of the sorter pockets under list mode depending upon which punched cards are put into the card reader. Since the load mode of operation is controlled by a card reader, it will be apparent that the information on the magnetic drum may be readily changed as when a sorting pocket is assigned to a new individual. This is done by erasing the drum, substituting a new punched card into the card deck and re-operating the system in the load mode.

The circuits and apparatus shown in FIGS. 4a to 4k and 4m will first be described in general terms giving the purpose of the various logic modules and devices and will then be described in more detail in connection with description of operation of the system.

Referring to FIGS. 4a to 4k and 4m, there is shown a memory and control system for the sorting machine of FIG. 1. This system comprises means for registering name and pocket codes in the system. This means comprises a punched card reader CR shown schematically in FIG. 4a. Since card readers of this type are known, the details thereof have not been shown to avoid complicating the drawing. The photo-transistors of the card reader, which are activated when the holes in the card being read pass in front of the associated light sources, supply reading signals from their emitters to twelve output conductors numbered 1 through 9, 0, 11 and 12. Another photo-transistor, which is exposed to light through an aperture in the card pusher arm in the reader when the pusher arm starts moving and before the first column of holes is read, supplies a signal to output conductor 24 just before each card is read for the purpose of clearing and resetting certain apparatus hereinafter described. The aforementioned reader output signals are in the nature of negative pulses and vary from plus 9 to minus 10 volts. The card reader also supplies a blanking pulse to conductor 25 to delay operation of the card reader clutch and feeding of another card until the preceding card has passed through the reading head as hereinafter more fully described.

The twelve code signal carrying conductors marked 12, 11 and 0 through 9 are connected through a set of twelve current amplifiers to input terminals of a diode-type translator 26. The twelve current amplifiers at the input side of the translator can be AND units AU1 through AU12 of the logic type like that shown in detail in FIG. 5 and wherein only one input terminal is connected and the other input terminal and the common input terminal are left disconnected. The input terminals of these current amplifiers AU1–AU12 are connected through appropriate resistors R1–R12 of 100K ohms or the like to a source of plus 10 volts as shown in FIG. 4a.

The numeral 5 within the symbol of circuit AU1 indicates the figure of the drawing wherein this circuit is shown in detail. In a similar manner, the numerals within the other symbols in FIGS. 4a to 4k and 4m indicate the figures of the detail circuits.

Conductor 24 which carries the clear and reset signal from the card reader is also connected to a similar AND unit AU13. The input terminal of unit AU13 which is connected to conductor 24 is also connected through a similar resistor R13 to the plus 10 volt source.

Conductor 25 carries the aforementioned blanking pulse from the card reader to logic circuits in FIG. 4j to perform a delay control function in the card reader clutch control circuit during the reading of each card as hereinafter more fully described.

Translator 26 in FIG. 4a, operating in conjunction with the card reader, is provided with means for translating space codes appearing on the punched cards into numerical codes which are better adapted for utilization by the logic circuit system hereinafter described. The cards that are read by the card reader are preferably of the 80-column, 12-row type punched in standard Hollerith code. Although these cards have a total of 80 columns, only the first eight columns need be considered for the purposes of this invention. A five letter name code is punched in the first five columns and a three digit numerical pocket code is punched in the next three columns. These name and pocket codes utilize only eight columns in the twelve rows on the cards. The remaining columns 9 through 80 may be used for other purposes not material to this invention.

The aforementioned standard space code appearing on the cards consists of two punched holes per column for each letter of the name code in the first five columns and one punched hole per column for each numerical digit of the pocket code in the next three columns. Any letter of the alphabet may be punched in any one of the first five columns by punching two holes at the appropriate rows therein. Also, any numerical digit from 0 through 9 may be punched in any one of the next three columns by punching one hole at the appropriate row 0–9 therein.

The twelve conductors marked 12, 11 and 0 through 9 leaving the card reader and being connected through amplifiers to the left side of translator 26 correspond to the twelve rows on the punched cards. The first eight columns on each punched card activate selected groups of these twelve conductors in repetitive sequence as the card is read.

Translator 26 has a multiple AND logic circuit at the upper portion of FIG. 4a for inserting name codes thereinto from the card reader. One such AND circuit is provided for each letter of the alphabet. The translator also has a first multiple OR logic circuit at the lower portion of FIG. 4a for translating the name codes into binary codes. One such OR circuit is provided for each bit of the binary number. The translator further is provided with another multiple OR logic circuit at the upper left-hand portion of FIG. 4c for translating decimal pocket numbers into binary coded decimal pocket codes. One such OR circuit is provided for each bit of the binary coded decimal number.

Figure 4C:
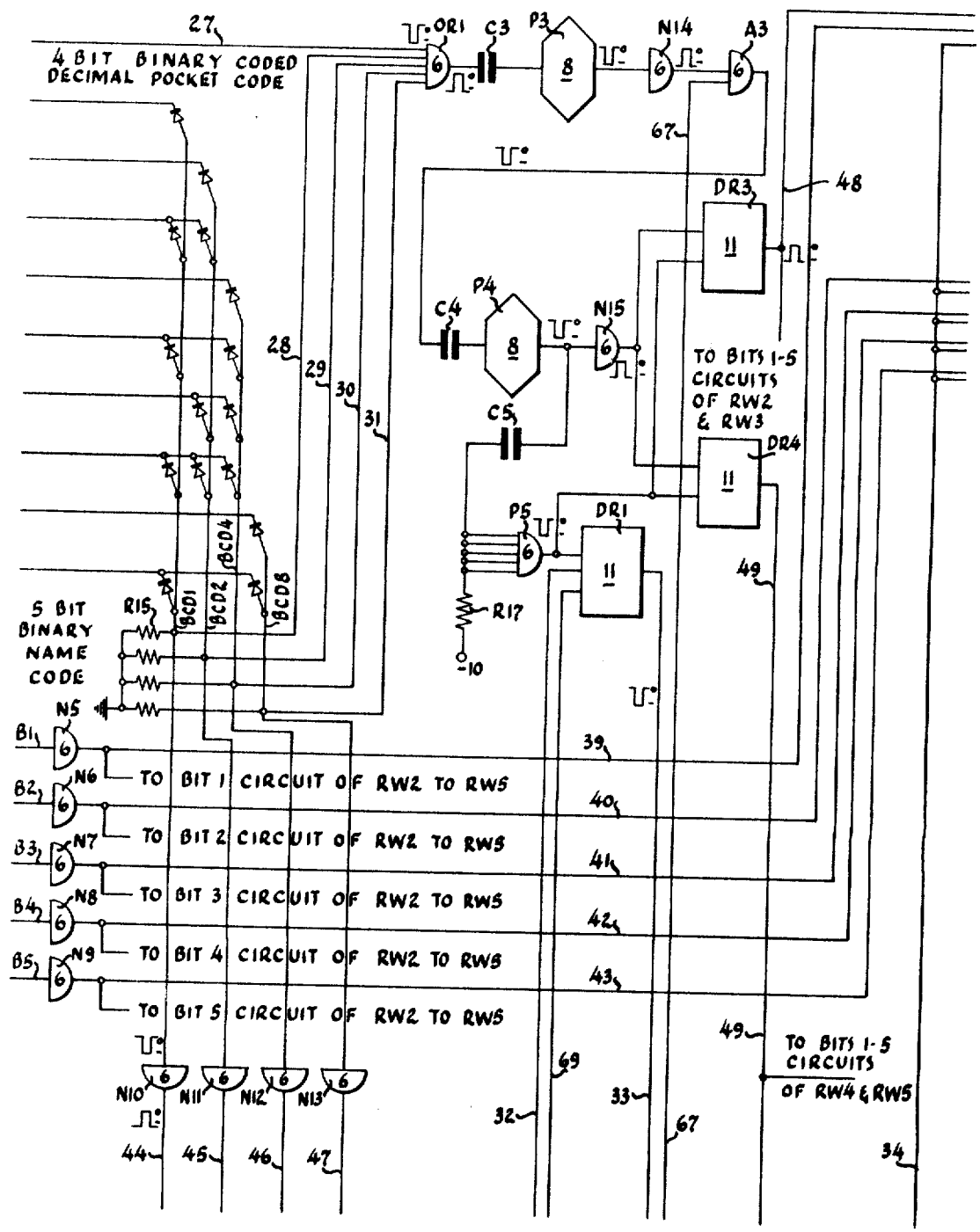

The nature of the space codes on the punched cards required to activate these twelve input conductors of the translator will be readily apparent from an inspection of the translator in FIGS. 4a and 4c. This translator comprises 26 columns of diodes connected to 26 vertical conductors indicative of the letters A–Z of the alphabet as shown at the top of the translator. Input conductor 12 is common to letters A–I, input conductor 11 is common to letters J–R and input conductor O is common to letters S–Z. To this end, input conductor 12 is connected through nine diodes to the first nine vertical conductors, respectively. Input conductor 11 is similarly connected through nine diodes to the next nine vertical conductors. And input conductor 0 is similarly connected through eight diodes to the last eight vertical conductors. Input conductors 1–9 are connected by respective diodes to the first nine vertical conductors and are connected by respective diodes to the next nine vertical conductors and input conductors 2–9 are connected through respective diodes to the last eight vertical conductors. The aforementioned diodes are arranged in their forward, low impedance direction to connect the twelve input conductors to the vertical conductor of the translator.

The 26 vertical conductors of the translator are connected through respective resistors R14 to a source of negative voltage such as minus 10 volts or the like.

It will be apparent that the portion of the translator hereinbefore described has 26 AND circuits, each consisting of a pair of input conductors connected through a pair of diodes to a vertical conductor. In these AND circuits, a negative voltage must be applied to both inputs before a negative voltage output is obtained.

The translator is provided with a first set of output conductors B1 through B5 shown in FIG. 4c for providing a 5-bit binary code in response to each letter, input code. For this purpose, output conductors B1–B5 are connected through diodes in their forward, low impedance direction in binary code fashion to the 26 vertical conductors A–Z so that the 26 input codes indicative of letters A–Z of the alphabet provide binary output codes 10000(1) through 01011(26), respectively. To this end, output conductor B1 is connected through respective diodes to alternate vertical conductors A, C, E, G, I, K, M, O, Q, S, U, W and Y. Output conductor B2 is connected through respective diodes to alternate pairs of vertical conductors B and C, F and G, J and K, N and O, R and S, V and W and Z. Output conductor B3 is connected through respective diodes to alternate sets of four vertical conductors D, E, F, G and L, M, N, O and T, U, V, W. Output conductor B4 is connected through respective diodes to vertical conductors H through O and X, Y and Z. And the last output conductor B5 is connected through respective diodes to vertical conductors P through Z. These connections provide a multiple OR logic circuit wherein an output conductor may be energized from different sets of input conductors through one or more vertical conductors.

The name code output portion of the translator hereinbefore described comprises a multiple OR logic circuit for connecting the 26 vertical conductors to five output conductors B1–B5. There are a total of five OR circuits, each consisting of a plurality of vertical conductors connected through respective diodes in their high impedance direction to an output conductor. A negative voltage on any vertical conductor will provide an output on those output conductors B1–B5 to which it is connected by diodes.

Since the vertical conductors A–Z are connected at their lower ends through resistors R14 to a negative voltage, to obtain a negative voltage output, the input signals must be negative voltages. For example, an input space code indicative of the letter A is inserted in the translator by applying negative voltage pulses to input conductors 12 and 1. This provides a negaive voltage on output conductor B1 indicative of binary code 1. In the binary output code, 1 is indicated by a negative voltage and 0 is indicated by ground potential. Thus, the aforementioned input code indicative of the letter A provides a binary output code 1. This binary output code is indicated by a negative voltage on output conductor B1 and ground potential on output conductors B2–B5.

Both input conductors in accordance with an input code must have a negative voltage to afford an output from the translator. In the aforementioned example, it will be apparent that if input conductor 12 has a negative voltage and input conductor 1 is at ground potential, output conductor B1 will have ground potential, that is, no output signal. It is only when a proper input code is applied that a binary output code is obtained.

The binary output codes appearing on conductors B1–B5 in sequence represent the five letters of the name code read from the first five columns of the punched card.

Translator 26 is provided with another output shown at the right-hand side thereof for providing, in sequence, the three digits of a three-digit numerical pocket code read from columns 6, 7 and 8 of the punched card. The translator changes the decimal space code into a 4-bit binary coded decimal pocket code. To this end, the translator is provided with four output conductors BCD1, BCD2, BCD4 and BCD8 indicative of binary coded decimal (BCD) bits 1, 2, 4 and 8. Output conductors BCD1–BCD8 are connected through groups of diodes in their forward, low impedance direction to input conductors 0 through 9 to provide four OR logic circuits. Output conductor BCD1 is connected through respective diodes to input conductors 1, 3, 5, 7 and 9 as a first OR circuit. Output conductor BCD2 is connected through respective diodes to input conductors 2, 3, 6 and 7 as a second OR circuit. Output conductor BCD4 is connected through respective diodes to input conductors 4, 5, 6 and 7 as a third OR circuit. And output conductor BCD8 is connected through respective diodes to input conductors 8 and 9 as a fourth OR circuit. These connections provide a multiple OR logic circuit wherein an output conductor may be energized from one or more of a plurality of input conductors.

The aforementioned connections will cause an input signal on any one input conductor 1–9 to provide an output signal on one or more of the output conductors in binary coded decimal fashion. For example, ground potentials on the four output conductors indicates zero. A negative input voltage on conductor 1 provides a negative output voltage on conductor BCD1. A negative input voltage on conductor 2 provides a negative output voltage on conductor BCD2. And a negative input voltage on conductor 3 provides negative output voltages on conductors BCD1 and BCD2, etc.

In the aforementioned manner, the right-hand portion of the translator changes the digits of a three-digit decimal space code in sequence into binary coded decimal codes. If the three digit input code contains a zero, this zero will not be translated but will be passed through the translator and through its output conductor 27 for the purpose of operating a stepper one step, this stepper being provided for the purpose of distributing the sequentially transmitted name codes and pocket codes to respective sets of read-write circuits as hereinafter described.

This conductor 27 is connected to a first input terminal of an OR logic circuit OR1 which is a 5-leg logic of the phase inverting type as shown in FIG. 6. The four pocket code output conductors of translator 26 are connected through respective resistors R15 to ground potential. These four output conductors are also connected through conductors 28, 29, 30 and 31 to the other four input terminals of logic circuit OR1 for operating the aforementioned stepper each time that the card reader reads a column on the punched card.

For the purpose of distributing the successive codes of the five letter name codes and three digit pocket codes to eight registers, there are provided a pair of stepper units ST1 and ST2 shown in FIG. 4b. These are five-step stepper units as shown in detail in FIG. 7 and are connected to one another for successive stepping from one to eight whereafter they are reset. Stepper unit ST1 is arranged to step from 1 to 5 and stepper unit ST2 is arranged to step from 6 to 8 and to then provide an output signal from its step 9 output to prevent more than eight codes from being read or recorded.

It will be apparent from the foregoing that the stepper units must be reset to zero position before each card is read by the card reader. To this end, output conductor 24 of the card reader is connected to current amplifier AU13 in FIG. 4b to provide a reset or "clear" signal each time the card pusher arm starts to push a card into a reading pass. The stepper units require a short "clear" pulse to restore them to their zero positions and a longer "set" pulse must be applied to stepper unit ST1 to set it to its first operation position preparatory to reading the first column on a punched card. These pulses are formed by a pair of pulsers P1 and P2 supplied from amplifier AU13 through a phase inverting NOT logic circuit N1 which is similar to that shown in detail in FIG. 6 except that it has only one input. A pair of input capacitors C1 and C2 are provided having different capacitance values to provide pulses of different length. As a precaution against noise or extraneous disturbances from affecting the steppers, the clear and set pulses are gated through a pair of AND logic circuits A1 and A2. Pulsers P1 and P2 are similar to that shown in detail in FIG. 8, except that the input capacitors are of different sizes. A pair of NOT logic circuits N2 and N3 shown in detail in FIG. 6, are provided for inverting the phase of the pulses so that they can be gated by the AND circuits. A pair of flip-flop circuits FF1 and SFF1 are connected in parallel with the pulsers to provide gating pulses to the AND circuits. These AND circuits are like that shown in detail in FIG. 6 except that they have only two inputs. Flip-flop circuits FF1 and SFF1 are like those shown in detail in FIGS. 9 and 10, respectively.

In order to have enough power to clear all stages of the steppers, the shorter pulse is applied through a conductor 32 in FIGS. 4b–d to a driver circuit DR1 shown in detail in FIG. 11 wherein it is raised in power and is then applied through a conductor 33 to the stepper units to restore them to their zero positions. An input resistor R16 is provided for coupling the longer pulse to the set input terminal of stepper ST1.

The aforementioned circuits operate to clear the steppers and set stepper unit ST1 to its first position. In this position, the stepper controls the first one of eight sets of read-write circuits RW1–RW8, there being five read-write circuits in each of the first five sets for registering the five-bit binary codes for the five-letter name code, two read-write circuits in the sixth set for registering the hundreds digit of the pocket code, and four read-write circuits in each of the seventh and eighth sets for registering the tens and units digits of the pocket code. For this purpose, output terminal 1 of stepper ST1 is connected through a conductor 34 and its multiples as shown in FIGS. 4b–4e to the five read-write circuits in the first group RW1 thereof to condition these circuits for receipt of the first letter of the name code. This first output terminal of the stepper is also connected partly through conductor 34 and through conductor 35 to a logic system in FIG. 4j for developing a signal which resets the memory flip-flops in all of the read-write circuits as hereinafter described.

Figure 4E:
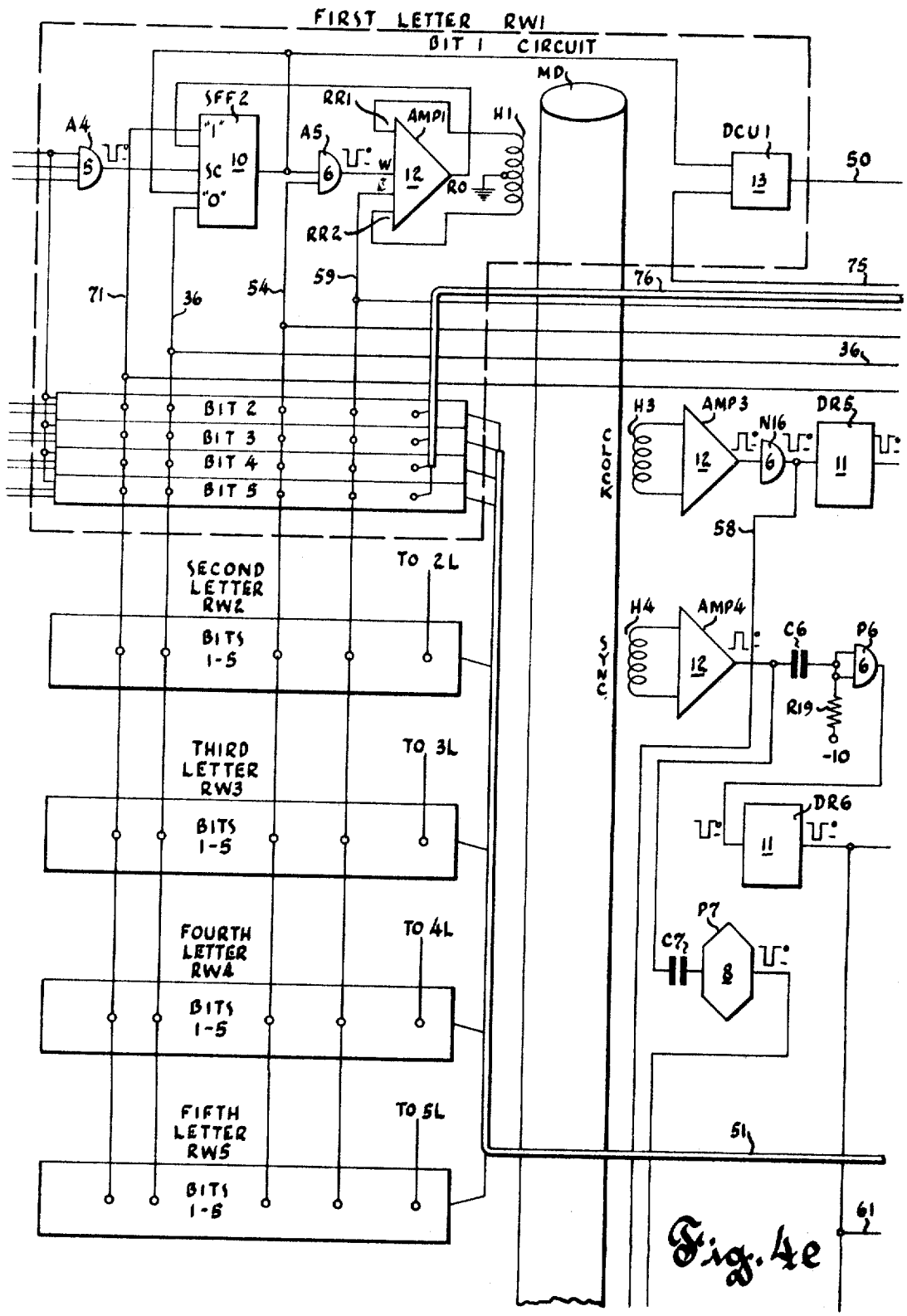
Figure 4F:
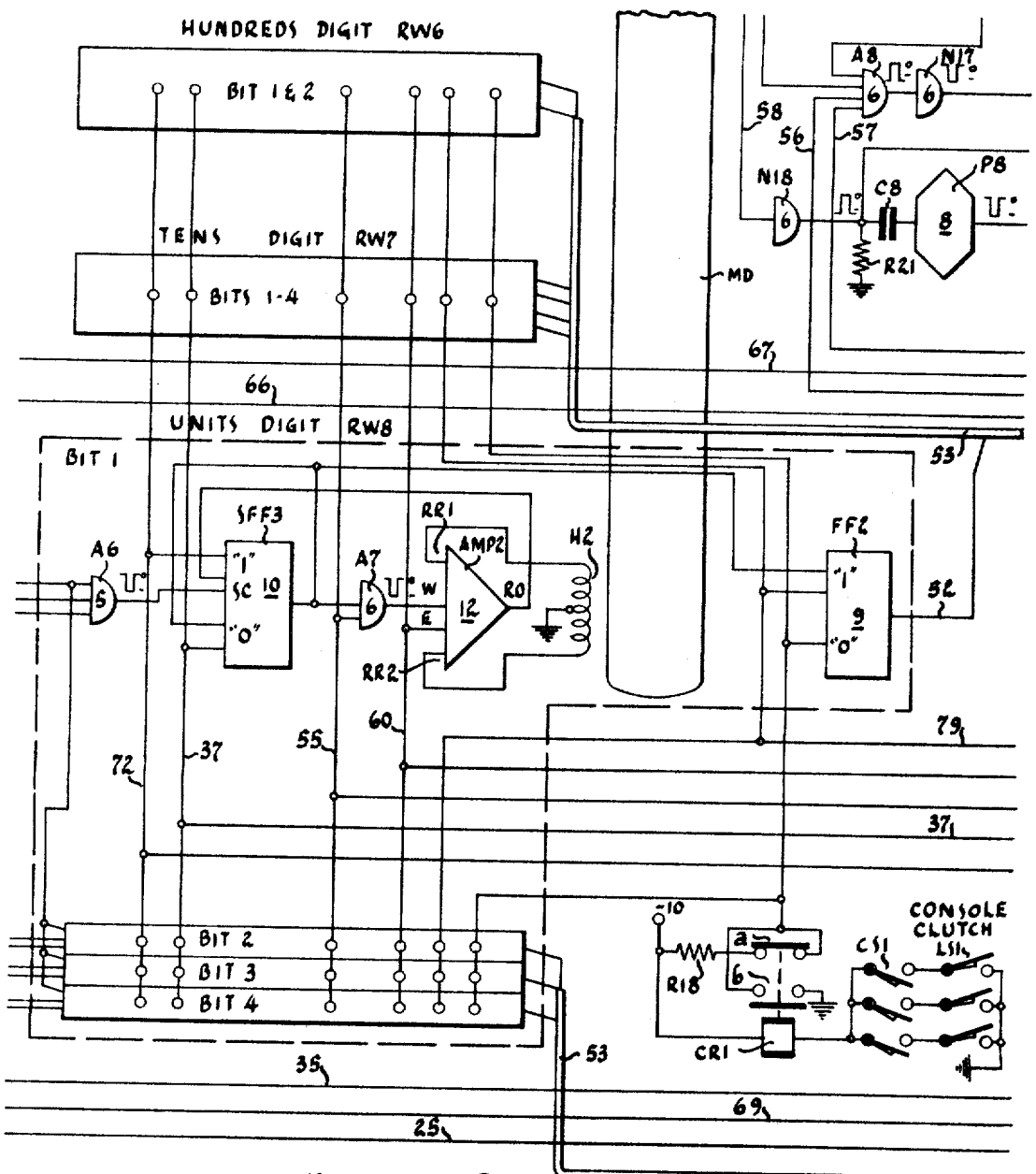
Figure 4H:
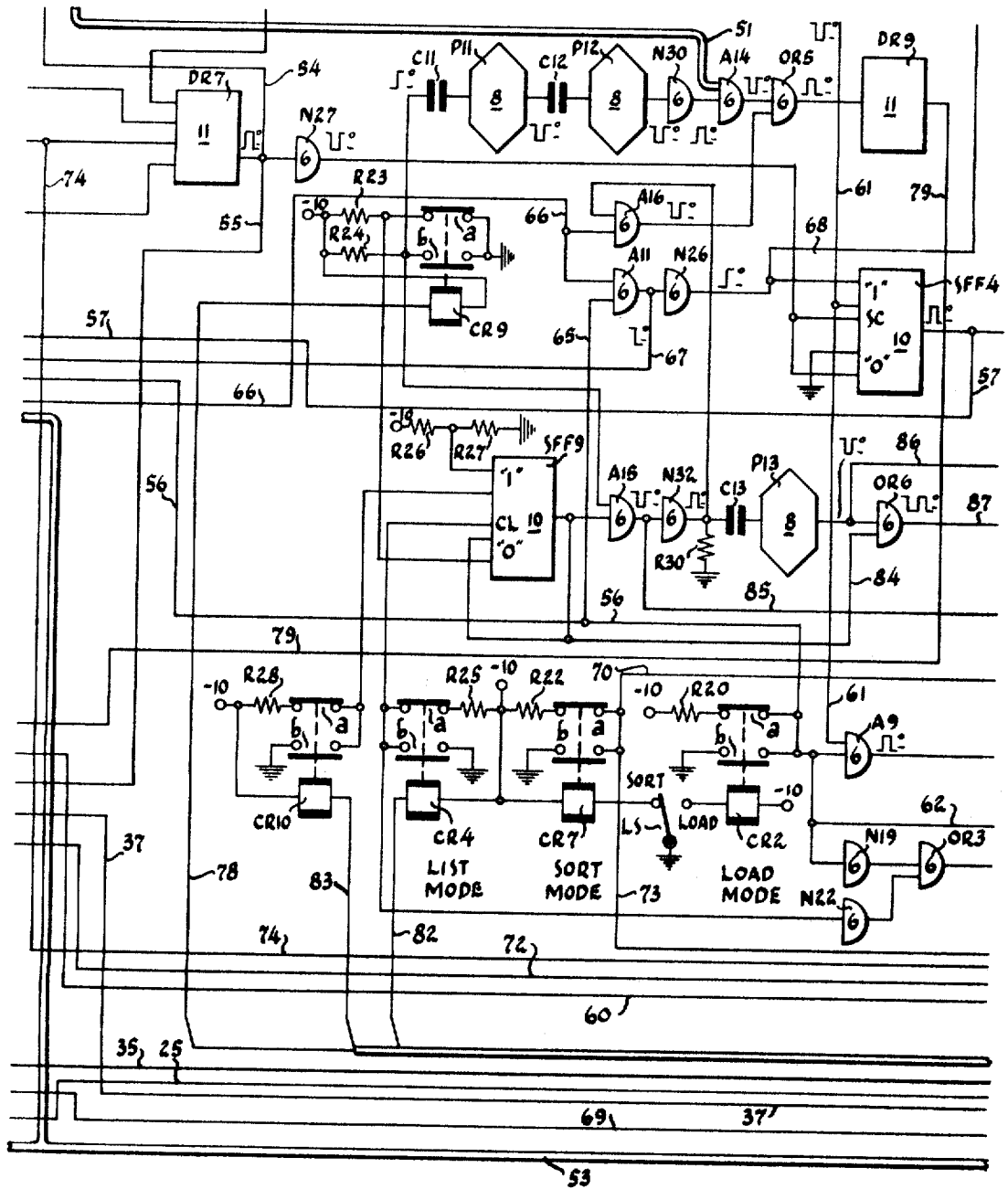
Figure 4I:
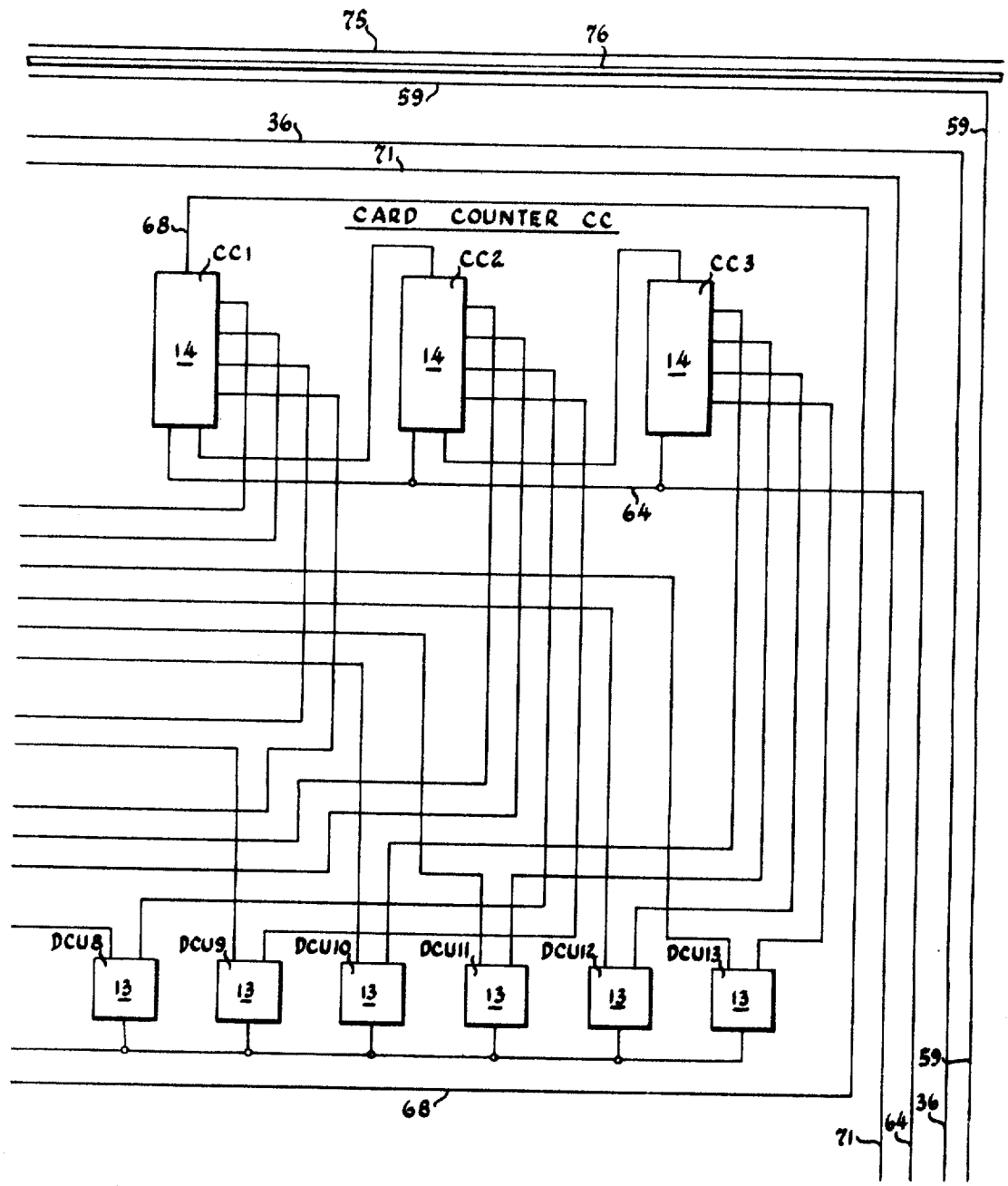
Figure 4J:
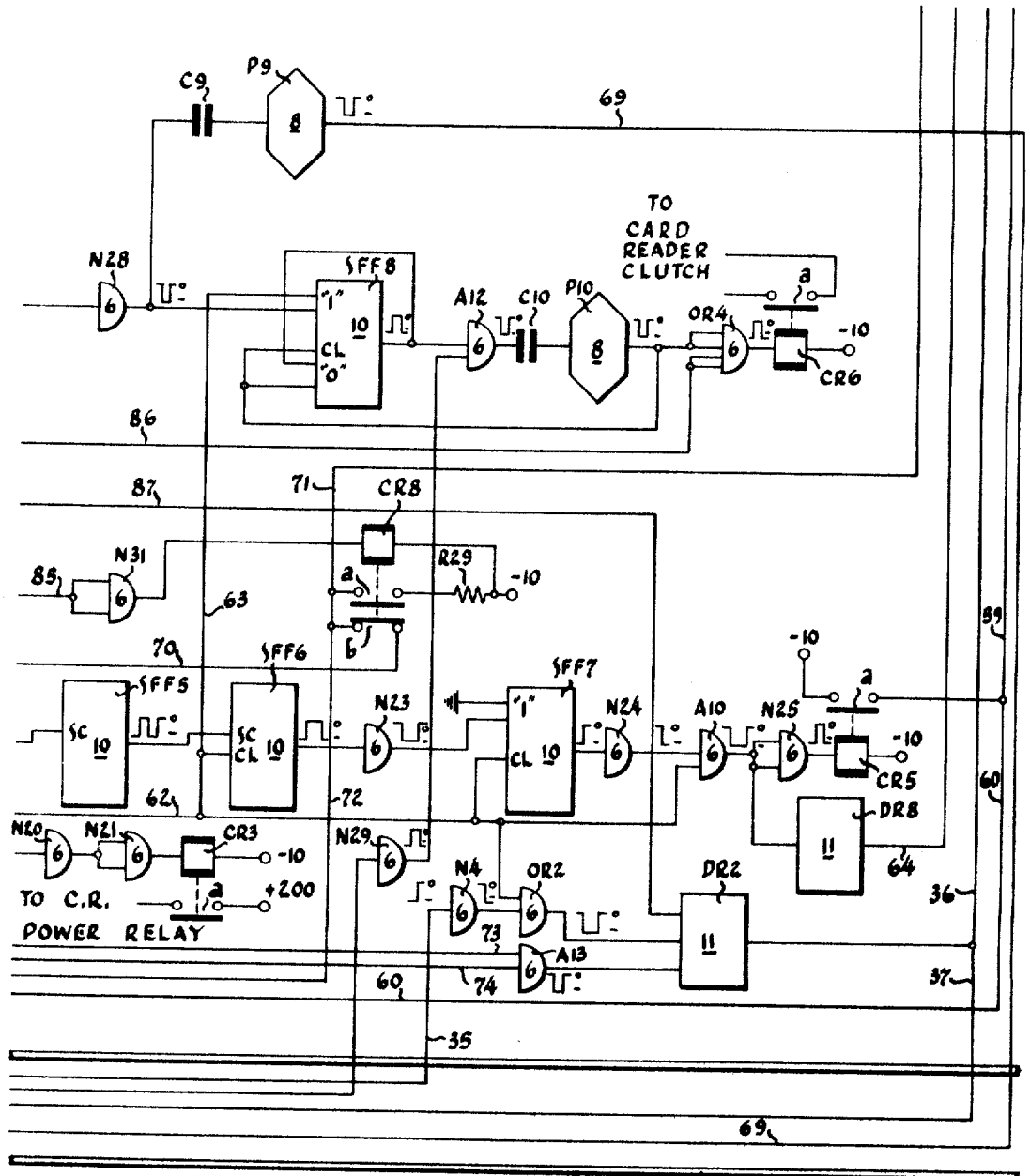

This logic system connected to conductor 35 in FIG. 4j comprises a NOT logic circuit N4, an OR logic circuit OR2 and a driver DR2 connected in series, the latter being for raising the power of the reset signal which is then connected through conductor 36 to all of the read-write circuits in sets RW1–RW5 thereof and is connected through conductor 37 to all of the read-write circuits in sets RW6–RW8 thereof.

As indicated by the legends in FIG. 4b, output terminals 2 through 7 of the stepper are similarly connected to sets RW2–RW7 of read-write circuits so that the sets of read-write circuits are conditioned in sequence as the stepper is stepped. Output terminal 8 of the stepper is connected through a conductor 38 and its multiples to the units digit read-write circuits RW8 as shown in FIGS. 4b, 4d and 4f.

Name code output conductors B1–B5 of the translator are connected to NOT logic circuits N5–N9, respectively, for inverting the phase of the binary code pulses. These NOT circuits are in turn provided with output multiples to sets RW1–RW5 of read-write circuits. As shown in FIGS. 4c and 4d and indicated by legends adjacent NOT circuits N5–N9, the latter are connected through conductors 39, 40, 41, 42 and 43 to the five read-write circuits, respectively, in set RW1 and to correspondingly respective read-write circuits in each of groups RW2–RW5 for transmitting name codes thereto in sequence.

Pocket code output conductors BCD1, BCD2, BCD4 and BCD8 of the translator are connected to NOT logic circuits N10–N13, respectively, for inverting the phase of the binary coded decimal pulses. The NOT circuits are connected through conductors 44, 45, 46 and 47 to the four read-write circuits, respectively, in units digit set RW8 thereof and to correspondingly respective read-write circuits in tens digit set RW7 as indicated by the legends in FIG. 4d. Since hundreds digit set RW6 has only two read-write circuits, only conductors 44 and 45 are connected thereto as indicated by the legends in FIG. 4d.

It will be apparent from the foregoing, that two hundredths digit read-write circuits, four tens digit read-write circuits and four units digit read-write circuits provide for a capacity of 399 binary coded decimal pocket codes. It may be assumed that the system has a capacity for 2998 name codes determined by this number of channels or recording positions on the magnetic drum. While other parts of the system could accommodate many more permutations of the alphabet taken five letters at a time, practical limits are placed on the number of name codes that it can actually handle by the capacity of the drum. Thus, the drum can store 2998 different name codes and one of the pocket codes of the sorter along with each name code. Assuming that a given sorting machine has 300 sorting pockets aside from a zero bin and the like, then there will be an average of substantially 10 name codes assigned to each pocket. However, under actual operating conditions, the number of name codes assigned to a pocket will vary depending on the requirements of each sorting situation.

Referring again to FIG. 4c, it will be apparent that as each letter of the name code and each digit of the pocket code is read by the card reader and changed into binary form or binary coded decimal form by translator 26, stepper units ST1 and ST2 must be stepped to condition successive sets of read-write circuits for receipt of the coded information. For this purpose, there is provided a pulse shaper circuit which shapes and centers the translator output pulses into desirable form for operating stepper units ST1 and ST2. This pulse shaper circuit comprises a pulser P3 (FIGS. 4c and 8) supplied through an input capacitor C3 from circuit OR1 and being connected to driver DR1 through a NOT logic circuit N14 (FIG. 6) which inverts the phase of the pulser output, an AND logic circuit A3 (FIG. 6) for gating eight pulses and for blocking additional pulses when eight columns have been read, a second pulser P4 supplied through an input capacitor C4 for centering the pulse, and a logic circuit like that shown in detail in FIG. 6 externally modified to function as a pulser P5. This modification consists of connecting all five input terminals together and through a resistor R17 to a negative 10 volt source and supplying this pulser through an input capacitor C5. The output of pulser P5 is connected through amplifying driver DR1 and conductor 33 to stepper units ST1 and ST2.

It will be apparent from FIG. 4c that each of the read-write circuits has an AND logic with three input terminals. One of these input terminals receives the information code, that is, the binary number indicative of a letter of the name code or the binary coded decimal number indicative of a digit of the pocket code. Another one of these input terminals receives the stepper signal whereby the information codes are gated in succession to the eight sets of read-write circuits. The third one of these input terminals receives a common signal. That is, a gating pulse is applied to these third input terminals of all of the read-write circuit and logics to condition them for response to the other two signals at the proper times.

The common signal applying means in FIG. 4c comprises a NOT logic circuit N15, like that shown in FIG. 6 but having only one input, connected to the output of pulser P4 for inverting the phase of the pulse. A pair of drivers DR3 and DR4, shown in detail in FIG. 11, are provided for amplifying the inverted pulse and applying it to the read-write circuits. As shown in FIG. 4c, driver DR3 is connected through conductor 48 and its multiples to the AND logics of the five read-write circuits in set RW1 thereof. As indicated by the legends, driver DR3 is also connected to the read-write circuits in sets RW2 and RW3 in a similar manner. Driver DR4 is connected to the four read-write circuits of units digit set RW8 through conductor 49 and its multiples. As indicated by the legends adjacent conductor 49, driver DR4 is also connected to the read-write circuits in sets RW4, RW5, RW6 and RW7 in a similar manner, these connections not being shown to avoid complicating the drawings. The output of pulser P5 is also connected to the inputs of drivers DR4 and DR3 for terminating the common signal for reasons hereinafter described.

The name code read-write circuits differ in structure from the pocket code read-write circuits since they perform different functions. For this reason, one name code read-write circuit and one pocket code read-write circuit have been shown in detail and the remainder thereof have been illustrated by rectangles to avoid unnecessary duplication.

As shown in FIG. 4e, there are five sets RW1–RW5 of name code read-write circuits each having five read-write circuits for a total of twenty-five. Five read-write circuits are provided in each set thereof because a five bit binary code is used for the letters of the name code. Five sets are provided because a five letter name code is used. These read-write circuits in each set are marked bit 1 through bit 5 to associate them with the five bits of the binary code received from the translator output conductors B1 through B5, respectively.

There are three sets RW6 through RW8 of pocket code read-write circuits in FIG. 4f arranged in a column below the five sets of name code read-write circuits. Since the sorting machine is intended to have a desired number of sorting pockets between 300 and 399 and because binary coded decimal pocket codes are used, only ten pocket code read-write circuits are required. That is, set RW6 is provided with two read-write circuits to accommodate the two bits of the hundreds code from 0 to 3. Set RW7 is provided with four read-write circuits to accommodate the four bits of the tens digit from 0 to 9. And set RW8 is likewise provided with four read-write circuits to accommodate the four bits of the units digit from 0 to 9. As will be apparent, a pocket code 399 may be indicated by operating bits 1 and 2 circuits of hundreds digit set RW6, bits 1 and 8 circuits of tens digit set RW7 and bits 1 and 8 circuits of units digit set RW8.

While twenty-five name code read-write circuits and ten pocket code read-write circuits have been shown, it will be apparent that the system is not restricted thereto but may utilize more or less thereof as desired depending upon the capacity of the sorting machine and the magnetic drum.

Figure 5:
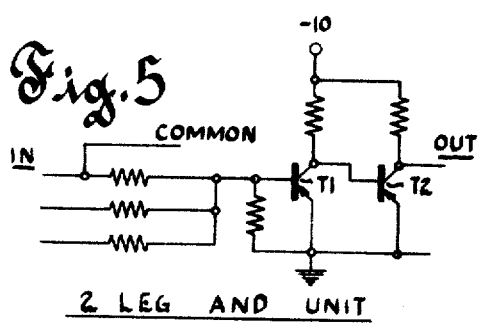

As shown in FIG. 4e, the read-write circuit for bit 1 of the first letter of the name code in set RW1 comprises an AND logic circuit A4 having three inputs for receiving the common pulse, the name code pulse and the stepper signal hereinbefore described, this AND circuit being shown in detail in FIG. 5. A memory flip-flop circuit SFF2 (FIG. 10) is connected to the AND circuit for registering the first bit of the first letter binary code under load mode operation and for registering the first bit of the first letter binary code read under sort mode operation. An AND logic circuit A5 of the phase inverting type shown in detail in FIG. 6 is provided for controlling writing of such first bit in the proper row on a magnetic drum MD as determined by synchronizing and clock pulses hereinafter described. This circuit is also provided with a read-write amplifier AMP1, shown in detail in FIG. 12, connected to the output of AND circuit A5. This amplifier is connected across a center-grounded coil of a read-write head H1 for writing, reading and erasing purposes. This circuit is further provided with a digital coincidence unit DCU1 for controlling the extraction of a pocket code from the magnetic drum when the corresponding name code being read from the drum matches the name code inserted into the system from the console keyboard. For this purpose, the digital coincidence circuit, shown in detail in FIG. 13, is provided with two inputs, one being connected to flip-flop SFF2 for receiving the binary bit read from the drum and the other input being connected to the buffer storage relays controlled by the keyboard as hereinafter described. The single output of this digital coincidence circuit is connected through a conductor 50 and cable 51 to a logic circuit hereinafter described which control the pocket code read-write circuits. The output of the digital coincidence circuits in the other twenty-four name code read-write circuits are similarly connected through cable 51 to the same logic circuit as hereinafter more fully described. The specific manner in which the aforementioned components of the name code read-write circuits function will become apparent from the description of operation hereinafter appearing.

The read-write circuit for bit 1 of units digit set RW8 for the pocket code in FIG. 4f comprises an AND logic circuit A6 having three inputs for receiving the common pulse, the pocket code pulse and the stepper signal hereinbefore described, this AND circuit being shown in detail in FIG. 5. A memory flip-flop circuit SFF3 (FIG. 10) is connected to the AND circuit for registering the first bit of the units digit, binary coded decimal code under load mode operation, sort mode operation and list mode operation. An AND logic circuit A7 of the phase inverting type shown in detail in FIG. 6 is provided for controlling writing of such first bit in the proper row on the magnetic drum as determined by the aforementioned sync and clock pulses. This circuit is also provided with a read-write amplifier AMP2, shown in detail in FIG. 12, connected to the output of AND circuit A7. This amplifier is connected across a center-grounded coil of a read-write head H2 for writing, reading and erasing purposes.

It will be apparent that the portion of the pocket code read-write circuit so far described is similar to the corresponding part of the name code read-write circuit hereinbefore described. It differs, however, in having a flip-flop circuit FF2 at its right-hand portion rather than a digital coincidence circuit. Flip-flop FF2 is shown in detail in FIG. 9 and has a pair of upper left-hand input terminals, a lower left-hand reset terminal and a right-hand output terminal. Flip-flop FF2 transmits the pocket code to the code setter solenoids at the proper time as hereinafter more fully described. For this purpose, the flip-flop input terminals are connected to flip-flop SFF3 and to the aforementioned logic circuit, respectively, which logic circuit supplies a pulse when a coincidence of name codes is detected. The reset terminals of flip-flop FF2 and the other nine pocket code output flip-flops in FIG. 4f are connected through a normally closed contact a of a control relay CR1 and a resistor R18 to a negative voltage source and are connectable through normally open contact b of relay CR1 to ground potential. The operating coil of relay CR1 is connectable from this negative voltage source to ground potential through three parallel circuits each having a pair of normally open contacts in series. One of these contacts is a console cam switch contact CS1 and the other is a console clutch limit switch LS1, one of each for each console and the cam and limit switches for each console being in series connection. The output terminal of flip-flop FF2 is connected through a conductor 52 and a units digit bit 1 relay UR1 to a source of negative voltage. The outputs of the flip-flops in the other nine pocket code read-write circuits are similarly connected through cable 53 to the remaining units, tens and hundreds digit relays UR2, UR4, UR8, TR1, TR2, TR4, TR8, HR1 and HR2.

As shown in FIGS. 4g and 4i, there are provided a pair of counters including a clock pulse counter CPC and a card counter CC for controlling writing of name and pocket codes in their proper places on the drum. Clock pulse counter CPC comprises three counter units CPC1, CPC2 and CPC3 connected in tandem for binary counting. Card counter CC also comprises three similar counter units CC1, CC2 and CC3 connected in tandem for binary counting. Clock pulse counter CPC is arranged to count the recording spaces or rows on the drum during each revolution thereof and to be reset at the end of each revolution. Card counter CC is arranged to count the punched cards during load mode operation as they are read by the card reader. In this manner, coincidence pulses may be obtained from the two counters to control writing of the codes from successive cards into corresponding rows on the drum as the latter rotates.

Figure 14:
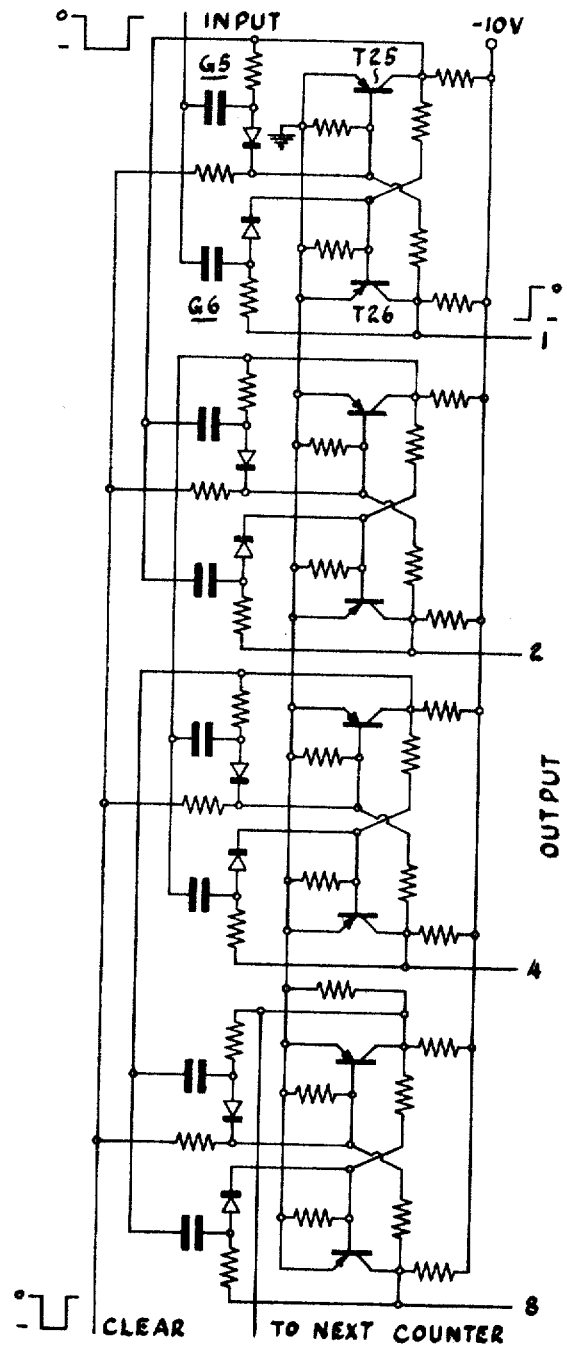

Each of these six counter units CPC1–3 and CC1–3 comprises a four-bit counter shown in detail in FIG. 14 and having a count pulse input terminal at the top, four output terminals for four bits of a binary number at the right-hand side and a reset or "clear" terminal at the bottom. The first two counter units of each set also have each a tandem connection terminal at the bottom connected to the input terminal of the succeeding counter unit.

The clock pulse counter is provided with means for transmitting clock pulses thereto from the drum. Assuming that the drum has 3000 recording rows for accommodating 2998 combinations of name and pocket codes, this means will transmit 3000 clock pulses to the counter each revolution. This means, shown in FIG. 4e, comprises a coil of a clock pulse reading head H3 mounted for reading magnetic clock pulse spots from the drum. The coil of head H3 is connected through an amplifier AMP3, a phase inverting NOT logic circuit N16 and an amplifying driver DR5 to the input terminal of unit CPC1 of the clock pulse counter.

The clock pulse counter is also provided with means for resetting it to zero count at the end of each revolution of the drum so that it can count again on the next revolution. This means, shown in FIG. 4e, comprises a coil of sync pulse reading head H4 mounted for reading a magnetic sync pulse spot from the drum once each revolution. The coil of head H4 is connected through an amplifier AMP4, a logic circuit such as shown in FIG. 6 modified to function as a pulser P6 by addition of an input capacitor C6 and a resistor R19 connecting the two inputs to a negative voltage source, and an amplifying driver DR6 to the reset terminals of the three units of the clock pulse counter.

Since each clock pulse counter unit CPC1–3 has a four-bit output, connection of the three units in tandem provides a counter having a twelve-bit binary output. Since the card counter units CC1–3 are similarly connected in tandem, this counter also has a twelve-bit output. In order to compare the outputs of the clock pulse counter and the card counter, there are provided a group of twelve digital coincidence units DCU2 through DCU13 similar to coincidence unit DCU1 in FIG. 4e. The twelve output terminals of the clock pulse counter are connected to first inputs of units DCU2–13, respectively. The twelve output terminals of the card counter are connected to second input terminals of units DCU2–13, respectively. The output terminals of the twelve digital coincidence units are connected to one another and to a first one of four input terminals of a driver DR7 in FIG. 4h to control the recording of the name and pocket codes in the proper place on the drum. For this purpose, the output of driver DR7 is connected through a conductor 54 to the lower input terminal of AND circuit A5 in the read-write circuit for bit 1 of the first letter of the name code and to similar points in the other name code read-write circuits in sets RW1 through RW5 thereof as indicated by the conductor multiple. The output of driver DR7 is similarly connected through a conductor 55 to the lower input terminal of AND circuit A7 in the read-write circuit for bit 1 of units digit set RW8 and to similar points in the other units, tens and hundreds digit sets RW8, RW7, and RW6 as indicated by conductor multiples.

Driver DR7 whose output is transmitted as a write pulse to the read-write circuits through conductors 54 and 55 as aforementioned is provided with a second input. This second input is provided to prevent recording in the zero position on the magnetic drum, to allow recording only when eight characters have been read from the punched card and to allow recording only in load mode of operation. This second input to driver DR7 is supplied from an AND logic circuit A8 having four inputs and a NOT logic circuit N17 of the phase inverting type in FIG. 4f. The first input to AND circuit A8 is supplied from driver DR6 in FIG. 4e. This is the sync pulse which occurs once each revolution in the zero position of the drum and which is also used to reset counter CPC. To insure that the write pulse is inhibited during the zero position of the drum, the output of sync pulse amplifier AMP4 is connected through an input capacitor C7 and a pulser P7 to the second input terminal of an AND circuit A8. To allow recording only in the load mode of operation, the third input of AND circuit A8 is connected through a conductor 56 to the junction between normally closed contact $a$ and normally open contact $b$ of load mode control relay CR2 in FIG. 4h. Contact $b$ is connected to ground potential and contact $a$ is connected through a resistor R20 to a negative 10 volt source. The operating coil of relay CR2 is connected between the negative 10 volt source and the "load" contact of a single pole double throw load-sort switch LS having its movable contact connected to ground potential. To allow recording only after eight characters have been read, the fourth input of AND circuit A8 in FIG. 4f is connected through a conductor 57 to the output of a flip-flop circuit SFF4 in FIG. 4h, the latter being controlled from the ninth position of stepper ST1–ST2 as hereinafter more fully described.

Driver DR7 in FIG. 4h is provided with third and fourth inputs to afford fine trimming of the write pulse width. For this purpose, the output of NOT circuit N16 in FIG. 4e is connected through a conductor 58 to a NOT logic circuit N18. The output of NOT circuit N18 is connected to the third input of driver DR7 and is connected through an input capacitor C8 and a pulser P8 to the fourth input of driver DR7. The output of NOT circuit N18 is also connected through a resistor R21 to ground potential.

In order to supply electrical operating power to card reader CR, there is provided a positive 200 volt source connectable through a normally open contact $a$ of a control relay CR3 to the card reader power relay as indicated by the legend in FIG. 4j. The circuit for energizing the operating coil of relay CR3 comprises a NOT logic circuit N19 in FIG. 4h having its input connectable through normally open contact $b$ of relay CR2 to ground potential. NOT circuit N19 is of the phase inverting type and is connected to a first input terminal of an OR logic circuit OR3. This OR circuit is required to afford operation of the card reader under either load mode or list mode of operation. Circuit OR3 is connected through a phase inverting NOT logic circuit N20 and a double-driven NOT logic circuit N21 and the operating coil of relay CR3 to a minus 10 volt source. NOT circuit N21 is like that shown in detail in FIG. 6 except that it has two inputs connected together to afford more power for operating relay CR3.

For list mode of operation, relay CR3 is provided with an alternative energizing circuit extending from ground potential through normally open contact $b$ of a list mode control relay CR4 and a phase inverting NOT logic circuit N22 to the second input terminal of circuit OR3 and then through the latter and circuits N20 and N21 to the operating coil of relay CR3.

Since load mode operation is for the purpose of recording information on the drum, it is necessary to erase any previously recorded information from the drum before such operation. For this purpose, there is provided in FIG. 4j an erasing control relay CR5 having a normally open contact $a$ for connecting minus 10 volt erasing current through conductor 59 to erase input terminal E of amplifier AMP1 in the read-write circuit for bit 1 of the first letter set RW1 and to similar points in the other name code read-write circuits as indicated by a multiple conductor in FIG. 4e. This erase current is also applied by the contact of relay CR5 through conductor 60 to erase input terminal E of amplifier AMP2 of the bit 1 read-write circuit of units digit set RW8 and to similar points in the other pocket code read-write circuits as indicated by conductor multiples in FIG. 4f.

To insure complete erasing of the drum, the erase current is applied for at least two revolutions thereof. For this purpose, the energizing circuit of the operating coil of relay CR5 is provided in FIG. 4h with an AND logic circuit A9 having two inputs. One of these inputs is connectable through normally open contact $b$ of relay CR2 to ground potential for starting the erasing action. The other input terminal is connected through conductor 61 to the output of driver DR6 in FIG. 4e for receiving sync pulses which control the circuit of relay CR5 to terminate the erasing action. To control erasing for at least two revolutions, AND circuit A9 is connected in series through two scaling flip-flop circuits SFF5 and SFF6 in FIG. 4j, a NOT logic circuit N23 of the phase inverting type, a flip-flop circuit SFF7, a NOT logic circuit N24 of the phase inverting type, and an AND logic circuit A10 and a NOT logic circuit N25 of the double driven, phase inverting type and the operating coil of relay CR5 to a minus 10 volt source. In the foregoing circuit, the output of logic A9 is connected to the scale input terminal SC of a flip-flop SFF5 and the output of the latter is connected to the scale input terminal SC of flip-flop SFF6. Ground potential is also connectable through contact $b$ of relay CR2 through conductor 62 to the clear input terminal of flip-flop SFF6, to the clear input terminal of flip-flop SFF7, to the upper input terminal of OR circuit OR2 and to the lower input terminal of AND circuit A10. Such ground potential is also connected from conductor 62 through conductor 63 to a set "1" input terminal of a flip-flop circuit SFF8 in the card reader clutch control circuit to condition the latter for operation. One set "1" input terminal of flip-flop SFF7 is connected to ground potential as shown so that this flip-flop can be operated by a signal from NOT circuit N23.

The output of AND logic circuit A10 in the erasing control circuit is also connected through an amplifying driver DR8 and a conductor 64 to the reset terminals of units CC1, CC2 and CC3 of card counter CC to restore the punched card counter to its zero position whenever the drum is erased.

The system shown in FIGS. 4a–4m is also provided with means for preventing more than eight characters from being read from a card, for allowing information read from a card to be written in the next available row on the magnetic drum, for resetting stepper ST1–ST2 and for controlling the card reader clutch to cause the card reader to feed another card only after the previous card has completed its reading pass.

For the above purposes, the junction of contacts $a$ and $b$ of load mode control relay CR2 in FIG. 4h is connected through conductors 56 and 65 to one input terminal of an AND logic circuit A11. The last step output terminal 9 of stepper unit ST2 in FIG. 4b is connected through a conductor 66 to the other input terminal of AND logic A11 for operating the latter after eight characters have been read as indicated by the stepper. The output of AND circuit A11 is connected through a conductor 67 to the other input terminal of AND circuit A3 in FIG. 4c to inhibit circuit A3 after eight characters have been read and registered in the read-write circuits.

The output of AND circuit A11 is connected through a phase inverting NOT logic circuit N26 to a set "1" input terminal of flip-flop circuit SFF4 and also through a conductor 68 to the input terminal of the first unit CC1 of card counter CC in FIG. 4i for counting each card that is read. The aforementioned conductor 61 which supplies sync pulses to the erasing circuit is also connected to the other set "1" input terminal of flip-flop SFF4 to allow the information to be written on the drum in the next available row as determined by the two counters CPC and CC and only after eight characters have been read. For this purpose, the output of flip-flop SFF4 is connected through the aforementioned conductor 57 to the fourth input terminal of AND circuit A8 in FIG. 4f.

For the purpose of resetting flip-flop SFF4, the ouput of write pulse driver DR7 in FIG. 4h is connected through a phase inverting NOT logic circuit N27 to set "0" input terminal thereof the other set "0" input terminal being connected to ground potential. To insure resetting of flip-flop SFF4, logic N27 is also connected to its scale input terminal.

For resetting stepper ST1–ST2 in FIG. 4b, the output of flip-flop SFF4 is connected through a phase inverting NOT logic circuit N28 in FIG. 4j, an input capacitor C9 and pulser P9 and a conductor 69 to the third input terminal of driver DR1 in FIG. 4c, the output of driver DR1 being connected to the stepper as aforementioned.

For operating the card reader clutch, the output of NOT logic N28 in FIG. 4j is also connected to a set "1" input terminal of flip-flop SFF8, the other set "1" input terminal of the latter being supplied with ground potential from conductor 63 as aforementioned. The output of flip-flop SFF8 is connected through a phase inverting AND logic circuit A12, an input capacitor C10 and pulser P10, a double-driven OR logic circuit OR4 and the operating coil of a card reader clutch control relay CR6 to a minus 10 volt supply. Relay CR6 is provided with a normally open contact $a$ for controlling the clutch to cause the card reader to feed another card as depicted by the legend adjacent thereto.

To delay feeding of the next card until the preceding card has completed its reading pass, the second input terminal of AND circuit A12 is supplied with a blanking pulse or signal from the card reader through conductor 25 and a phase inverting NOT logic circuit N29.

For resetting flip-flop SFF8, the output thereof is connected to a first reset "0" input terminal thereof. And the output of pulser P10 is connected to the second reset "0" input terminal of flip-flop SFF8 and to the "clear" input terminal of the latter to insure resetting.

The system is provided with means for conditioning it for sort mode operation. This means comprises the stationary contact of load-sort switch LS marked SORT in FIG. 4h. This contact is connected through the operating coil of a sort mode control relay CR7 to a minus 10 volt source. Relay CR7 is provided with a normally closed contact $a$ and a normally open contact $b$ connected to one another in series, contact $a$ being connected through a resistor R22 to the negative 10 volt source and contact $b$ being connected to ground potential.

In order to prepare the read-write circuits for operation in sort mode, the junction of the contacts of relay CR7 is connected through a conductor 70, a normally closed contact $b$ of a list mode control relay CR8 in FIG. 4j and then in two branches to the sets of name code read-write circuits RW1–RW5 and the sets of pocket code read-write circuits RW6–RW8, respectively. The first branch extends through conductor 71 to a set "1" input terminal of flip-flop SFF2 in the bit 1 circuit of set RW1 in FIG. 4e and through a multiple conductor to similar points in the other twenty-four name code read-write circuits. The other branch extends through conductor 72 to a set "1" input terminal of flip-flop SFF3 in the bit 1 circuit of set RW8 and through multiple conductors to similar points in the other nine pocket code read-write circuits.

In order to reset flip-flops SFF2 and SFF3 and corresponding memory flip-flops in the other read-write circuits, the junction of the contacts of sort mode control relay CR7 is connected through a conductor 73 to one input terminal of an AND logic circuit A13 in FIG. 4j. The other input terminal of AND circuit A13 is supplied with clock pulses from the output of NOT circuit N18 in FIG. 4f through a conductor 74 for resetting the read-write circuit flip-flops after each row on the drum is read.

To this end, the output of AND circuit A13 is connected to the third input terminal of driver DR2. The output of the latter is connected through conductor 36 as aforementioned to a reset "0" input terminal of flip-flop SFF2 in the bit 1 read-write circuit of set RW1 and through a multiple conductor to similar points in the other name code read-write circuits. The output of driver DR2 is also connected through conductor 37 to a reset "0" input terminal of flip-flop SFF3 in the bit 1 read-write circuit of set RW8 and through multiple conductors to similar points in the other pocket code read-write circuits.

Figure 4K:
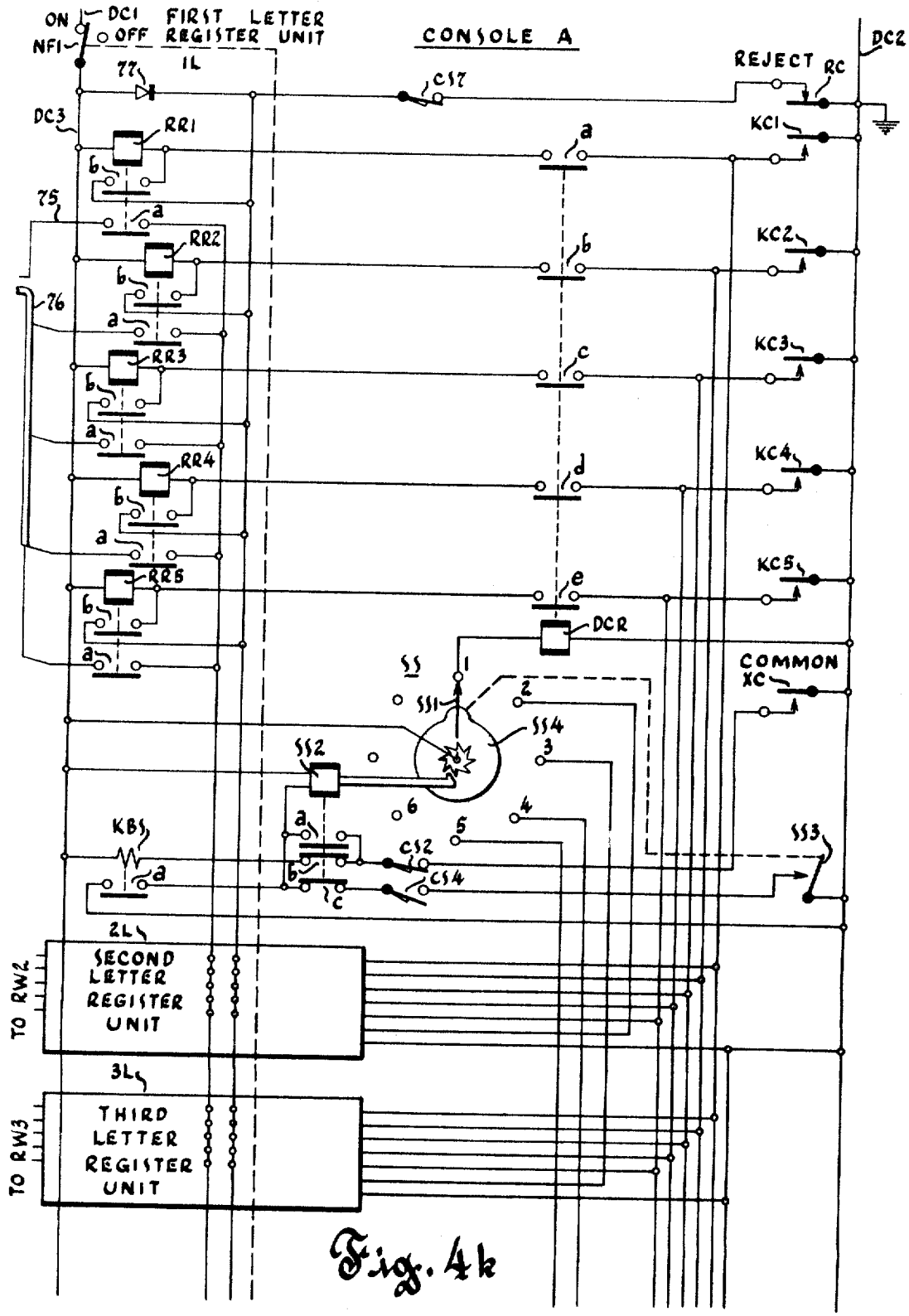

For sort mode operation, as shown in FIGS. 4k and 4m, each operator console is provided with a control circuit connected to the logic circuits hereinbefore described, the control circuit for console A being shown in detail. Since the control circuits for consoles B and C are similar to the control circuit of console A, they have been shown schematically as rectangles to avoid unnecessary duplication. The control circuit for consoles B and C is like that shown for console A except that the operating coils for the hundreds, tens and units digit relays which control the code setter solenoids are not repeated for the other two consoles. The relay operating coils shown in FIG. 4m are common to the three consoles and each such relay is provided with three contacts, one for each console.

As aforementioned, each console is provided with a keyboard whereby an operator inserts name codes into the system. As shown in the control circuit for console A, the keyboard is provided with a reject contact RC operable from a reject key for cancelling a registered code in the event a mistake has been made or for any reason. The keyboard is also provided with five code contacts KC1 through KC5 operable in binary code combinations from the alphabetical keys for storing letter codes of a name in a code register. The keyboard is further provided with a common contact XC automatically operable by the keyboard mechanism after each letter is keyed for operating a register distributor or stepper whereby the successive letter codes are registered on successive groups of register relays or the like.

The control circuit for console A is provided with direct current power lines CD1 and DC2 and alternating current power lines AC and N. A double-pole on-off switch has one contact NF1 for connecting supply line DC1 to conductor DC3 and another contact NF2 for connecting supply line AC to a coding control relay CCR operating coil. Contact NF2 also connects power to a feed table motor and a photocell control therefor as indicated by the legend adjacent thereto. It will be recalled that the feed table on the console has a conveyor whose motor is photo-electrically controlled to maintain a supply of letters within reach of the oscillating vacuum pickup arm.

The control circuit for console A also is provided with a code register or buffer storage device for temporarily storing the name code received from the keyboard until it can be utilized in the memory system. This code register comprises five units 1L through 5L for the respective five letters of the name code. Each such unit is provided with a group of five register relays RR1 through RR5 for the respective five bits of the binary code and a distributor control relay DCR having five normally open contacts $a$ through $e$ for connecting the five code contacts KC1–KC5 to the respectively associated group of register relays.

A distributor or stepping switch SS is provided for distributing the successive letter codes that are keyed to the successive register units. For this purpose, stepping switch SS is provided with a plurality of stationary contacts 1–5 connected through the operative coils of the distributor control relays DCR of the respective register units to line DC2 and a movable contact SS1 for engaging successively the stationary contacts to energize the distributor control relays in sequence as successive letter codes are received from the keyboard.

As shown in FIG. 4k, code contacts KC1–KC5 are connected to supply line DC2 and are connected through the five contacts of relay DCR to the operating coils of relays RR1–RR5, respectively, in the first letter register unit. Code contacts KC1–KC5 are also connected through sets of multiple conductors to the other four register units in a similar manner, these other four register units being shown schematically to avoid unnecessary duplication.

Stepping switch SS is provided with an operating solenoid SS2 and a pawl and ratchet mechanism for stepping the movable contact from one stationary contact to the next one and for resetting the stepping switch past any vacant contacts to contact 1. Stepping switch SS is further provided with an auxiliary contact SS3 and operating means therefore such as cam SS4 or the like for maintaining the auxiliary contact open in position 1 and for closing it in all other positions of the rotary stepping switch. The auxiliary contact permits restoration of the stepping switch to its starting position 1.

The keyboard is provided with a solenoid KBS controlled by common contact XC upon each keying operation. This keyboard solenoid in known manner closes selected ones of code contacts KC1–KC5 depending on which alphabetical key is pressed and is provided with a normally open contact a for controlling operating solenoid SS2 of the stepping switch. Operating solenoid SS2 is provided with interlocking contacts a, b and c for purposes hereinafter described in connection with description of operation of the system. One example of a keyboard usable in this system is a Soroban FK–2 Coding Keyboard which has alphabetical keys and provides binary output codes.

The control circuit for console A is also provided with a single-pole double-throw sort-list switch SL in FIG. 4m for conditioning the system for either sort mode or list mode operation.

A plurality such as ten code setter solenoids H1, H2, T1, T2, T4, T8, U1, U2, U4 and U8 are provided for conditioning the code setter for setting the code wheels in the sorting machine. As will be apparent, solenoids H1 and H2 are for hundreds digits, solenoids T1, T2, T4 and T8 are for tens digits and solenoids U1, U2, U4 and U8 are for units digits of the binary coded decimal sorter pocket code. A corresponding plurality of code control relays HR1, HR2, TR1, TR2, TR4, TR8, UR1, UR2, UR4 and UR8 are provided for selecting the respective code setting solenoids for operation. As shown in FIG. 4m, each code control relay is provided with a normally open contact in the circuit of its associated code setting solenoid. Each such code control relay is provided with two additional normally open contacts, not shown, in the circuits of the respectively associated code setting solenoids for consoles B and C.

The control circuit for console A is also provided with a common coding relay CCR having a normally open contact in series with all ten code setting solenoids for energizing those solenoids selected by the code control relays.

The photo-electric letter detector 22 hereinbefore mentioned in connection with FIG. 1 comprises a counter relay 22a connected across supply lines AC and N. As shown in FIG. 4m, counter relay 22a is controlled by a photo-cell 22b when a letter L passing from the console into the sorting machine interrupts a light beam emanating from a lamp 22c. Counter relay 22a is provided with a normally open contact 22d for controlling list mode of operation and is connected to the LIST stationary contact of sort-list manual switch SL. The movable contact of switch SL is connected to ground potential and the SORT stationary contact thereof is connected through a "memory break" contact CS66 of a console cam switch, a normally open contact a of a code sender relay MCR and then in parallel through the twenty-five normally open contacts of the register relays to the twenty-five digital coincidence circuits, respectively, of the name code read-write circuits. As shown specifically in connection with the first register unit 1L, this circuit extends from contact a of relay MCR through a contact a of register relay RR1 and a conductor 75 to the lower input terminal of digital coincidence circuit DCU1. Parallel connections extend from contact a of relay MCR through the contacts a of register relays RR2 through RR5 and cable 76 to the input terminals of digital coincidence circuits in the other four read-write circuits in set RW1 thereof. As indicated by legends adjacent register units 2L, 3L, 4L and 5L, like connections extend from relay MCR contact a through the contacts of the register relays therein to similar points in sets RW2 through RW5 of read-write circuits. Contacts b of the register relays are self-maintaining contacts. These maintaining contacts connect the respective operating coils of the register relays through a "clear" contact CS7 of the console cam switch and reject contact RC of the keyboard to line DC2. A unidirectional diode 77 is connected from conductor DC3 to contact CS7, that is, across the operating coils and self-maintaining contacts of the register relays for conducting current in response to the induced voltage of the operating coils when the maintaining circuit is interupted by contact CS7 or RC.

The aforementioned cam switch for console A is provided with seven contacts CS1 through CS7. Consoles B and C are provided with similar cam switches and the three cam switches are driven from the sorting machine conveyor in synchronism with the respective consoles. The three cam switches are arranged to operate 120 degrees apart from one another with reference to a revolution of the code setters and in synchronism with the respective code setters as shown in FIG. 15. In this manner, the three cam switches of the three consoles control the memory system so that each console can utilize every third space in the sorting machine conveyor and the three consoles utilize successive sets of three successive spaces in the conveyor.

For console A, contact CS1 of the cam switch is a "memory clear" contact shown in FIG. 4f and serves to reset the output flip-flops of the pocket code read-write circuits. This contact CS1 is connected in series with the console A clutch limit switch LS1 for operating relay CR1. Corresponding cam switch contacts and clutch limit switches for consoles B and C are shown in parallel connection therewith.

The remaining cam switch contacts CS2–CS7 only for console A are shown since they appear in the console control circuit and the console control circuits for consoles B and C are shown only schematically as rectangles. Cam switch contact CS2 is in the keyboard solenoid KBS energizing circuit in FIG. 4k and is a "keyboard open" contact which functions to prevent operation of the keyboard while the memory is being searched. Cam switch contact CS3 is a "memory" contact in the circuit of relay MCR in FIG. 4m and serves to transfer the letter codes from the registers to the name code read-write circuits. The console clutch also has a limit switch LS2 in the circuit of relay MCR to prevent energization of the latter unless the clutch is engaged. Cam switch contact CS4 in FIG. 4k is a "reset" contact in the circuit of auxiliary contact SS3 and operating solenoid SS2 of the stepping switch and serves to reset the latter to position 1 before the next keying cycle. Cam switch contact SC5 in FIG. 4m is a "coding" contact in the circuit of relay CCR and serves to energize the selected code setting solenoids. Cam switch contact CS6 in FIG. 4m is a "memory break" contact in the circuit for transferring the name code from the register and serves to terminate the transfer thereof. Cam switch contact CS7 in FIG. 4k in the register self-maintaining circuit is a "clear" contact and serves to clear the code from the register after it has been transferred.

The system is provided with means for searching the drum to find the pocket code which corresponds to the name code that has been inserted into the system from the console keyboard and for using this pocket code to control the code setter solenoids. To this end, code sender relay MCR in FIG. 4m is provided with a second normally open contact b for energizing a control relay CR9. This contact of relay MCR connects ground potential through a conductor 78 to the operating coil of relay CR9 in FIG. 4h, the other side of the latter being connected to a minus 10 volt source. In addition to initiating a search signal, relay CR9 operates the list mode control circuits hereinafter described.

For the above purposes, relay CR9 is provided with a normally closed contact a and a normally open contact b having one side thereof connected together and to ground potential as shown in FIG. 4h. The other sides of these contacts are connected through resistors R23 and R24, respectively, to the minus 10 volt source.

For initiating the aforementioned search signal, such other side of contact b of relay CR9 is connectted through an input capacitor C11 and a pulser P11 for delaying the signal. The output of pulser P11 is connected through an input capacitor C12 and a pulser P12 and a phase inverting NOT logic circuit N30 to one input of an AND logic circuit A14. The purpose of pulser P12 and its input capacitor is to provide a signal long enough to search at least one revolution of the drum. The other input of AND circuit A14 is connected to the output of all of the digital coincidence circuits in the twenty-five name code read-write circuits RW1 through RW5. The output of AND circuit A14 is connected to a first input of a phase-inverting OR logic circuit OR5, the other input of the latter being connected to list mode control circuits hereinafter described.

The output of circuit OR5 is connected through an amplifying driver DR9 and a conductor 79 to a set "1" input terminal of output flip-flop FF2 in the bit 1 pocket code read-write circuit of units digit set RW8 in FIG. 4b. This driver output is also connected from conductor 79 through multiple conductors to similar points in the other units, tens and hundred digit read-write circuits in sets RW6 through RW8.

In the control circuit for console A in FIG. 4m, pole NF2 which connects supply line AC to the operating coil of relay CCR also connects this supply line to a conductor 80. Supply line N is connected to a conductor 81. These two conductors 80 and 81 supply alternating current power to the feed table motor and photocell control for this motor as indicated by the legend adjacent thereto.

In addition to the circuits for controlling load mode and sort mode operations described above, the system is provided with means for controlling list mode operation. It will be recalled that in list mode operation, the keyboard and memory drum are not used and the card reader reads punched cards and supplies pocket codes to the code setter solenoids as the console drives letters into the sorting machine.

To condition the system for list mode operation, the LIST stationary contact of sort-list switch SL in FIG. 4m is connected through a conductor 82 and the operating coil of list mode control relay CR4 to the minus 10 volt source. Relay CR4 is provided with a normally closed contact a and a normally open contact b connected through a resistor R25 to the minus 10 volt source and the other side of contact b is connected to ground potential. As aforementioned, the junction of the relay CR4 contacts is connected through NOT circuit N22 to the second input of OR logic circuit OR3 to provide an alternative circuit for card reader power control relay CR3. Thus, card reader power can be controlled either in load mode or list mode. The junction of the contacts of relay CR4 is also connected to the "clear" input terminal CL of a flip-flop SFF9 for presetting the latter to its reset "0" condition.

The junction of contact a of relay CR9 and resistor R23 is connected to a reset "0" input terminal of flip-flop SFF9. The junction of contact b of relay CR9 and resistor R24 is connected to a first input terminal of an AND logic circuit A15. One set "1" input terminal of flip-flop SFF9 is connected to the junction of a pair of resistors R26 and R27, resistor R26 being connected to a minus 10 volt source and resistor R27 being connected to ground potential. The LIST stationary contact of sort-list switch SL in the control circuit for console A is connected through contact 22d of counter relay 22a and a conductor 83 to the operating coil of a list mode operating relay CR10, the other side of such coil being connected to a minus 10 volt source. Relay CR10 is provided with a normally closed contact a and a normally open contact b connected to one another at one side thereof. The other side of contact a is connected through a resistor R28 to the minus 10 volt source and the other side of contact b is connected to ground potential. The junction of the contacts of relay CR10 is connected to the other set "1" input terminal of flip-flop SFF9 to control operation of the latter whenever a letter passes into the sorting machine under list mode operation.

The output of flip-flop SFF9 is connected to the other input terminal of AND circuit A15 for gating the latter to pass the signal from relay CR9. The output of flip-flop SFF9 is also connected to its other reset "0" input terminal to condition the same for restoration to its off condition. The output of flip-flop SFF9 is further connected through a conductor 84 to an input of an OR logic circuit OR6.

To inhibit the memory flip-flops in the read-write circuits from being operated by the associated reading heads during list mode operation, the output of AND logic A15 in FIG. 4h is connected through a conductor 85 to a double driven NOT logic circuit N31 of the phase inverting type. The output of NOT logic N31 is connected through the operating coil of relay CR8 to a minus 10 volt source. Relay CR8 has a normally open contact a for connecting the minus 10 volt source through resistor R29 to conductors 71 and 72 to perform the aforementioned inhibiting function during list mode operation. Normally closed contact b of relay CR8 connects conductor 70 to conductors 71 and 72 during sort mode operation as aforementioned.

For causing the card reader to read a card as each letter passes from the console into the sorting machine, the output of AND logic A15 in FIG. 4h is also connected through a phase inverting NOT logic circuit N32 and an input capacitor C13 to a pulser P13. An alternating resistor R30 connects the output of NOT logic N32 to ground potential. The output of pulser P13 is connected through a conductor 86 to the lower double driven input of OR logic OR4 for operating card reader clutch control relay CR6.

For the purpose of resetting the memory flip-flops in the read-write circuits to their "0" state just before a card is read under list mode operation and for inhibiting further resetting thereof by clock pulses until the pocket code has been read and transferred to the code setter solenoids, the output of pulser P13 in FIG. 4h is also connected through logic OR6 and a conductor 87 to the upper input of driver DR2.

To develop a pocket code transfer signal after each card has been read under list mode operation the output of logic N32 in FIG. 4h is connected to the upper input of an AND logic A16. The lower input of logic A16 is connected through conductor 66 to the step 9 output of stepper unit ST2. The output of logic A16 is connected through logic OR5 and driver DR9 and conductor 79 to the lower set "1" inputs of the pocket code output flip-flops.

Before proceeding with a description of operation of the system, the circuit modules shown symbolically in FIG. 4 will be described. These circuit modules are shown in detail in FIGS. 5 through 14. The numerals appearing within the symbols in the system of FIG. 4 indicate the figures of the drawings wherein the circuit diagrams of the modules are shown.

FIG. 5 shows an AND logic circuit having three inputs, a pair of P-N-P transistors T1 and T2 and an output. The three inputs are connected through three input resistors, respectively, to the base of transistor T1. Ground potential is connected to the emitter of transistor T1 and is also connected through a resistor to the base thereof. The collector of transistor T1 is connected through a load resistor to a minus 10 volt source and is direct-coupled to the base of transistor T2. Ground potential is connected to the emitter of transistor T2 and the collector thereof is connected to the output and through a load resistor to the minus 10 volt source. As indicated by the conductor multiples, a plurality of like AND logics may be connected between the minus 10 volt source and ground potential and one input may be connected in common to all such logics. If ground potential is applied to all the inputs, transistor T1 is turned off and its collector goes negative to turn transistor T2 on to provide a ground potential output. This is its AND logic function. If negative voltage is applied to one or more of the inputs, transistor T1 turns on and its collector goes to near ground potential to turn transistor T2 off to provide a negative voltage output. In the system of FIGS. 4a–4m, this logic circuit is used as an AND gate at the inputs to the read-write circuits using all three inputs thereof. This logic circuit is also used as a current amplifier at the inputs to the code translator and at the input to the stepper clearing and resetting circuit. Use thereof as a current amplifier requires only one of the inputs so that the other input and common input may be left disconnected.

FIG. 6 shows a phase-inverting logic circuit having from one to five inputs, a transistor T3 and an output. The inputs are connected through respective input resistors to the base of transistor T3 and the base of transistor T3 is connected through a resistor to a plus 50 volt source. Ground potential is connected to the emitter and the collector is connected through a load resistor to a minus 10 volt source and is also connected to the output. This is a resistance coupled transistor circuit which performs AND, OR and NOT logic functions. It is used in a plurality of places in the system of FIGS. 4a to 4m and is variously characterized as an AND logic, an OR logic or a NOT logic according to its use therein.

Figure 7:
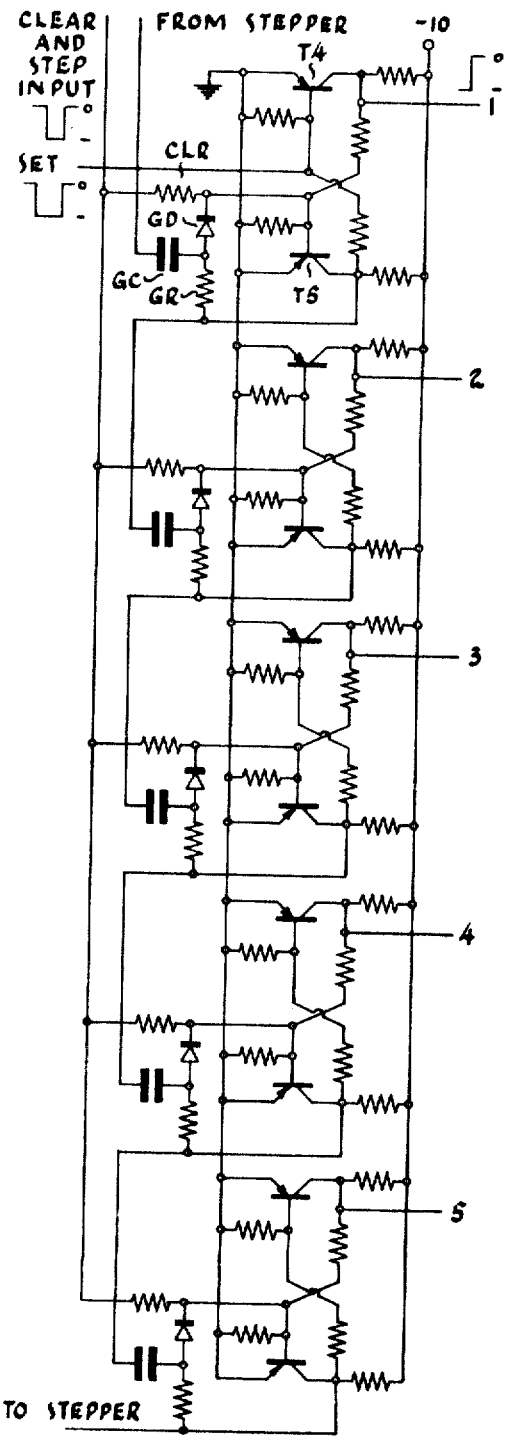

FIG. 7 shows a stepper circuit or unit capable of taking five steps. It is provided with five stages, one for each step, connected in series. Each such stage comprises the combination of a conventional cross-coupled transistor flip-flop and a capacitor diode gate. Since the five stages are alike, only the first stage will be described. The flip-flop is provided with first and second transistors T4 and T5 having their emitters connected to ground potential and their collectors connected through respective load resistors to a minus 10 volt source. The bases and collectors of the two transistors are cross-connected through a pair of coupling resistors. The bases of the two transistors are also connected through a pair of resistors, respectively, to ground potential. The base of transistor T4 is connected to a "set" input. The capacitor diode gate is provided with a capacitor GC and a diode GD connected in series from an input to the base of transistor T5, the diode having its cathode connected to the base of the transistor. Capacitor charging resistor GR1 is connected between the collector of transistor T5 and the anode of the diode. The base of transistor T5 is also connected through a current limiting resistor CLR to a combined clear and step input. The collector of transistor T5 is connected to the capacitor in the second stage and the like collector in the second stage is similarly connected to the next stage, etc. The like collector in the last stage is connected to the capacitor in the first stage of the other stepper unit ST2 in FIG. 4b whereby the two steppers provide up to ten steps. Each stepper is provided with five outputs. The step 1 output is connected to the collector of transistor T4 and the other outputs are connected to the collectors of like transistors in the other stages.

A thirty micro-second negative pulse, longer than the interstage coupling transient, applied to the clear input will place all outputs at negative voltage, that is, in the "0" state. A relatively longer negative pulse than the clear pulse simultaneously applied to the set input will place the first output at ground potential, that is, in the "1" state. Since the set pulse is applied at the same time as the clear pulse, it must be longer. Also, resistor CLR makes the base current furnished by the clear pulse less than the base current furnished by the set pulse to insure that the flip-flop goes into "1" state. A four micro-second negative pulse applied to the step input will change the first output to negative voltage and will change the second output to "1" state ground potential. This step pulse will turn transistor T5 on whereby transistor T4 will be turned off. When transistor T5 turns on as aforesaid, a positive going pulse will be applied from its collector through the capacitor and diode in the next stage to turn the second transistor off. This will cause the first transistor in the second stage to turn on or in its "1" state. The next step pulse will perform a similar function in the second stage to place it in its "0" state whereby the third stage goes into its "1" state. Although the step pulse is applied in common to all the stages, it will be apparent that only the flip-flop in the "1" state will be affected thereby since all the others are in their "0" state. In this manner, ground potential is obtained from the outputs in sequence in response to application of negative step pulses.

Figure 8:
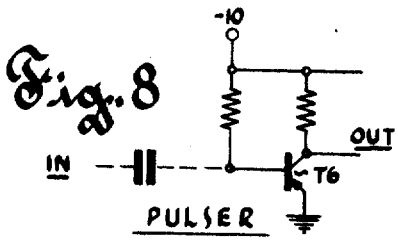

FIG. 8 shows a pulser circuit having a transistor T6 with its emitter connected to ground potential and its collector connected through a load resistor to a minus 10 volt source and also to the output. The base of the transistor is connected through a current limiting resistor to the minus 10 volt source to turn the transistor on when the input is at or negative of ground potential. An input capacitor of a desired value is connected between the input and the base of the transistor to determine the length of the output pulse. A negative pulse applied to the input will cause a delayed negative pulse to appear at the output. The duration of the output pulse will vary directly as the size of the input capacitor. The input pulse must be negative long enough to allow the capacitor to charge fully through the transistor emitter-base circuit to obtain the full length of output pulse obtainable with the selected capacitor value. When a negative pulse is applied to the input, the voltage at the base of the transistor is clamped near ground by the emitter-base circuit before the input pulse terminates and the capacitor charges. The positive going transient at the trailing end of the input pulse raises the base voltage positive, above ground, to turn the transistor off. As a result, the output goes from near ground to a negative voltage. The capacitor discharges exponentially to time the duration of the output pulse. When the base voltage reaches near ground potential the transistor turns back on to terminate the negative output pulse. It will be seen that different capacitance values in the input will provide output pulses of different lengths if the input pulse is negative long enough to charge the capacitor fully. This pulser is used in a plurality of places in the system of FIGS. 4a to 4m. From the foregoing, it will be apparent that the pulser can be used to determine the length of an output pulse and can also be used to shift a pulse in time since the output pulse starts at the end of the input pulse.

FIG. 9 shows a D.C. flip-flop circuit having a conventional cross-coupled transistor flip-flop and a pair of logic input circuits. The "1" state input circuit is shown as a NOR logic circuit having a pair of inputs connected through respective input resistors to the base of a transistor T7. Ground potential is connected to the emitter and is also connected through a resistor to the base while the collector is connected through a load resistor to a minus 10 volt source. The collector is also connected through a coupling resistor to the base of the output transistor in the flip-flop. While the "0" state input circuit could also be a NOR logic circuit, it is shown as an inverter or NOT logic circuit since only one "0" state input is required in the system of FIGS. 4a to 4m. The inverter has a transistor T8 and is like the NOR logic circuit except that it has only one input and input resistor. The collector of transistor T8 is connected through a coupling resistor to the base of the other transistor in the flip-flop. The flip-flop has two cross-connected transistors T9 and T10 and is similar to that described in connection with the stepper circuit of FIG. 7.

If transistor T9 is turned on, the flip-flop is in the "0" state, that is, a negative output. Assuming that at least one of the "1" state inputs has negative voltage, transistor T7 is turned on and supplies near ground potential to the base of transistor T10 to maintain it off. Thus, a negative voltage appears at the output. Application of ground potential to both "1" state inputs turns transistor T7 off to supply negative voltage from its collector through the coupling resistor to the base of transistor T10. Transistor T10 turns on to supply a ground potential output from its collector and to turn transistor T9 off. Lock up current is supplied from the collector of transistor T9 to the base of transistor T10 to maintain the latter on even if one or both of the "1" state inputs should now go negative. In a similar manner, the flip-flop can be set in its "0" state, negative output, by applying ground potential to the "0" state input to turn transistor T8 off.

FIG. 10 shows a scaling flip-flop circuit having a conventional cross-coupled transistor flip-flop including transistors T11 and T12 and four capacitor-diode gates G1, G2, G3 and G4 similar to the capacitor-diode gate shown in FIG. 7. This circuit is provided with a pair of "1" state inputs to the resistor and capacitor of gate G1 and the diode of the latter is connected to the base of transistor T11. In a similar manner, the pair of "0" state inputs are connected to the resistor and capacitor of gate G2 and the diode of the latter is connected to the base of transistor T12. The flip-flop is set in its "1" state from gate G1 and is set in its "0" state from gate G2. For scaling the flip-flop to its alternate state from either its "1" state or its "0" state, a scale input is connected to the capacitors of gates G3 and G4 and the resistors of these gates are connected to the respective collectors of transistors T11 and T12. The diodes of gates G3 and G4 are connected to the bases of transistors T11 and T12, respectively. To clear the flip-flop to its "0" state, a "clear" input is connected through a resistor to the base of transistor T11.

Each gate requires for operation a ground potential on its resistor while a positive going transient, from negative voltage to ground potential, is applied to its capacitor. The output is connected to the collector of transistor T12.

When a ground potential pulse is being applied to the resistor of gate G1 and a negative pulse is applied to the capacitor of gate G1, the capacitor charges. At the trailing end of the negative pulse, the positive going transient causes a positive voltage to be applied through the diode in its forward direction to the base of transistor T11 to turn the latter off. This causes transistor T12 to turn on and to provide a ground potential or "1" state output. Gate G2 can be operated in like manner to transfer the flip-flop back to its "0" state wherein transistor T11 is on and transistor T12 is off to provide a negative voltage or "0" state output. Alternatively, a short negative pulse on the clear input turns transistor T11 on and transistor T12 off. Assuming transistor T11 is on and transistor T12 is off, the flip-flop can be transferred by a negative pulse on the scale input. Ground potential is applied from the collector of transistor T11 to the resistor of gate G3 whereas negative voltage is applied from the collector of transistor T12 to the resistor of gate G4. Under this condition, gate G3 can be operated and gate G4 cannot be operated. A negative pulse on the scale input charges the capacitor of gate G3 and the positive going transient applies a positive voltage through the diode of gate G3 to the base of transistor T11 to turn it off and to turn transistor T12 on. Transistor T12 now supplies ground potential from its collector to the resistor of gate G4 so that the latter can be operated by the next scale input pulse in a similar manner to turn transistor T12 off and to turn transistor T11 on. In the system of FIGS. 4a to 4m, the scaling flip-flop circuit is used in a plurality of places with only some of the inputs being utilized.

FIG. 11 shows a driver circuit having a first stage which is a logic circuit and a second stage which is a power amplifier. This driver circuit is used in a plurality of places in the system of FIGS. 4a to 4m where the power level must be raised because a signal is being applied to a plurality of places in parallel. This driver has from one to four inputs connected through respective input resistors to the base of transistor T13 of the logic stage. The upper input is additionally provided with a speed-up circuit to afford fast switching. This speed-up circuit consists of parallel-connected resistor and capacitor in series with the input resistor. The emitter is connected to ground potential and the collector is connected through a load resistor to a minus 10 volt source. The base is also connected through a resistor to a plus 50 volt source. The collector of the logic stage transistor is coupled through a parallel connected resistor and capacitor to the base of transistor T14 in the amplifier. The plus 50 volt source is connected through a resistor to the base of transistor T14. The emitter of the latter is connected to ground potential and the collector is connected through a load resistor to the minus 10 volt source and is also connected to the output.

When all the inputs are at ground potential, transistor T13 is turned off and transistor T14 is turned on to provide ground potential output. Application of a negative voltage or pulse to at least one input causes transistor T13 to turn on and to apply ground potential from its collector to the base of transistor T14 to turn the latter off. As a result, negative voltage is applied from the collector of transistor T14 to the output. As will be apparent, the driver is like an amplifying OR logic circuit wherein a negative input provides a negative output, that is, without phase inversion. This amplifier raises the power level about six and a half times to supply a multiplicity of circuits as shown in FIGS. 4a to 4m.

FIG. 12 shows a read-write amplifier used in the read-write circuits of FIGS. 4e and 4f and used in modified form in the clock and sync pulse circuits. This amplifier is provided with a pair of read-record terminals RR1 and RR2 connectable across the read-record head coil in the associated read-write circuit or connected across the read head coil in the associated clock or sync pulse circuit. A write input terminal W is provided for controlling recording on the drum. An erase input terminal E is provided for erasing information from the drum.

Input terminal W is connected to the base of a transistor T15. The emitter is connected through a capacitor and resistor in parallel to terminal RR1 and the collector is connected to a minus 10 volt source. For recording purposes, a short negative pulse is applied to the base of transistor T15 to turn it momentarily on. This causes a pulse of recording current to flow from the grounded center tap through one-half of the recording head coil, through terminal RR1, the emitter capacitor and transistor T15 to the minus 10 volt source to record a magnetic spot on the drum.

Input terminal E is connected through a resistor and a diode in its reverse, high impedance direction to terminal RR2. For erasing purposes, a longer negative pulse lasting for at least one revolution of the drum is applied to terminal E. This causes current flow from the grounded center tap through the other half of the recording head coil, terminal RR2 and the diode and resistor to terminal E. This current flows in the coil in the opposite direction from the recording current whereby to erase the magnetic spots from the drum.

The modified amplifier used for reading clock or sync pulses is like that in FIG. 12 except that write terminal W, transistor T15 and capacitor and resistor in its emitter circuit, erase terminal E and the resistor and diode connected thereto are omitted since neither recording nor erasing is required.

For reading purposes, the amplifier is provided with a two stage differential amplifier and a two stage transistor switching circuit. The differential stages comprise transistors T16, T17 and T18, T19, respectively, and the switching circuit comprises transistors T20 and T21. Terminals RR1 and RR2 are connected through a pair of input resistors to the respective bases of transistors T16 and T17 and these bases are connected through respective pairs of diodes to ground potential, the diodes in each pair being connected in reverse, parallel arrangement. A plus 50 volt source is connected through a pair of emitter resistors to the respective emitters in the first differential stage and the collectors are connected through respective load resistors to the minus 10 volt source, there being a capacitor across the two emitter resistors. The collectors in the first stage are coupled through respective capacitors to the bases in the second stage and these bases are connected through respective resistors to ground potential. The minus 50 volt source is connected through respective emitter resistors to the emitters in the second stage and the collectors of transistors T18 and T19 are connected through respective load resistors to the minus 10 volt source, there being a resistor connected across the emitter resistors.

The collector of transistor T18 is coupled through a capacitor and a resistor in series to the base of transistor T20 and the junction of this capacitor and resistor is connected through a resistor to the minus 10 volt source. The base of transistor T20 is connected through a diode in its forward direction to ground potential. The emitter is connected to ground potential and the collector is connected through a load resistor to the minus 10 volt source.

The collector of transistor T20 is coupled through a capacitor and resistor in parallel to the base of transistor T21 and the base of the latter is connected through a resistor to ground potential. The emitter is connected to ground potential and the collector of transistor T21 is connected through a load resistor to the minus 10 volt source and is also connected to the read output terminal RO.

Transistors T16 and T17 in the first differential stage are normally turned on by current flow from the plus 50 volt source through their emitter resistors, emitters and bases and forward diodes of the pairs thereof to ground. Transistors T18 and T19 in the second stage are also turned on by current flow from the plus 50 volt source through their emitter resistors, emitters and bases and base resistors to ground. Transistor T20 is also turned on by current flow from ground through its emitter and base and the two resistors in series to the minus 10 volt source. Transistor T20 being turned on, ground potential is applied from its collector through the resistor of the coupling circuit to the base of transistor T21 to turn the latter off. As a result, a negative voltage is applied from the minus 10 volt source through the load resistor of transistor T21 to the output terminal.

When a magnetic spot on the rotating drum sweeps past the reading coil, an alternating current signal is applied to the bases of transistors T16 and T17 to operate the differential amplifier. This changes the voltages at the collectors of transistors T16 and T17 to apply signals through the coupling capacitors to the bases of transistors T18 and T19. The differential amplifier rejects any common mode signal and an output signal is taken from one-half thereof, that is, from the collector of transistor T18 and applied through the coupling capacitor and resistor to the base of transistor T20. The positive portion of this signal brings the base of transistor T20 momentarily to ground potential to turn the latter off. The diode shunts positive voltage signals off the base of transistor T20 to ground.

When transistor T20 turns off, a negative pulse is applied from the collector thereof through the coupling capacitor to the base of transistor T21 to turn it on. As a result, the collector of transistor T21 provides an output pulse which shifts from negative voltage to ground potential and back to the negative voltage.

The pairs of diodes at the inputs to the differential amplifier have a small voltage drop such as a fraction of a volt and shunt large input signals to ground. The input signals which operate the amplifier are of lesser magnitude than this voltage drop.

FIG. 13 shows a digital coincidence circuit having two inputs and one output. This circuit will provide a "1" state ground potential output either when both inputs have ground potential applied thereto or when both inputs have negative voltage applied thereto. If ground potential is applied to one input and negative voltage is applied to the other input, the circuit will provide an "0" state negative voltage output. The "1" state output indicates coincidence whereas the "0" state output indicates lack of coincidence.

As shown in FIG. 13, the two inputs are connected through a first branch having a diode AND logic circuit and a transistor inverter and a first part of a diode OR logic circuit to a common point CP and through a second branch having a transistor AND logic circuit and the other part of the diode OR logic circuit to common point CP. The diode AND logic circuit comprises two diodes connecting the respective inputs to the transistor inverter. The latter comprises an input resistor connecting the cathodes of the AND logic diodes to the base of a transistor T22. The emitter is connected to ground potential and the base is connected through a resistor to ground potential. The collector is connected through a load resistor to a minus 10 volt source and is also connected through the first diode of the OR logic in its forward direction to common point CP. The cathodes of the AND logic diodes are also connected through a resistor to the minus 10 volt source. The transistor AND logic circuit in the second branch comprises a pair of transistors T23 and T24 connected in a circuit like that shown in FIG. 5 except that only two input resistors are provided and connected to the respective inputs of the digital coincidence circuit and to the base of the first transistor T23. The collector of the second transistor T24 is connected through the other diode of the OR logic to common point CP. Common point CP is connected through a resistor to the minus 10 volt source and is also connected through a diode in its reverse, high impedance direction to the output.

This output diode constitutes one diode of a diode-type AND logic circuit as used in the system of FIGS. 4a to 4k and 4m wherein the load connected to a plurality of digital coincidence circuits has a ground potential supply. As will be apparent, the twenty-five digital coincidence circuits in the name code read-write circuits in FIG. 4e have their outputs connected together whereby the output diodes thereof form an AND logic circuit. Also, the twelve digital coincidence circuits in FIGS. 4g and 4i controlled by the clock pulse counter and the card counter have their outputs connected together whereby the output diodes form an AND logic circuit.

Referring to FIG. 13, if ground potential is applied to both inputs, transistor T23 is turned off and transistor T24 is turned on. As a result, current flows from ground through transistor T24 and its load resistor to the minus 10 volt source. Current also flows from the collector of transistor T24 through the OR logic diode, common point CP and the output resistor to the minus 10 volt source. This current flow through the common point brings the cathode of the output diode near ground potential constituting the "1" state output. The ground potentials on both inputs are applied through the diode AND logic to maintain inverter transistor T22 off. The collector of transistor T22 has a negative voltage but it is isolated from the output by the blocking effect of the upper diode of the OR logic.

If negative voltage is applied to both inputs, this negative voltage is applied through the diode AND logic to turn transistor T22 on. As a result, current flows from ground through transistor T22 and its load resistor to the minus 10 volt source. Current also flows from the collector of transistor T22 through the upper diode of the OR logic, common point CP and the output resistor to the minus 10 volt source. The current flow brings the cathode of the output diode to near ground potential constituting the "1" state ouput. The negative voltage on both inputs turns transistor T23 on and turns transistor T24 off. The collector of transistor T24 has a negative voltage but it is isolated from the output by the blocking effect of the lower diode of the OR logic.

If ground potential is applied to one input and negative voltage is applied to the outer input, the ground potential is applied through the corresponding diode of the diode AND logic to turn transistor T22 off. The collector of the latter provides a negative voltage to the diode OR logic. In the lower branch, current flows from the ground potential input through both input resistors in series to the negative voltage input. From the junction of the two input resistors a negative is applied to turn transistor T23 on. Near ground potential is applied from the collector of transistor T23 to turn transistor T24 off. The collector of the latter provides a negative voltage to the diode OR logic. Since both transistors T22 and T24 now provide a negative voltage, the output is an "0" state negative voltage indicating lack of coincidence.

From the foregoing, it will be apparent that when the outputs of a plurality of digital coincidence circuits are connected together as in the system of FIGS. 4a to 4k and 4m, the output diodes thereof form a diode AND logic circuit. This diode AND logic circuit provides the proper "1" state ground potential output only when every digital coincidence circuit has a ground potential output, that is, when coincidence input conditions exist. If lack of coincidence exists in at least one digital coincidence circuit, the resultant output will be at "0" state negative voltage.

FIG. 14 shows a four-bit counter circuit for receiving spaced input pulses to provide a four-bit binary output. A four-bit binary counter can count from zero to fifteen pulses. Connecting three such counters in tandem provides a twelve-bit binary counter as used in the system of FIGS. 4g and 4i which can count from zero to 4095 pulses. However, as used in FIGS. 4g and 4i the counter is reset to zero or cleared after counting 3000 pulses.

As shown in FIG. 14, the four-bit counter unit is provided with four stages connected in tandem. One input is connected to the first stage and each stage is connected to the input of the succeeding stage. The last stage is connected to the input of the next four-bit counter unit. Each stage is provided with an output so that each unit has four outputs. The counter unit is also provided with a "clear" input connected to all four stages for resetting the counter unit to zero condition.

Each stage is provided with a conventional flip-flop having a pair of cross-coupled transistors T25 and T26 supplied from a minus 10 volt source to ground potential. Each stage is also provided with a pair of diode-capacitor gates G5 and G6 connected to the bases of the respective transistors T25 and T26 and to the input to the counter is connected to the two gates of the first stage in common. The counter input is connected to gates G5 and G6 and these gates are connected to the flip-flop in the same manner as the scale input is connected to gates G3 and G4 and as these gates are connected to the flip-flop in the scaling flip-flop circuit of FIG. 10. The output of the first stage is connected to the collector of the second transistor T26 of the flip-flop. The collector of the first transistor T25 is connected in common to the two gates of the second stage, that is, to the input to the second stage. The inputs to the succeeding stages are similarly connected to the respective immediately preceding stages and the outputs are taken from like points in each stage. The collector of the first transistor in the fourth stage is similarly connected to the input to the next counter unit. The "clear" terminal is connected through a current limiting resistor to the base of transistor T25 in the first stage and is similarly connected through resistors to the second and fourth stages. This clear terminal connection is like that shown in FIG. 10.

The first stage of the counter is arranged to "scale" in the same manner as the scaling flip-flop in FIG. 10, that is, each input pulse causes it to change its output from "0" state to "1" state or from "1" state to "0" state. In its "0" state, transistor T25 is on and transistor T26 is off. In its "1" state transistor T25 is off and transistor T26 is on to provide a "1" state ground potential at the bit 1 output. The input signal is a negative pulse long enough to charge the gate capacitor. If transistor T25 is on, it provides near ground potential to the resistor of gate G5 to allow the associated gate capacitor to charge in response to a negative input pulse. Gate G6 cannot function since the collector of transistor T26 supplies negative voltage to the resistor thereof. The positive going transient at the trailing end of the input pulse then turns transistor T25 off and in going off turns transistor T26 on. The collector of the latter now supplies near ground potential to its associated gate whereas transistor T25 supplies negative voltage to its associated gate so that the next negative input pulse will perform the reverse transfer action.

Each time that transistor T25 goes on, its collector supplies a positive going transient to the input to the next stage to operate the latter in scaling fashion. Each succeeding stage is similarly operated by its immediately preceding stage so that the counter unit and succeeding units connected in tandem thereto perform binary counting.

The operation of the system will now be described. Electrical power is initially connected to the sorting machine motor to start the sorting machine running. Electrical power is also connected to the card reader to prepare it for operation by the system. The sort-list switches of the consoles such as switch SL in FIG. 4m are placed in their sort positions. Load-sort switch LS is placed in its sort position as shown in FIG. 4h. Electrical power is then applied to the system of FIGS. 4a to 4m and to the drum motor. The magnetic drum starts running and after a short time interval, it reaches its operating speed.

*Load mode operation*

At the start of the load mode operation, the system will erase any information that might be on the drum. This is done by placing switch LS into its load position. This will clear the drum and turn the card reader on to prepare the system for recording as hereinafter described. Punched cards are placed in the card reader hopper and additional cards up to 2998 are added as the reader operates.

Before switch LS is moved to its load position, negative voltage is applied in FIG. 4h through resistor R20, contact a of relay CR2 and conductor 62 to the clear inputs CL of flip-flops SFF6 and SFF7 in FIG. 4j to reset these flip-flops to their "0" state. This negative voltage is also applied from conductor 62 to logic A10 to maintain relay CR5 deenergized. Relay CR5 is deenergized because logic A10 having a negative voltage input from conductor 62 provides a ground potential output which is inverted in logic N25 to connect negative voltage to the relay operating coil. Flip-flop SFF7 in its "0" state provides negative voltage to logic N24. This negative voltage is inverted in logic N24 to connect ground potential to the upper input of logic A10. Thus, logic A10 has ground potential on its upper input so that when its lower input is switched to ground potential by relay CR2, relay CR5 operates as hereinafter described.

When switch LS in FIG. 4h is operated as aforesaid, relay CR2 opens its contact a and closes its contact b to apply ground potential through conductor 62 to the lower input of logic A10. Both inputs of logic A10 are now at ground potential so that it provides a negative voltage to logic N25. Double driven logic N25 saturates in response to this negative voltage and applies ground potential to operate relay CR5. The latter closes its contact a to apply negative voltage through conductors 59 and 60 to erase terminals E of the amplifiers in all of the name code and pocket code read-write circuits RW1 through RW8. Erasing current is applied through these amplifiers as hereinbefore described in connection with FIG. 12 and through one-half of the recording head coils to erase any information on the drum.

Relay CR2 also applies ground potential through conductor 62 to the upper input of logic OR2. The latter provides a negative voltage which is raised in power in driver DR2 and applied through conductors 36 and 37 to the memory flip-flops in all the read-write circuits to prepare them for restoration to "0" state conditions in response to a stepper signal as hereinafter described. Relay CR2 also applies ground potential through conductors 62 and 63 to prepared flip-flop SFF8 for operation.

To time the erasing function and to terminate it after at least two revolutions of the drum, contact b of relay CR2 also applies ground potential to the lower input of logic A9 which is an AND gate. This ground potential conditions or opens logic A9 to pass sync pulses as hereinafter described.

These sync pulses are 10 micro-second negative pulses applied from driver DR6 in FIG. 4e through conductor 61 to the upper input of logic A9. One such sync pulse is applied every 33 milliseconds or one pulse per revolution of the drum. Reading head coil H4 reads a magnetic spot from the drum and operates amplifier AMP4 whereby the latter provides a positive going pulse. This positive going pulse is applied through input capacitor C6 to pulser P6 whereby the latter provides a short negative pulse. This negative pulse is amplified in driver DR6 and is applied as aforesaid through conductor 61 to logic A9.

This negative sync pulse is inverted by logic A9 to apply a positive going (from negative to ground potential) pulse to the scale input of flip-flop SFF5. That is, between sync pulses ground potential is applied to both inputs of logic A9 to provide a negative output. The sync pulse turns on the transistor of logic A9 to provide a positive going output. Flip-flop SFF5 scales, that is, counts the sync pulses by two and provides one positive going output voltage steps for each two positive pulses from logic A9.

If flip-flop SFF5 is initially in its "0" state, erasing will take place for at least two revolutions of the drum. If flip-flop SFF5 is initially in its "1" state, erasing will take place for at least three revolutions of the drum.

Assuming that flip-flop SFF5 is initially in its "0" state, that is, negative voltage output, it will operate flip-flop SFF6 in response to the first sync pulse. The first positive going pulse from logic A9 transfers flip-flop SFF5 to its "1" state to apply a positive going pulse to flip-flop SFF6.

The latter counts the positive output pulses of flip-flop SFF5 by two. Since flip-flop SFF6 was initially cleared to its "0" state, its first output is from negative voltage to ground potential. Since this ground potential is inverted in logic N23, the resultant negative voltage will not operate flip-flop SFF7.

At the end of the first revolution, the second sync pulse will transfer flip-flop SFF5 back to its "0" state without disturbing flip-flop SFF6. At the end of the second revolution the third sync pulse will transfer flip-flop SFF5 to its "1" state. The positive going output pulse of the latter will transfer flip-flop SFF6 back to its "0" state to provide a negative voltage output which is inverted in logic N23. The positive going output of the latter will transfer flip-flop SFF7 to its "1" state which is a ground potential output. This output is inverted in logic N24 to apply negative voltage to the upper input of AND logic A10. This changes the output of logic A10 to ground potential and changes the output of logic N24 to negative potential to deenergize relay CR5 thereby to terminate the erasing function. Flip-flop SFF7 remains in its "1" state condition while relay CR2 remains energized for load mode operation.

If flip-flop SFF5 had been initially in its "1" state rather than in its "0" state as aforementioned, the erasing function will take place for at least three revolutions of the drum. This is for the reason that flip-flop SFF5 will count two sync pulses before operating flip-flop SFF6 rather than one sync pulse.

During the erasing interval, negative voltage is applied from the output of logic A10 in FIG. 4j to driver DR8. The latter applies an amplified negative voltage pulse of at least two drum revolutions in length through conductor 64 to the "clear" input terminals of card counter CC in FIG. 4i to reset the latter to its zero condition.

To apply electrical power to the card reader, contact b of relay CR2 in FIG. 4h also applies ground potential to logic N19 to operate logics OR3, N20 and N21 whereby to energize relay CR3. In this circuit, a double driven logic N21 is used to afford enough power for operating relay CR3. This logic N21 requires a negative voltage input to provide ground potential to relay CR3. This negative input is obtained by inverting in logic N20 the ground potential output of logic OR3. Since the latter is an OR logic requiring a negative input, logic N19 is used to invert the ground potential obtained from relay CR2. The OR logic is required to afford alternative operation of the card reader during list mode operation as hereinafter described. Relay CR3 closes its contact to connect a 200 volt supply to the card reader power relay for preparing the card reader for operation.

Relay CR2 also connects ground potential through conductor 56 to the third input of AND logic A8 in FIG. 4j to allow recording only in the load mode. This ground potential is also connected from conductor 56 in FIG. 4h through conductor 65 to the lower input of AND logic A11 to gate or condition the latter for passing signals from stepper unit ST2 as hereinafter described.

The card reader is then started by operating a pushbutton or the like in known manner. This causes the card reader to feed a punched card from its hopper past its reading station. The card reader is provided with a knife edge member which picks one card from the bottom of the stack in the hopper and feeds it broadside onto a sensing platform. A pusher arm then moves the card lengthwise past the reading head photo-transistors and into the eject rolls which eject it into a receiver.

Just before a card is read, the card pusher arm operates a photo-transistor to send a signal for clearing stepper units ST1 and ST2 and setting stepper unit ST1 to its step 1 condition. This signal is a negative pulse going from plus 9 to minus 10 volts and is applied from the card reader in FIG. 4a through conductor 24 to amplify logic AU13 in FIG. 4b. The output of the latter is inverted in logic N1 to provide positive going pulses to pulsers P1 and P2. Input capacitors C1 and C2 have different capacitive values so that pulser P1 provides a short negative pulse and pulser P2 provides a relatively longer negative pulse. These pulses are inverted in logics N2 and N3, respectively, to obtain positive pulses for the lower inputs of AND logics A1 and A2, respectively. As a precaution against noise, these pulses are gated through the AND logics by flip-flops FF1 and SFF1. A negative pulse is applied from logic AU13 to the "0" state input and a positive pulse is applied from logic N1 to the "1" state input of flip-flop FF1 to transfer the latter to its "1" state. Flip-flop FF1 applies a positive going pulse to flip-flop SFF1 to transfer the latter to its "1" state. As a result, flip-flop SFF1 applies ground potential to the upper inputs of logics A1 and A2 to pass the aforementioned short and long pulses.

Logic A1 provides a short negative pulse through conductor 32 to driver DR1 in FIG. 4c. The latter raises the power level of this short pulse and applies a negative "clear" pulse through conductor 33 to the combined clear and step inputs of stepper units ST1 and ST2 to reset the latter to their zero positions. The longer negative pulse overlaps the short clearing pulse and is applied from logic A2 in FIG. 4b through resistor R16 to the set input of stepper unit ST1 to set the latter to its first operating position. As a result, ground potential appears at the step 1 output and negative voltage appears at all the other outputs of the stepper units. This clearing and setting of the stepper to step 1 occurs before the first hole in the punched card is read.

Stepper ST1–ST2 is a distributor which distributes the sequentially received letter and number codes to the sets of read-write circuits. For this purpose, ground potential is applied from the step 1 output of the stepper in FIG. 4b through conductor 34 in FIG. 4d and its multiples in FIG. 4e to the five AND logics such as logic A4 in set RW1 in FIG. 4e to prepare this set of read-write circuits for receiving the binary code indicative of the first letter of the name code.

At this time before the first hole in the card is read, the memory flip-flops in those read-write circuits which are in their "1" state are reset to their "0" state. This is done by applying ground potential from the step 1 output of the stepper in FIG. 4b through conductors 34 and 35 to logic N4 in FIG. 4j. The latter inverts this signal to provide a negative going voltage to the lower input of logic OR2 whereby the output of the latter shifts from negative voltage to ground potential. This positive going output of logic OR2 is raised in power in driver DR2 and applied through conductors 36 and 37 and their multiples to reset flip-flops SFF2 and SFF3 and all corresponding flip-flops in the read-write circuits in FIGS. 4e and 4f which might have been in "1" state. Thus, all the memory flip-flops are now in their "0" state and in readiness to receive coded information from the punched cards.

As shown in FIGS. 4e and 4f, the input AND logics such as A4 and A6 and corresponding AND logics in the other read-write circuits each has three inputs. Ground potential signals must be applied to two of these inputs to gate the logic so that it will pass coded information via the third input to the memory flip-flop to which it is connected. As hereinbefore described, the step 1 output of the stepper applies ground potential to one of the three inputs of all five AND logics in the first letter set RW1. This is a distribution signal which is applied from outputs 1 through 8 of the stepper in succession to letter sets RW1–RW5 of the name code and digit sets RW6–RW8 of the pocket code as the eight columns of holes on the punched card are read thereby to distribute the letter codes and digit codes in sequence to the memory flip-flops in the sets of read-write circuits. This signal is applied for the duration of time that the stepper is in one of its step positions.

The ground potential signal applied to second inputs of the AND logics is a short gating pulse and is applied to all of the sets of read-write circuits simultaneously at the time that each column of holes on the card is read. This signal is a pulse obtained from the card reader during the time that a hole in the card is passing over a photo-transistor. To avoid any fringe effects, the leading and trailing edges of this pulse are in effect clipped to provide a short pulse at the center of each hole signal from the punched card as hereinafter described.

The ground potential signal applied to the third inputs of the AND logics is the information signal and is applied to certain ones of the read-write circuits in a set depending upon the particular code being read.

To avoid repetition, the recording of only a first letter A of a name code and a units digit 1 of a pocket code will be described in detail, it being understood that additional letters of the name code and additional digits of the pocket code are capable of being recorded by the system in a similar manner.

When the card reader in FIG. 4a reads holes indicative of the letter A, negative pulses are applied to conductors 12 and 1 which shift the voltage thereon from plus 9 to minus 10 volts. This causes the outputs of amplifier logics AU1 and AU4 to shift from ground potential to minus 10 volts for the duration of time that a hole in the card is over the photo-transistor in the card reader. This negative pulse space code is changed into a binary code by translator 26 to provide a negative pulse at output B1 in FIG. 4c.

It will be apparent that negative pulses must be applied at the same time to two of the translator inputs to obtain a binary code output. If ground potential appears on either conductor 12 or 1, current will flow through the corresponding translator diode, first vertical conductor and resistor R14 to the minus 10 volt source. This will cause ground potential to appear at output B1. It is only when negative voltage appears on a pair of name code inputs that a negative voltage output is obtained from the translator.

The negative pulse on binary output B1 is inverted in logic N5 in FIG. 4c to apply a ground potential pulse through conductor 39 to AND logic A4 in the bit 1 read-write circuit of set RW1 in FIG. 4e. This information pulse is is also applied from logic N5 to the bit 1 read-write circuits of sets RW2–RW5 but without effect at this time since these sets are not receiving a stepper signal.

To gate this information pulse through AND logic A4 and to store it in memory flip-flop SFF2, a short gating pulse must be applied to AND logic A4 as aforementioned. This gating pulse is obtained from the card reader through the translator and is modified as hereinafter described. The output of logic AU4 in FIG. 4a is applied through the pocket code portion of the translator and its output BCD1 and then through conductor 28 to an input of logic OR1. Whenever a name code letter or a pocket code digit from 1 to 9 is read, logic OR1 receives a negative pulse through one of the conductors 28 to 31. When a zero digit is read, logic OR1 receives a negative pulse through conductor 27.

This negative pulse which lasts for the duration that a hole is being read is inverted in logic OR1 to apply a positive going pulse to pulser P3. Input capacitor C3 has a value such that pulser P3 generates a negative pulse about half this long so that its trailing end occurs in the middle of the code pulse. This negative pulse is inverted in logic N14 to apply a positive going pulse to the upper input of AND logic A3. This is the AND logic which prevents recording of more than eight columns from the card. Therefore, it must be gated at this time to pass the pulse from logic N14. Negative voltage is being supplied from the step 9 output of the stepper in FIG. 4b through conductor 66 to the upper input of logic A11 in FIG. 4h. Logic A11 applies ground potential through conductor 67 to the lower input to gate AND logic A3 in FIG. 4c. As a result, logic A3 applies a negative pulse to pulser P4. Input capacitor C4 has a value such that the positive going trailing end of the negative pulse from logic A3 causes pulser P4 to generate a short negative pulse at the center of the pulse from the card reader. Thus, the fringes of the card reader output pulse have been eliminated.

The short output pulse of pulser P4 is now used to gate the input AND logics of the read-write circuits and its trailing end is then used to generate a step advance pulse for stepper ST1.

The short negative pulse from pulser P4 is inverted in logic N15 and the ground potential output pulse of the latter is raised in power in drivers DR3 and DR4 and applied through conductors 48 and 49 and their multiples to the input AND logics of all the read-write circuits. This conditions logic A4 to pass the information pulse being received from the code translator through conductor 39. As a result, logic A4 provides a negative pulse to the scale input of memory flip-flop SFF2 to transfer the latter to its "1" state. The binary code indicative of the latter A of the name code has now been registered in flip-flop SFF2. The latter retains this code until eight columns of holes have been read and then the name and pocket codes are simultaneously recorded in a row on the drum.

The positive going trailing end of the negative pulse from pulser P4 is applied to pulser P5 which is a logic circuit wired as a pulser. Input capacitor C5 has a value such that pulser P5 generates a very short negative step advance pulse. This pulse is amplified in driver DR1 and the latter applies the very short negative pulse through conductor 33 to the combined clear and step input of stepper unit ST1 to advance it to step 2. As a result, the step 1 output goes to negative voltage and the step 2 output goes to ground potential to provide an output signal to the input AND logics of second letter set RW2 of read-write circuits.

To insure that the first letter name code which was transmitted to the first letter set RW1 of read-write circuits is not also sent to the second letter set RW2 of read-write circuits when stepper ST1 is operated to step 2, the very short step advance pulse is used also to terminate the gating pulse. For this purpose, the negative step advance pulse is applied from pulser P5 also to the lower inputs of drivers DR3 and DR4. This causes drivers DR3 and DR4 to apply negative voltage to the input AND logics of all the read-write circuits at the same time as the step advance pulse is applied from driver DR1 to the stepper. This negative voltage cuts off the immediately preceding gating pulse that was applied from logic N15 through drivers DR3 and DR4 to the input AND logics of the read-write circuits. Thus, the input AND logics of the read-write circuits are inhibited by the time the stepper provides a step 2 output.

In a similar manner, the remaining four letters of the name code are read by the card reader and the binary codes indicative thereof are registered in the memory flip-flops in the second letter to fifth letter sets RW2 to RW5 of read-write circuits.

When each digit of the pocket code is read by the card reader, the latter applies a negative pulse to only one of the inputs 0 through 9 of the translator rather than to two inputs as in the case of name code letters. A zero digit is represented by a negative pulse on the 0 input and passes freely through the translator and through conductor 27 to logic OR1. Zero digits are not registered on the memory flip-flops since zero digits are indicated by their "0" states. The zero digit pulse on conductor 27 is used, however, to generate the very short pulse to advance stepper unit ST2. For the pocket code 001, the two zeros advance stepper ST2 to step 8.

To register the pocket code 001 which, for example, may indicate the first numbered pocket in the sorting machine, the card reader reads the eighth column on the card and applies a negative pulse through conductor 1 to the translator. This negative pulse is applied through the diode OR circuit constituting the right-hand portion of the translator in FIG. 4c to provide a binary coded decimal pocket code digit. This code digit is represented by a negative pulse on output BCD1. This information is inverted in logic N10 in FIG. 4c to apply a ground potential pulse through conductor 44 to one of the three inputs of AND logic A6 in FIG. 4f. Another input of AND logic A6 is supplied with ground potential from step 8 output of stepper unit ST2. The translator negative pulse is also applied from output BCD1 through conductor 28 to logic OR1 to produce a gating pulse for the third input of logic A6 so that the pocket code digit 1 pulse passes therethrough to set memory flip-flop SFF3 in its "1" state. The gating pulse also operates pulser P5 to produce a step advance pulse from driver DR1 to advance stepper ST2 to step 9 and to produce a gating cutoff pulse from drivers DR3 and DR4. The binary coded decimal pocket code has now been registered in the memory flip-flops and is retained therein until a "write" signal is received as hereinafter described.

After eight columns have been read by the card reader and the five letter name code and the three digit pocket code have been registered on the memory flip-flops, further information that might be read by the card reader is blocked from the system. This is done by closing AND logic A3 in FIGS. 4c. Also the recording circuits are prepared to allow recording of the registered codes under the control of the counters.

To block further information that might be read, the step 9 output of stepper unit ST2 in FIG. 4b applies a ground potential through conductor 66 to the upper input of logic A11 in FIG. 4h. Since ground potential is being applied from load mode control relay CR2 to the lower input, logic A11 applies a negative voltage through conductor 67 to the lower input of AND logic A3 in FIG. 4c to prevent passing of further gating signals therethrough. This prevents more than eight characters from being registered in the system.

The manner of recording on the drum the information stored in the memory flip-flops will now be described.

The negative voltage output of logic A11 in FIG. 4h is inverted in logic N26 to apply ground potential through conductor 68 to the input of card counter CC in FIG. 4i. This causes the latter to count the first card and to supply ground potential from the upper output of unit CC1 thereof to one input of digital coincidence unit DCU2. The other outputs of the card counter provide negative voltage to the other digital coincidence units DCU3 to DCU13, respectively.

Ground potential is also applied from logic N26 to the upper set input of flip-flop SFF4 in FIG. 4h to condition it for operation by a sync pulse.

The clock pulses and sync pulses are now used to control the system. Coil H3 in FIG. 4e reads magnetic spots from the drum and operates amplifier AMP3 to supply 3000 clock pulses each revolution of the drum, one for each space or row on the drum on which a name and pocket code pair can be recorded. Coil H4 similarly operates amplifier AMP4 to supply one sync pulse each revolution of the drum after the last clock pulse and before the first clock pulse indicating the zero row or position on the drum. The sync pulse is like one clock pulse except that it occurs in the zero position.

The clock pulses are inverted by logic N16, amplified in driver DR5 and applied to the input of counter CPC in FIG. 4g. This clock pulse counter counts 3000 negative clock pulses each revolution of the drum and supplies binary coded ground potentials from its outputs to digital coincidence units DCU2–DCU13. For example, when counter CPC counts the first clock pulse, the upper output of counter unit CPC1 applies ground potential to digital coincidence unit DCU2 whereas the other outputs have negative voltage.

At the end of each revolution of the drum, the sync pulse resets the clock pulse counter to zero position. The first sync pulse derived from amplifier AMP4 in FIG. 4e after the card is read is applied to pulser P6. Input capacitor C6 has a value such that the positive going leading end of the sync pulse operates pulser P6 to provide a short negative pulse to driver DR6. The latter amplifies this pulse and applies a negative pulse to the "clear" inputs of clock pulse counter units CPC1–3 to reset the clock pulse counter to zero position.

The negative sync pulse from driver DR6 is also applied through conductor 61 to the lower set input of flip-flop SFF4 in FIG. 4h to transfer it to its "1" state. This flip-flop applies ground potential through conductor 57 to the lower input of AND logic A8 in FIG. 4f to condition the system for recording. However, to prevent recording in the zero position of the drum, the negative pulse from driver DR6 is applied to the upper input of logic A8 to inhibit the latter during this time. Since this driver DR6 output is a very short pulse, the sync pulse is taken from the output of amplifier AMP4 and applied to pulser P6 in FIG. 4e. Input capacitor C7 has a value such that pulser P7 provides a negative pulse of the proper length to the second input of logic A8 in FIG. 4f to insure inhibiting of the latter for the duration of the zero position of the drum.

The sync pulse is also applied from driver DR6 through conductor 61 to the upper input of AND logic A9 in the erasing control circuit in FIG. 4h. This input to the logic A9 is negative during the sync pulse and is ground potential during the remainder of drum revolution. These sync pulses to logic A9 control the number of revolutions of erasing function as hereinbefore described.

At the end of the sync pulse, the inhibiting signals to logic A8 in FIG. 4f are terminated and both driver DR6 and pulser P7 now apply ground potential thereto. Since ground potential is now on all four inputs of AND logic A8, its output switches to negative voltage. This negative going voltage is inverted in logic N17 to apply ground potential to the second input of driver DR7 in FIG. 4h.

Following the sync pulse hereinbefore described, the first clock pulse which produces coincidence between the card counter and the clock pulse counter causes recording of the codes in the proper row on the drum. Since it was assumed that the first card was read, the first clock pulse causes recording of the codes in the first row on the drum.

When counter CPC in FIG. 4g counts the first clock pulse, it applies ground potential to the other input of digital coincidence unit DCU2. Since coincidence now occurs at all of the digital coincidence units DCU2 through DCU13, their outputs provide a ground potential pulse to the first input of driver DR7 in FIG. 4h.

The negative clock pulse derived from logic N16 in FIG. 4e is inverted in logic N18 in FIG. 4f to provide a "write" pulse. The ground potential pulse from logic N18 is applied directly to the third input of driver DR7. Pulser P8 in FIG. 4f provides fine trimming of the write pulse, that is, it provides the proper length of output from driver DR7 for writing on the drum. Capacitor C8 has a value such that the positive going leading end of the pulse from logic N18 causes pulser P8 to provide a very short negative pulse to the fourth input of driver DR7. This short negative pulse maintains the output of driver DR7 negative for the first portion of the clock pulse applied from logic N18 to the third input of the driver. At the end of this negative pulse, pulser P8 applies ground potential to the driver. Thus, the driver will provide a ground potential write pulse having a short duration corresponding to the remaining portion of the clock pulse. Resistor R21 in FIG. 4f attenuates the clock pulse from logic N18.

The output of driver DR7 is applied through conductors 54 and 55 to AND logics A5 and A7 and to corresponding AND logics in the other read-write circuits in FIGS. 4e and 4f to pass the name codes and pocket codes from the immediately preceding memory flip-flops to the associated recording amplifiers. It will be recalled that when the letter A of the name code was read, flip-flop SFF2 was set to provide ground potential to the upper input of AND logic A5. Flip-flop SFF3 was similarly set when the units digit 1 was read to apply ground potential to the upper input of AND logic A7. The ground potential output pulse from driver DR7 gates these AND logics to apply a negative pulse from each to write input W of the associated amplifier. As a result, a pulse of recording current flows in one-half of each of coils H1 and H2 to record the binary name code and the binary coded decimal pocket code on the drum.

The system now resets the stepper and operates the card reader clutch to feed another card as hereinafter described.

It will be recalled that the sync pulse from conductor 61 set flip-flop SFF4 in FIG. 4h in its "1" state. The write pulse from driver DR7 is inverted in logic N27 to apply a negative pulse to both the lower reset input and the scale input of flip-flop SFF4. The positive going trailing end of this pulse resets flip-flop SFF4 back to its "0" state. The resultant negative voltage output of this flip-flop is inverted in logic N28 in FIG. 4j to apply a positive going transient to pulser P9. The value of input capacitor C9 is such that pulser P9 provides a short negative pulse through conductor 69 to driver DR1 in FIG. 4c. The latter applies an amplified negative pulse through conductor 33 to both stepper units ST1 and ST2 in FIG. 4b to reset the same to zero position.

To operate the card reader clutch, logic N28 in FIG. 4j also applies the positive going transient to the lower set input of flip-flop SFF8 to set the latter in its "1" state and to apply ground potential to the upper input of AND logic A12. The aforementioned functions take place after the first eight columns of the card have been read but before the remaining columns have been read, that is, before the card has passed completely past the reading head of the card reader. Any additional columns of holes in the card that might be read cannot affect the system because the stepper is in its zero position whereby the input AND logics of the read-write circuits block information signals.

The feeding of the next card is delayed until all columns of the preceding card have passed the reading head. This is done by utilizing a blanking pulse which is provided by the card reader and which lasts from the middle to the end of the card. This is a negative pulse which is applied through conductor 25 and is inverted in logic N29 in FIG. 4j to apply a ground potential pulse to the lower input of AND logic A12. For the duration of this blanking pulse, the output of logic A12 goes negative. At the end of the blanking pulse, the positive going transient at the output of logic A12 operates pulser P10. Input capacitor C10 has a value such that pulser P10 provides the proper length negative pulse to operate relay CR6. This negative pulse is applied to the upper double-driven input of logic OR4 to apply ground potential for energizing relay CR6. The latter closes its contact to activate the card reader clutch to feed the next card from the hopper.

Flip-flop SFF8 in its "1" state applies ground potential from its output to its upper reset terminal. The negative pulse from pulser P10 is applied to both the clear input and the lower reset terminal of flip-flop SFF8 and this pulse resets the latter back to its "0" state.

The card reader pusher now pushes the second card past the reading head. In a similar manner, the second and subsequent cards are read and the name and pocket codes thereon are recorded in successive rows on the magnetic drum under the coincidence control of the card counter and the clock pulse counter. The recording stops when there are no more cards in the hopper or no more spaces on the drum.

Sort mode operation

To prepare the system for sort mode operation, system switch LS in FIG. 4h is changed from load to sort position and console switch SL in FIG. 4m is left in its sort position. The console on-off switch in FIGS. 4k and 4m is turned on to close contacts NF1 and NF2. The console clutch lever is pulled to engage the console drive whereby the sorting machine drives the chain-carried pins in the console and oscillates the vacuum arm to drive letters past the operator and into the sorting machine. The clutch closes limit switches LS1 and LS2 in FIGS. 4f and 4m.

Alternating current power is applied by contact NF2 across conductors 80 and 81 and therethrough to the feed table motor and photocell control. The photocell starts the motor of feed conveyor A2 to bring a stack of letters within reach of the vacuum arm and then stops the motor when the stack of letters breaks the light beam.

Switch LS in its sort position energizes sort mode control relay CR7 in FIG. 4h to open contact a and to close contact b. The latter contact applies ground potential through conductor 70, contact b of relay CR8 in FIG. 4j and conductors 71 and 72 to the upper set inputs of memory flip-flops SFF2 and SFF3 and through conductor multiples to corresponding points in all the other read-write circuits in FIGS. 4e and 4f. This ground potential prepares the memory flip-flops for later operation when positive going pulses are received from the associated amplifiers.

When the reading head coils such as coils H1 and H2 read name codes and pocket codes from the drum, each associated amplifier, such as amplifiers AMP1 and AMP2, applies a pulse to the lower set input of the associated memory flip-flop such as flip-flops SFF2 and SFF3. The positive going leading end of this pulse sets the flip-flop in its "1" state so that the eight sets of flip-flops store the name codes and pocket codes momentarily until the next clock pulse arrives.

The ground potential output of the name code memory flip-flop in FIG. 4e is applied to the upper input of digital coincidence unit DCU1. This ground potential output is also applied to its upper reset input to prepare the flip-flop for resetting back to its "0" state in response to a clock pulse.

Ground potential is also applied by relay CR7 in FIG. 4h through conductor 73 to the upper input of AND logic A13 in FIG. 4j. As the drum rotates, clock pulses are applied from logic N18 in FIG. 4f through conductor 74 to the lower input of AND logic 13. These are ground potential clock pulses which cause logic A13 to provide negative clock pulses. The latter are amplified in driver DR2 and applied through conductors 36 and 37 to the lower reset inputs of all the memory flip-flops to reset the latter to their "0" states.

From the foregoing, it will be apparent that the memory flip-flops follow in step with the amplifiers as the reading heads read rows of the drum and are reset by each clock pulse. The memory flip-flops in the name code read-write circuits stretch the read pulses for use by the digital coincidence units. The output of memory flip-flop SFF3 applies ground potential to the upper set input of pocket code extracting flip-flop FF2. The ground potential output is also applied to the upper reset input of memory flip-flops SFF3 to condition the memory flip-flop for resetting by the next clock pulse. The other pocket code read-write circuits operate in a similar manner as pocket codes are read.

Output flip-flop FF2 must have ground potential on both set inputs to provide a ground potential output. When the name code read matches the name code put in from the keyboard, a coincidence pulse is applied to the lower set input of flip-flop FF2 to extract the pocket code as hereinafter more fully described. It will be apparent that the ten output flip-flops such as FF2 extract a binary coded decimal pocket code for use by the sorting machine.

Referring now to the console circuit in FIGS. 4k and 4m relay DCR energizes through stepping switch SS in position 1 and closes its five contacts to connect keyboard contacts KC1–KC5 to relays RR1–RR5 in the first letter register unit 1L. When an alphabetical letter key is pressed, the keyboard operates to close the contacts in accordance with a 5 bit binary code from 1 to 26. For example, the letter A key selects contact KC1 for closure by keyboard solenoid KBS to energize relay RR1 and close its contacts a and b. Contact a registers the code and contact b completes a self-maintaining circuit for relay RR1 through contacts CS7 and RC. Common contact XC closes each time a key is pressed to energize keyboard solenoid KBS through contact CS2 and contact b of coil SS2. Solenoid KBS effects closure of the selected code contacts KC1–KC5 as aforementioned and also closes its contact a to energize coil SS2 of the stepping switch. Coil SS2 extends the switch operating pawl and operates its contacts a, b and c. Contact a of coil SS2 closes before contact b opens to maintain coil SS2 energized and to deenergize solenoid KBS. Contact c opens the resetting circuit. When solenoid KBS deenergizes to reopen the code contacts and contact a, releasing the keyboard keys opens common contact XC, which deenergizes coil SS2 whereby the stepping switch pawl is withdrawn by spring action or the like to step the stepping switch to the second position. When the stepping switch leaves position 1, cam SS1 closes switch SS3 to prepare the stepping switch reset circuit for operation.

The second letter code is then keyed into register unit 2L in a similar manner. The remaining letters are keyed into the remaining register units under the stepping control of switch SS. After the fifth letter has been registered, the stepping switch remains on the first vacant position until it is reset as hereinafter described. In actual practice, the stepping switch may already be in position 1 after five letters are typed. The reset circuit may be used only when less than five letters are typed for in case of an error by the typist.

While stepping switch SS has been shown as having more than five stepping positions, it will be apparent that for a five letter name code it will be provided with only five positions. Therefore, keying of five letters will return the switch to position 1 so that it need be reset only when less than five letters are typed or in case of an error by the manual operator.

Each console is provided with a cam operated switch having seven contacts CS1 to CS7. The operating cams of these switches are driven by the sorting machine conveyor chain in synchronism with the respective code setters but out of phase relative to one another. As shown in the cam switch layout development in FIG. 15, the cam switches of the three consoles are arranged to go through their operating cycles 120 degrees apart with respect to one revolution of a code setter. With this phase displacement, each console can utilize the logic system of FIGS. 4a to 4j in turn to match the keyed in name code with a name code on the drum and to extract the corresponding pocket code for operation of the code setter solenoids. The three code setters are similarly arranged to be driven by the conveyor chain 120 degrees apart so that the memory can supply pocket codes thereto in turn.

Such code setter has ten stationary solenoids on one side for pivoting the setting arms into operating position and a restoring bar on the opposite side for resetting the arms. As the arms pass the lowest point of rotation between the solenoids and the restoring bar, they set the code wheels. From this it will be apparent that each cam switch operating cycle shown in FIG. 15 is arranged to take place when the setting arms of the associated code setter arms are moving through the highest portion of rotation between the restoring bar and the solenoids.

For one revolution of the code setter shown in Patent No. 3,080,985, three rows of code wheels pass thereunder and the code setter is capable of setting one of these rows.

Thus, each console can utilize every third letter receiving space on the sorting machine conveyor and the other two consoles use the other two spaces.

Out of this time interval represented by one revolution of the code setter, substantially 60 degrees is used for the cam switch operating cycle and about 300 degrees is available for operating the keyboard to register a name code on the sets of register relays.

During this 60 degree operating cycle, the cam switch controls the transmission of the registered name code for comparison with the name codes being read from the drum and for transmitting the pocket code to the sorting machine. Cam switch contact CS1 in FIG. 4f initially closes for 10 degrees to reset the output flip-flops such as FF2 of all the pocket code read-write circuits. For this purpose, contact CS1 energizes relay CR1 through limit switch LS1. Contact a of relay CR1 opens and contact b closes for 10 degrees to apply a ground potential pulse to the reset input of flip-flop FF2 and similar flip-flops in sets RW6 to RW8 to reset these flip-flops to their "0" state.

When contact CS1 reopens, contact CS2 in FIG. 4k opens and contact CS3 in FIG. 4m closes as depicted in FIG. 15. Contact CS2 opens the keyboard, that is, opens the circuit of keyboard solenoid KBS so that the keyboard cannot be operated. Contact CS3 energizes relay MCR through limit switch LS2. Relay MCR closes contact a to transfer the registered name code to the digital coincidence units of the name code read-write circuits. That is, ground potential is applied through switch SL, contact CS6 and contact a of relay MCR and then through contact a of register relay RR1 and conductor 75 to the lower input of digital coincidence unit DCU1. In a similar manner, this ground potential is applied through contacts a of any of the other register relays in units 1L to 5L that have been operated by keyed-in letters of the name code to the corresponding digital coincidence units.

Contact b of relay MCR initiates a search signal longer than one revolution of the drum to insure that all the name codes on the drum are searched. This contact applies ground potential through conductor 78 to energize relay CR9 in FIG. 4h. The latter opens contact a and closes contact b to apply a positive going transient to pulser P11. This pulser delays the signal from contact b of relay MCR to allow time for sending the registered code to the digital coincidence units before the search signal is started. Pulser P11 provides a negative pulse in response to the positive going transient from relay CR9. Input capacitor C11 has value such that the negative pulse from pulser P11 has the proper length to afford the required delay. At the end of this delay, the positive going trailing end of such negative pulse triggers pulser P12 to initiate a negative search pulse. Input capacitor C12 has a value such that the search pulse is at least as long or longer than one revolution of the drum. This search pulse is inverted in logic N30 to provide a ground potential pulse to the lower input of AND logic A14. This pulse opens or conditions logic A14 for more than one revolution of the drum so that it will pass a coincidence signal indicating that a matching name code has been found on the drum.

As aforementioned, the reading head coils read name codes and pocket codes as the drum rotates and the memory flip-flops follow the amplifiers and are reset by clock pulses. When a name code is read which corresponds to the name code applied from the register to the lower inputs of the digital coincidence units and this read name code is applied to the upper inputs of the digital coincidence units in FIG. 4e, the latter apply a ground potential pulse through conductors 50 and 51 to the upper input of AND logic A14 in FIG. 4h. This pulse in inverted in logic OR5 and amplified in driver DR9 to provide a ground potential pulse through conductor 79 to the lower set inputs of the pocket code output flip-flops such as flip-flop FF2 in FIG. 4f. This pulse gates these flip-flops so that the pocket code which is being read simultaneously operates certain ones of these flip-flops in accordance therewith to their "1" state. As a result, these flip-flops apply ground potential through conductors 52 and 53 to energize corresponding hundreds, tens and units digit relays in FIG. 4m. For units digit 1, flip-flop FF2 applies ground potential through conductor 52 to energize relay UR1.

In the meantime, contact CS4 of the cam switch in FIG. 4k closes to reset stepping switch SS. Contact CS4 energizes coil SS2 to extend the stepping pawl. Contact c opens to deenergize coil SS2 whereby the pawl retracts and steps the switch from the first vacant position to the next vacant position. The switch continues to step by self-operation of contact c until it reaches its position 1 wherein cam SS1 opens switch SS3 to interrupt the stepping circuit.

Cam switch CS5 in FIG. 4m closes to energize code control relay CCR through contact NF2 of the power switch. Relay CCR closes its contact to permit energization of the hundreds, tens and units digit solenoids under the control of those hundreds, tens and units digit relays energized in accordance with the pocket code. These solenoids set the arms of the code setter in accordance with the pocket code. These arms then rotate through the lowest point of revolution and are cammed over to set the code wheels.

At the same time as the code wheels are set by the code setter, the letter which was driven from in front of the operator into the sorting machine is inserted by inserter 23 into the space on the conveyor corresponding to the code wheels which were set.

Cam switch contact CS6 in FIG. 4m opens to terminate transmittal of the registered name code. Contact CS3 reopens to deenergize name code search control relay MCR. Contact CS7 in FIG. 4k opens the maintaining circuit of the register relays to restore the latter. Contact CS6 recloses since contact a of relay MCR is now open.

Contacts CS1, CS2 and CS7 close and contact CS4 opens as shown in FIG. 15. Contact CS1 resets the output flip-flops of the pocket code read-write circuits. While in FIG. 15 contact CS1 has been illustrated as closing momentarily at the beginning and end of the cam switch cycle, it will be apparent that it need be closed momentarily only at the end of the cycle for sort mode operation. The cam switch contact CS1 for each console resets these flip-flops at the end of its cycle into readiness for use by the next console. However, cam switch contact CS1 must be momentarily closed at the beginning of the cycle for list mode operation as hereinafter described. Contact CS2 recloses the keyboard or conditions it so that it can again be operated to register another name code. Contact CS7 recloses so that registered codes can again be stored. Contact CS5 opens to deenergize relay CCR. Contact CS1 reopens since the pocket code output flip-flops have been reset and to permit reoperation thereof. The system is now ready for keying of another name code that is read from the next letter going past the operator.

The sorting conveyor conveys the letter past destination pockets. When the code wheels match code bars on the sorting machine, a gate is opened to drop the letter into the corresponding pocket to complete the sorting function.

List mode operation

To perform the list mode operation, load-sort switch LS in FIG. 4h is left in its sort position and sort-list switch SL in FIG. 4m is moved to its list position. The operator then engages the console clutch to start the console running.

In this mode of operation, as each letter passes from the console into the inserter in the sorting machine, a photo-electric detector detects the letter and in conjunction with the console cam switch operates the card reader and the system to read the pocket code from the card and to operate the code setter solenoids. Neither the name code nor the magnetic drum are used and the system is conditioned to avoid interference from these elements.

Switch SL in FIG. 4m applies ground potential through conductor 82 to energize list mode control relay CR4 in FIG. 4h. The latter opens contact a and closes contact b to apply ground potential to logic N22. This inverter logic N22 operates logics OR3, N20 and N21 to energize relay CR3 in the same manner as hereinbefore described in connection with logic N19 under load mode operation. Relay CR3 applies operating power to the card reader whereafter the card reader may be preset from a pushbutton or the like so that it will automatically operate under control of the system to read cards as hereinafter described.

Relay CR4 also applies ground potential to the "clear" input CL of flip-flop SFF9 to permit operation thereof. Before energization of relay CR4, negative voltage was applied through its contact a and resistor R25 to the clear input to hold flip-flop SFF9 in its "0" state, that is, negative voltage output. Switching this clear input to ground potential conditions the flip-flop for operation.

When the console is started running as aforesaid, the vacuum arm picks letters one at a time from the stack and deposits them on the letter trough for movement into the sorting machine. Engagement of the console clutch to start the console running also causes closure of limit switches LS1 and LS2 in FIGS. 4f and 4m. Limit switch LS1 closes a point in the circuit of relay CR1 and limit switch LS2 closes a point in the circuit of relay MCR.

Photoelectric detector 22 in FIGS. 1 and 4m detects the passage of each letter into the sorting machine. Detector 22 is energized across supply lines AC and N. A light beam from lamp 22c normally impinges on photocell 22b. When the first letter passes from the console into inserter 23 in the sorting machine, the letter L interrupts the light beam to cause closure of contact 22d. As a result, ground potential is applied through switch SL, contact 22d and conductor 83 to energize relay CR10 momentarily in FIG. 4h. Relay CR10 opens contact a and closes contact b to apply a positive going pulse to the lower set input of flip-flop SFF9. Since the upper set input is permanently gated by a voltage from the junction of resistors R26 and R27, flip-flop SFF9 operates to its "1" state and switches its output from negative voltage to ground potential. This conditions or gates AND logic A15 so that it will pass a signal from relay CR9 as hereinafter described.

When the letter has passed the light beam, contact 22d reopens to restore relay CR10. However, flip-flop SFF9 remains in its "1" state.

This switching of the output of flip-flop SFF9 from negative voltage to ground potential is applied through conductor 84 to logic OR6 to cause it to provide negative voltage which is applied through conductor 87 and amplified in driver DR2 in FIG. 4j to apply negative voltage through conductors 36 and 37 to the lower reset inputs of all the memory flip-flops such as SFF2 and SFF3 in the read-write circuits in FIGS. 4e and 4f. This conditions the memory flip-flops for resetting to "0" state as hereinafter described.

The console cam switch now operates the system to cause the card reader to read a pocket code from a card, to energize the code setter solenoids in accordance with such code and to avoid interference by the reading heads. In this operation, only contacts CS1, CS3, CS5 of the cam switch are used. The other contacts of the cam switch have no effect because the keyboard is not operated in this mode of operation.

In the contact operating sequence shown in FIG. 15, cam switch contact CS1 in FIG. 4f closes momentarily to reset the pocket code output flip-flops. This is done by energizing relay CR1 through limit switch LS1. Relay CR1 opens contact a and closes contact b to apply a ground potential pulse to the reset input of flip-flop FF2 and to the other pocket code output flip-flops to reset the same to their "0" state. This resetting prepares these flip-flops for receiving the pocket to be read from the punched card.

Cam switch contact CS3 then closes in accordance with FIG. 15 to energize relay MCR through limit switch LS2 in FIG. 4m. Contact b of relay MCR applies ground potential through conductor 78 to energize relay CR9 in FIG. 4h. Relay CR9 opens contact a and closes contact b to apply ground potential to the upper input of AND logic A15. Having ground potential on both inputs, logic A15 provides a negative voltage pulse through conductor 85 to double driven logic N31 in FIG. 4j. As a result, logic N31 provides ground potential to energize relay CR8 whereby to prevent the reading head coils from setting the memory flip-flops. To this end, relay CR8 opens contact b and closes contact a to apply negative voltage through conductors 71 and 72 to the upper set inputs of all the memory flip-flops such as SFF2 and SFF3 in FIGS. 4e and 4f. This negative voltage on the upper set inputs inhibits the memory flip-flops from being operated by the read-write amplifiers such as AMP1 and AMP2 as the drum rotates. This inhibiting voltage is applied for a time duration sufficient to allow reading of a card and sending of the pocket code therefrom to the code setter solenoids without interference by the reading heads. As will be apparent, the memory flip-flops can still be reset to "0" state from their reset inputs and can be set to "1" state from their "scale" inputs SC as the punched card is read.

The output of logic A15 in FIG. 4h also causes resetting of the memory flip-flops to "0" state to prepare them for receiving the pocket code read from the punched card and further causes operation of the card reader to read a card. To this end, the output of logic A15 is inverted in logic N32 to apply a positive going pulse to pulser P13. This triggers pulser P13 to provide a negative pulse. Input capacitor C13 has a value such that the negative pulse from pulser P13 is long enough to operate relay CR6. This negative pulse is inverted in logic OR6. The positive going leading end of the pulse from logic OR6 is applied through conductor 87, amplified in driver DR2 and applied through conductors 36 and 37 to the lower reset inputs of all the memory flip-flops such as SFF2 and SFF3. Those memory flip-flops which are in their "1" state have ground potential being applied from their outputs to their upper reset inputs so that the pulse on conductors 36 and 37 resets these memory flip-flops to their "0" state.

The negative pulse from pulser P13 in FIG. 4h is applied through conductor 86 to the lower double driven input of logic OR4 in FIG. 4j. As a result, logic OR4 provides ground potential to energize relay CR6. The latter closes its contact to operate the card reader clutch whereby the latter advances the first card past its reading head. When the negative pulse from pulser P13 terminates, relay CR6 restores but the card reader continues operating through its reading cycle and stops when the card has been read. Since both inputs of logic OR6 are now at ground potential, it provides a negative voltage through conductor 87 to the upper input of driver DR2. This inhibits driver DR2 so that it will not send any more positive going resetting pulses to the memory flip-flops and will allow them to be operated as the card is read. Unless this inhibiting voltage is applied, driver DR2 would repeat clock pulses applied through conductor 74 and logic A13 to its lower input which would interfere with operation of the memory flip-flops as the card is read.

As the card reader reads the first eight columns of holes in the card, the system functions as hereinbefore described in connection with load mode operation to store the five letters of the name code and the three digits of the pocket code on the memory flip-flops in the read-write circuits. The card reader pusher arm sends a pulse to reset stepper ST1–ST2 just before each card is read as described in connection with load mode operation. But since no write pulses are produced at driver DR7 in FIG. 4h in list mode operation, these codes do not pass the AND logics such as A5 and A7 in any of the read-write circuits. Thus, the name code that is read from the card is suppressed. And the drum is not used since the set inputs of the memory flip-flops are inhibited by relay CR8.

As the pocket code is read from the card, the memory flip-flops such as SFF3 in the hundreds, tens and units digit circuits RW6–RW8 are set from their "scale" inputs in accordance therewith. The pocket code memory flip-flops apply ground potential to the upper set inputs of the output flip-flops such as FF2 in FIG. 4f to condition them for operation in response to a pocket code transfer signal as hereinafter described. In this manner, the pocket code is momentarily stored on the memory flip-flops until it is transferred to the code setter solenoids.

When logic A15 in FIG. 4h was gated as aforesaid to energize the card reader clutch relay CR6, its output was inverted in logic N32 to apply ground potential to the upper input of logic A16. This conditions logic A15 for passing a signal indicating that the pocket code has been read and for developing a pocket code transfer signal. When the eighth column of the card has been read, stepper unit ST2 in FIG. 4b reaches its step 9 output and applies ground potential through conductor 66 to the lower input of logic A16 in FIG. 4h. The output of logic A16 is inverted in logic OR5 to apply amplified ground potential from driver DR9 through conductor 79 to the lower set inputs of the pocket code output flip-flops such as FF2 in FIG. 4f. This causes operation of the output flip-flops to their "1" state in accordance with the pocket code stored on the memory flip-flops. The output flip-flops apply ground potential through conductors 52 and 53 to energize the hundreds, tens and units digit relays in FIG. 4m in accordance with the pocket code. These relays close contacts in the circuits of the respective code setter solenoids.

As shown in FIG. 15, the console cam switch closes its contact CS5 in FIG. 4m a short time interval after contact CS3 was closed. Contact CS5 energizes relay CCR to close its contact and to energize the code setter solenoids in accordance with the pocket code. The solenoids set the arms of the code setter and as the code setter rotates past its lowest point of rotation the arms set the code wheels at the same time as inserter 23 inserts the letter into the conveyor space corresponding to the code wheels which were set.

As shown in FIG. 15, cam switch contact CS3 in FIG. 4m reopens to restore relay MCR. Contact b of the latter restores relay CR9 in FIG. 4h. Contact a of relay CR9 applies a positive going pulse to the lower reset input of flip-flop SFF9. Since the upper reset input was receiving ground potential from its output, flip-flop SFF9 resets to its "0" state. Contact b of relay CR9 opens whereby negative voltage is applied to the upper input of logic A15. As a result, the system including relay CR8 in FIG. 4j restores to the previous condition wherein list mode control CR4 remains energized. The list mode control system is now ready to detect the second letter as it passes into the sorting machine and to operate the card reader clutch to read the second punched card and to set the code wheels in accordance therewith.

While the system hereinbefore described is effectively adapted to fulfill the objects stated, it is to be understood that we do not intend to confine our invention to the particular preferred embodiment of memory type control system disclosed, inasmuch as it is susceptible of various modifications without departing from the scope of the appended claims.

We claim:

1. In a system for controlling an article sorting machine of the type which feeds articles one at a time from a supply past a reading station into the sorting machine for travel past a plurality of discharge gates; the improvement comprising:
   information memory means having stored therein article destination codes identifying sorter discharge gates and corresponding to name codes of recipients of the articles;
   a code register and means operable for inserting in said register in the system name codes from articles passing by the reading station, said name codes comprising at least a portion of the identification data of intended recipients thereof appearing on the articles;
   means for extracting from said memory means the article destination code corresponding to each registered name code;
   and means for transmitting the article destination code to control the sorting machine at the same time as the corresponding article is fed into the sorting machine.

2. In a system for controlling an article sorting machine of the type which feeds articles one at a time from a supply past a reading station into the sorting machine for travel past a plurality of discharge gates; the improvement comprising:
   information memory means having stored therein a multiplicity of name codes and a discharge gate code for each name code, the name codes representing a portion of the name or address data of recipients appearing on the articles to be sorted and the discharge gate codes identifying different discharge gates in the sorting machine;
   name code retaining means and means operable when articles pass by the reading station for inserting name codes in said retaining means as they are read from the passing articles;
   means for comparing each inserted name code with the name codes stored in said memory means and for detecting coincidence therebetween;
   and means responsive to detection of coincidence when a stored name code is found which matches the inserted name code for transmitting the associated discharge gate code as the corresponding article is fed into the sorting machine to condition the latter for operation of the discharge gate identified thereby.

3. In a system for controlling an article sorting machine of the type which feeds articles one at a time from a supply past a manual operator's station into the sorting machine for travel past a plurality of discharge gates; the improvement comprising:
   information memory means having stored therein a multiplicity of name codes and a discharge gate code for each name code, the name codes representing a discrete portion of the names of recipients appearing on the articles to be sorted and the discharge gate codes identifying different discharge gates in the sorting machine;
   a code register and manually operable means for inserting into said code register an alphabetical portion of the name appearing on each article passing by the operator's station to provide a name code for each article fed into the sorting machine;
   means for comparing each inserted name code with the name codes stored in said memory means and for detecting coincidence therebetween;
   and means responsive to detection of coincidence between said name codes for transmitting the associated discharge gate code as the corresponding article is fed into the sorting machine to condition the latter for operation of the discharge gate identified thereby.

4. The invention defined in claim 3, together with: selectively operable means for transferring said system from manual operator controlled sorting to automatic sorting;

means responsive to operation of the sorting machine and feeding of articles thereinto for reading a discharge gate code from coded media for each article; and means for transmitting the read discharge gate code as the corresponding article is fed into the sorting machine to control the sorting machine so that it will operate the discharge gate identified thereby upon arrival of the corresponding article thereat.

5. The invention defined in claim 3, together with:

means for removing name codes and associated discharge gate codes from said information memory means;

and means for sorting new name codes and new discharge gate codes in place of those that were removed.

6. The invention defined in claim 3, together with:

means operable for storing a new set of name codes and discharge gate codes in said information memory means;

and means responsive to initiation of operation of said storing means for first removing all previously stored name codes and discharge gate codes from said memory means.

7. In a system for controlling an article sorting machine of the type which feeds articles one at a time from a supply past a manual operator's station into a sorting conveyor for travel past a plurality of destination pockets; the improvement comprising:

high speed information memory means having stored therein digital pocket codes identifying destination pockets of the sorting machine and a digital name code for each pocket code, the name codes comprising a portion of the names of recipients appearing on the articles translated into digital form;

a keyboard for translating alphabetical name codes into digital name codes, said keyboard having alphabetical keys which are operated by the manual operator in accordance with the aforesaid portion of the names read from the articles as they pass in front of the operator whereby the operator need not memorize the pocket codes, and means responsive to operation of said keyboard for storing such digital name codes;

means operating in synchronism with the sorting machine for searching said memory means for the digital name code corresponding to the keyed-in and stored digital name code and for extracting the associated pocket code;

and means for transmitting the extracted pocket code to the sorting machine coincident with feeding of the article into its sorting conveyor to control delivery of the article to the corresponding destination pocket.

8. The invention defined in claim 7, together with:

means selectively operable for reading space codes from coded media;

means for translating the space codes into digital name codes and associated digital pocket codes and for storing them on said memory means.

9. The invention defined in claim 8, together with:

means responsive to operation of said selectively operable means for first removing all codes from said memory means before new codes are stored therein.

10. The invention defined in claim 7, wherein said system comprises:

selectively operable means for transferring said system from manual operator sorting to automatic sorting;

means operable in synchronism with the sorting machine and in response to feeding of an article thereinto for reading a space code from coded media indicative of a pocket code;

means for translating said space code into a digital pocket code;

means operating in synchronism with the sorting machine for transmitting said digital pocket code to the sorting machine coincident with arrival of the article therein to control delivery of the article to the pocket indicated by the pocket code;

and means for inhibiting said memory means from interfering with said transmission of the pocket code.

11. In a system for controlling a sorting machine to enable a manual operator to sort articles to a plurality of sorter pockets in accordance with name or address data appearing on the articles without having to remember any pocket identification codes, the sorting machine having a conveyor provided with receptacles for conveying articles past the sorter pockets and gates selectively operable by settable escort coding devices for discharging articles into the pockets in accordance with predetermined pocket codes, a console for feeding articles past a manual operator's station into the conveyor receptacles and a code setter for setting the escort coding devices as articles are fed into the corresponding conveyor receptacles:

information memory means having stored therein name codes comprising at least a portion of the name or address data of recipients which will appear on the articles to be sorted and pocket codes identifying the pockets in the sorting machine, each stored name code having associated therewith a stored pocket code;

manual operator controlled means for registering name codes rapidly discernable from the original name or address data on the articles as the articles are fed into the sorting machine;

means for searching said memory means for the stored name code which corresponds to the registered name code and for extracting the associated pocket code;

and means for transmitting the extracted pocket code to the code setter to cause it to set the escort coding device corresponding to the conveyor receptacle into which the article is fed.

12. The invention defined in claim 11, together with:

a card reader for reading space codes from punched cards;

a solid state translator for translating said space codes into binary name codes and binary coded decimal pocket codes;

and means for recording a name code and an associated pocket code in said information memory means upon the completion of reading of each punched card.

13. The invention defined in claim 12, wherein:

said information memory means comprises a rotary magnetic drum;

and said recording means comprises a plurality of groups of magnetic recording circuits, one group for each binary number representing an alphabetical letter of the name code and one group for each binary coded decimal number representing a digit of the pocket code.

14. The invention defined in claim 11, wherein said manual operator controlled means comprises:

a keyboard comprising alphabetical keys and means responsive to operation of said keys for providing binary codes indicative of alphabetical letters;

and means for registering the binary codes provided by the keyboard as the keys are operated.

15. The invention defined in claim 14, wherein said means for searching said memory means and for extracting a pocket code therefrom comprises:

solid state coincidence means;

means for applying the stored name codes from said memory means in succession to said coincidence means;

means operating in synchronism with the feeding of an article into the sorting machine for applying the registered name code to said coincidence means to cause operation of the latter when a stored name code matches the registered name code;

and solid state logic circuit means responsive to said coincidence means for extracting the associated pocket code from said memory means.

16. In a system for controlling a mail sorting machine of the type which feeds pieces of mail one at a time from a supply past a manual operator's station into a sorting conveyor for travel past a plurality of coded pockets having discharge gates; the improvement comprising:

a high speed rotating magnetic drum having recorded thereon a multiplicity of name codes and a pocket code for each name code, each name code being a numerical code indicative of a plurality of alphabetical letters constituting a portion of the name of a recipient appearing on the mail to be sorted, and each pocket code being a numerical code identifying a different pocket in the sorting machine;

a keyboard having alphabetical keys whereby an operator keys in a portion of the name read from each piece of mail passing by the operator's station and having means for translating the letters of said name portion into a numerical code;

means responsive to operation of said keyboard for registering the keyed-in name codes;

a plurality of magnetic reading circuits for reading simultaneously a recorded name code and the associated recorded pocket code and for reading the pairs of name and pocket codes in sequence from the drum as it rotates;

memory logic circuits for said reading circuits for momentarily storing the name codes and pocket codes as they are read;

a reading circuit responsive to drum rotation for producing clock pulses, one for each combined name and pocket code space on the drum, for resetting said memory logic circuits before the next pair of name and pocket codes is read;

coincidence logic circuits having first inputs for receiving the name codes from the name code memory logic circuits;

output logic circuits having first inputs for receiving the pocket codes from the pocket code memory logic circuits;

means operating in synchronism with the sorting machine for transmitting the keyed-in name code from the registering means to second inputs of said coincidence logic circuits to cause operation of the latter in response to receipt of a matching name code at said first inputs thereof to produce a control signal;

and means for transmitting said control signal to second inputs of said output logic circuits to cause the latter to transfer the pocket code associated with said matching name code for control of the sorting machine.

17. The invention defined in claim 16, wherein said memory logic circuits comprise:

solid state flip-flop circuits having first inputs for setting the same into operating conditions in different combinations in accordance with the name and pocket codes being read and having second inputs responsive to said clock pulses for resetting said flip-flop circuits to zero output conditions after each pair of name and pocket codes has been read.

18. The invention defined in claim 16, wherein said means for transmitting said control signal comprises:

means operating in synchronism with the sorting machine for producing a search signal lasting for at least one revolution of the drum following transmission of said key-in name code to said coincidence logic circuits;

an AND logic circuit;

means for applying said search signal to gate said AND logic circuit for a time interval sufficient to compare all of the name codes on the drum with the keyed-in name code in said coincidence logic circuits thereby to cause said AND logic circuit to pass said control signal when coincidence occurs;

and means for causing said control signal from said AND logic circuit to condition said output logic circuits to pass the associated pocket code to the sorting machine.

19. The invention defined in claim 16, together with:

means for selectively transferring said system from keyboard controlled sorting to load mode operation to cause erasing of the drum and to enable recording of new name codes and new pocket codes thereon;

means in said reading circuits for erasing the drum;

means responsive to transfer of said system to load mode operation for initiating operation of said erasing means;

and means for maintaining operation of said erasing means for at least two revolutions of the drum to insure complete erasing of all the name codes and pocket codes therefrom.

20. The invention defined in claim 19, wherein said maintaining means comprises:

means for reading a sync pulse from the drum for each revolution thereof;

means for counting at least three sync pulses;

and means responsive to the third counted sync pulse for terminating operation of said erasing means.

21. The invention defined in claim 20, together with:

a card reader for reading punched cards, each card having punched thereon a space code indicative of a different name code and a space code indicative of a pocket code identifying one of the pockets in the sorting machine;

means in said magnetic reading circuits for controlling recording of name codes and associated pocket codes on the drum;

a translator responsive to reading of a card by said card reader for translating the space codes into numerical name and pocket codes;

stepper means for distributing the numerical elements of the name and pocket codes from said translator to successive groups of said recording control means;

manually controlled means for initiating operation of said card reader to read the first card;

and means responsive to said stepper means following distribution of the last numerical element for transmitting a recycling signal for reoperating said card reader to read another card.

22. The invention defined in claim 21, together with:

a card counter for counting each card that is read by the card reader;

a clock pulse counter for counting during each revolution of the drum the spaces on the drum in which name codes and associated pocket codes can be recorded;

means responsive to each sync pulse for resetting the clock pulse counter to zero condition at the end of each revolution thereof;

coincidence means responsive to the card counter and the clock pulse counter each time that the latter reaches the same count as is on the card counter for producing a write signal;

and means responsive to said write signals for operating said recording control means to cause recording of the name codes and associated pocket codes read from successive cards into successive spaces on the drum.

23. The invention defined in claim 22, wherein each said recording control means comprises:

an AND logic circuit having three inputs;

means responsive to reading of successive numerical elements of the name and pocket codes for operating said stepper means to apply distribution signals to successive groups of said AND logic circuits at their first inputs to condition the same for passing the name and pocket codes;

means for applying signals indicative of numerical elements of the name and pocket codes from said translator to said successive groups of said AND logic circuits at their second inputs when they are conditioned by said distribution signals;

means responsive to each numerical element output from said translator for applying a short gating signal to all of said AND logic circuits in common to pass the numerical elements of the name and pocket codes therethrough in accordance with the conditioning signals from the stepper means;

and memory means for receiving the name and pocket codes from said AND logic circuits and for retaining the same until said write signal is transmitted.

24. The invention defined in claim 23, together with: means also responsive to each numerical element output from said translator for developing a short stepper signal to cause said stepper means to condition the next group of AND logic circuits at their first inputs;

and means for causing said short stepper signal to terminate said short gating signal.

25. The invention defined in claim 24, together with: means responsive to initiation of each operation of said card reader before it reads a card for transmitting a stepper control signal;

means responsive to said stepper control signal for developing a short signal to reset said stepper to zero output condition;

and means simultaneously responsive to said stepper control signal for developing a signal longer than said short signal for setting said stepper to its first step output condition before a card is read.

26. An article sorting system whereby a manual operator can sort articles to a multiplicity of destinations in accordance with original name or address data of recipients appearing on the articles without having to remember a large number of destination codes comprising:

an article sorter for conveying articles past a series of article destination receptacles and being selectively operable to discharge articles thereto;

information memory means having stored therein article destination codes identifying sorter receptacles and corresponding to name codes of recipients of articles to be sorted;

a code register and manual operator controlled means operable to register therein name codes rapidly discernable from and comprising at least a portion of the original name or address data of recipients appearing on the articles;

means for extracting from said memory means the article destination code corresponding to each registered name code;

means for inserting each article into the sorter;

and means responsive to each extracted destination code for controlling the sorter to discharge the corresponding article into the destination receptacle identified thereby.

References Cited by the Examiner

UNITED STATES PATENTS 3,000,519  9/1961  Purnell _____ 340—172.5

References Cited by the Applicant

UNITED STATES PATENTS 2,689,657  9/1954  Lens.
2,936,556  5/1960  Gibson.
3,062,391  11/1962  Francois.

ROBERT C. BAILEY, *Primary Examiner.*

G. D. SHAW, *Assistant Examiner.*